(12) United States Patent
Moore

(10) Patent No.: US 6,961,067 B2
(45) Date of Patent: Nov. 1, 2005

(54) REDUCING THE NUMBER OF COMPOSITING OPERATIONS PERFORMED IN A PIXEL SEQUENTIAL RENDERING SYSTEM

(75) Inventor: Kevin John Moore, North Ryde (AU)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/781,664

(22) Filed: Feb. 20, 2004

(65) Prior Publication Data

US 2004/0189656 A1 Sep. 30, 2004

(30) Foreign Application Priority Data

Feb. 21, 2003 (AU) ................................... 2003-900772

(51) Int. Cl.[7] .............................................. G09G 5/02
(52) U.S. Cl. ..................... 345/589; 345/593; 345/597; 345/629; 345/634
(58) Field of Search ................................ 345/589, 593, 345/597, 629, 634

(56) References Cited

U.S. PATENT DOCUMENTS

| | | | |
|---|---|---|---|
| 5,384,912 A | * 1/1995 | Ogrinc et al. ............... | 345/501 |
| 6,211,859 B1 | * 4/2001 | Lin et al. ................... | 345/596 |
| 6,411,302 B1 | * 6/2002 | Chiraz ........................ | 345/545 |
| 6,531,997 B1 | * 3/2003 | Gates et al. ................. | 345/107 |
| 6,636,216 B1 | * 10/2003 | Silverbrook et al. ........ | 345/427 |
| 2002/0015039 A1 | 2/2002 | Moore ......................... | 345/421 |

OTHER PUBLICATIONS

Thomas Porter, et al., "Compositing Digital Images", Computer Graphics, pp. 253–259, vol. 18, No. 3, Jul. 1984.

* cited by examiner

*Primary Examiner*—Matthew C. Bella
*Assistant Examiner*—Mike Rahmjoo
(74) *Attorney, Agent, or Firm*—Fitzpatrick, Cella, Harper & Scinto

(57) ABSTRACT

Apparatus 20 is disclosed for rendering an object-based image one pixel at a time in scanline order. The apparatus 20 comprises an optimisation module 550 for generating a set of compositing messages during a first pixel in a run of pixels between adjacent edges of one or two objects, and for generating a reduced set of compositing messages from the set during subsequent pixels in the run of pixels. The apparatus 20 further comprises a pixel compositing module 700 which in addition to compositing the first pixel in the run of pixels also stores a result or partial result of the compositing of the first pixel. The pixel compositing module 700 utilises the reduced set of compositing messages and the stored result or partial result to composite pixels in the run subsequent to the first pixel.

22 Claims, 51 Drawing Sheets

| Edge 84 | Edge 92 |
|---|---|
| X=10 | X=40 |
| NY = 70 | NY =70 |
| DX = -1 | DX = 0 |
| DDX = 0 | DDX = 0 |
| P = 1 | P = 0 |
| u = (-1) | u = (+1) |
| Addr = Irrelevant in this example | Addr = Irrelevant in this example |

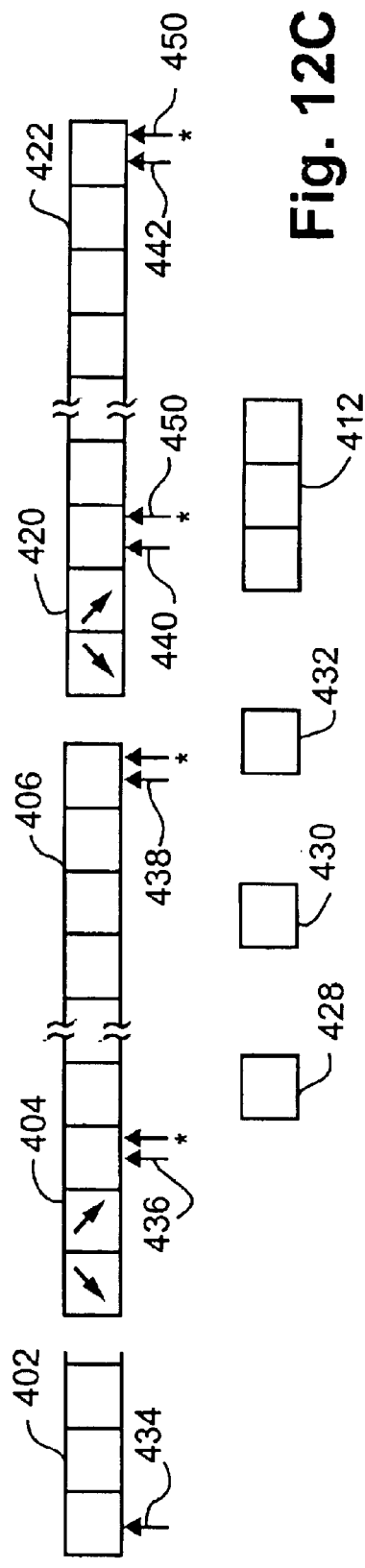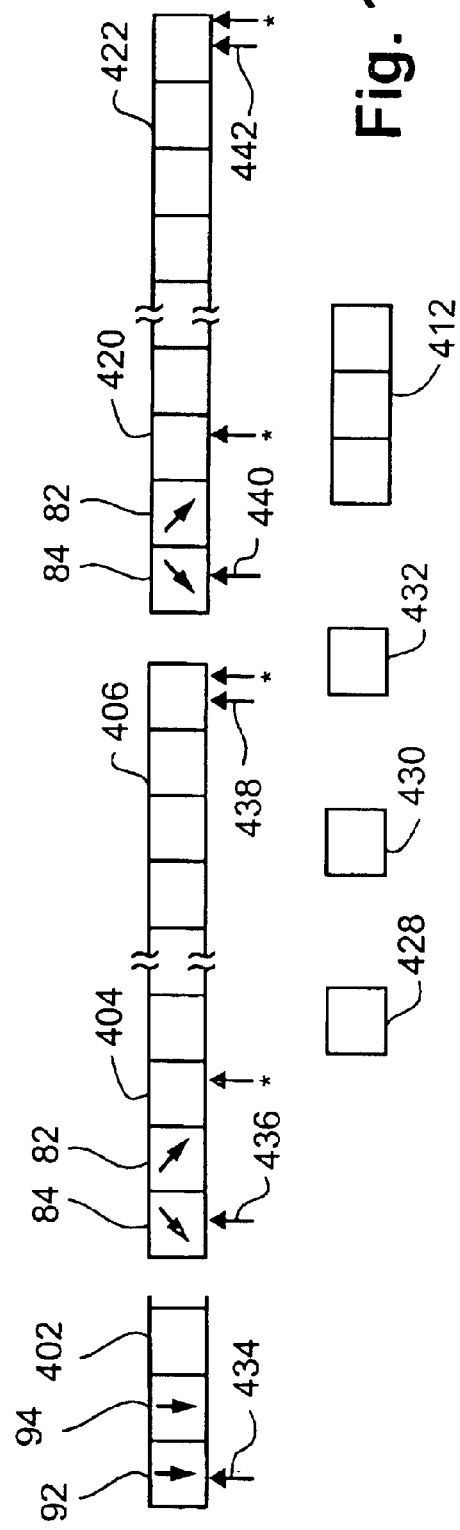

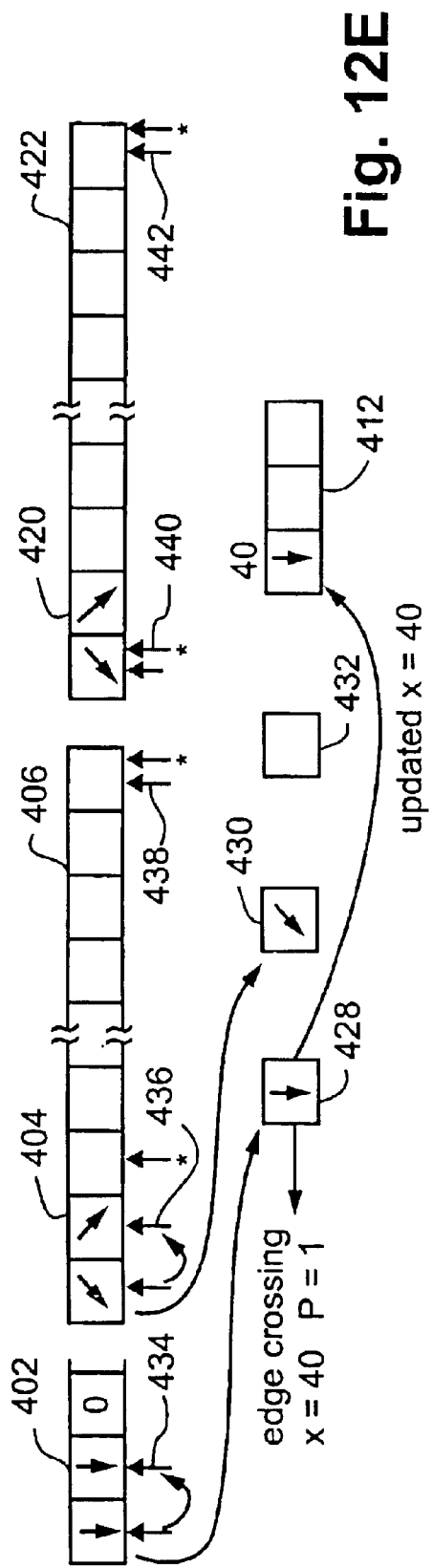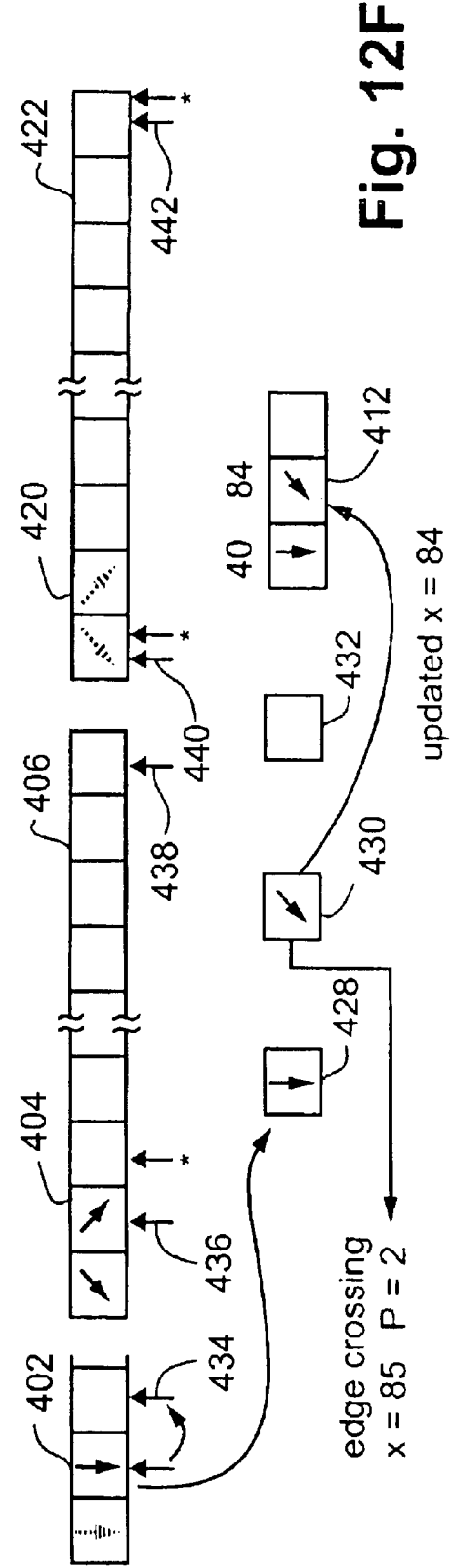

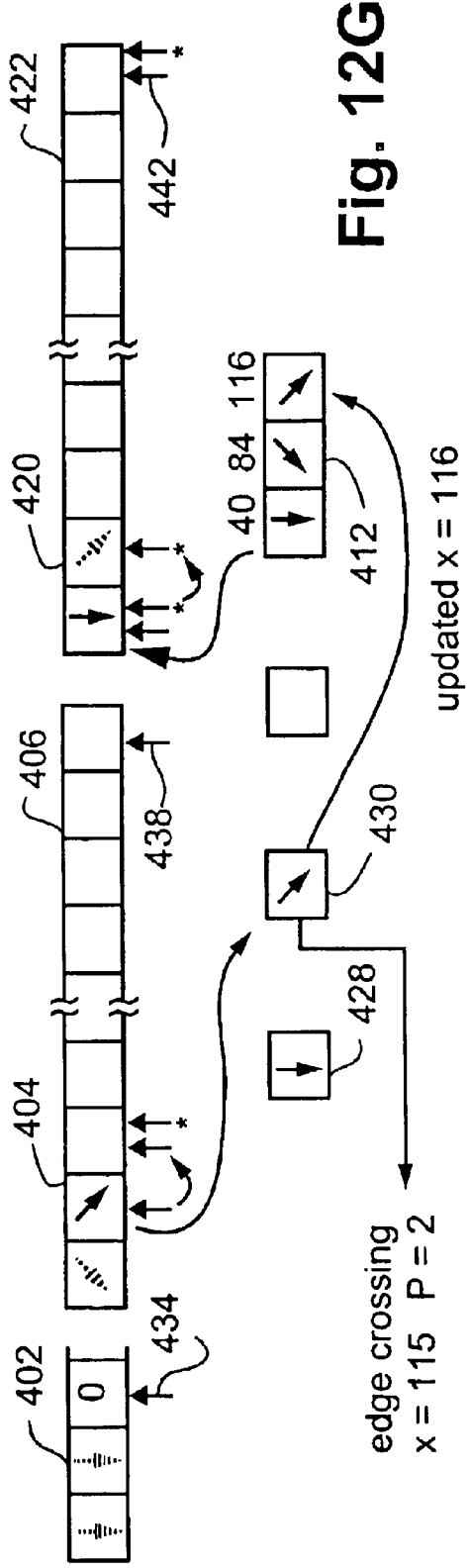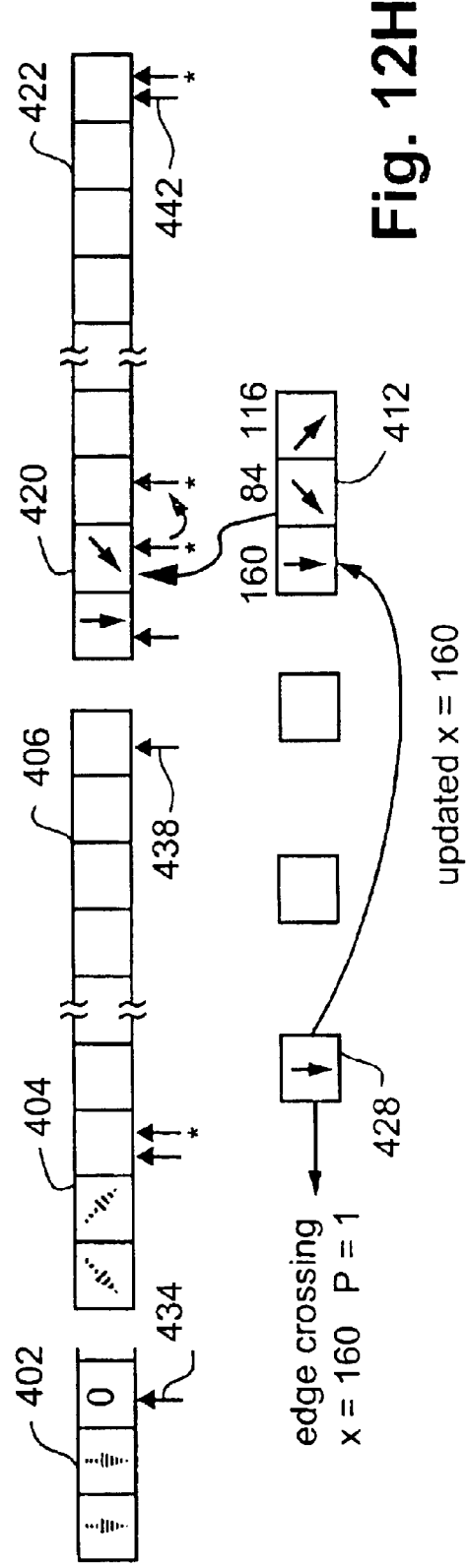

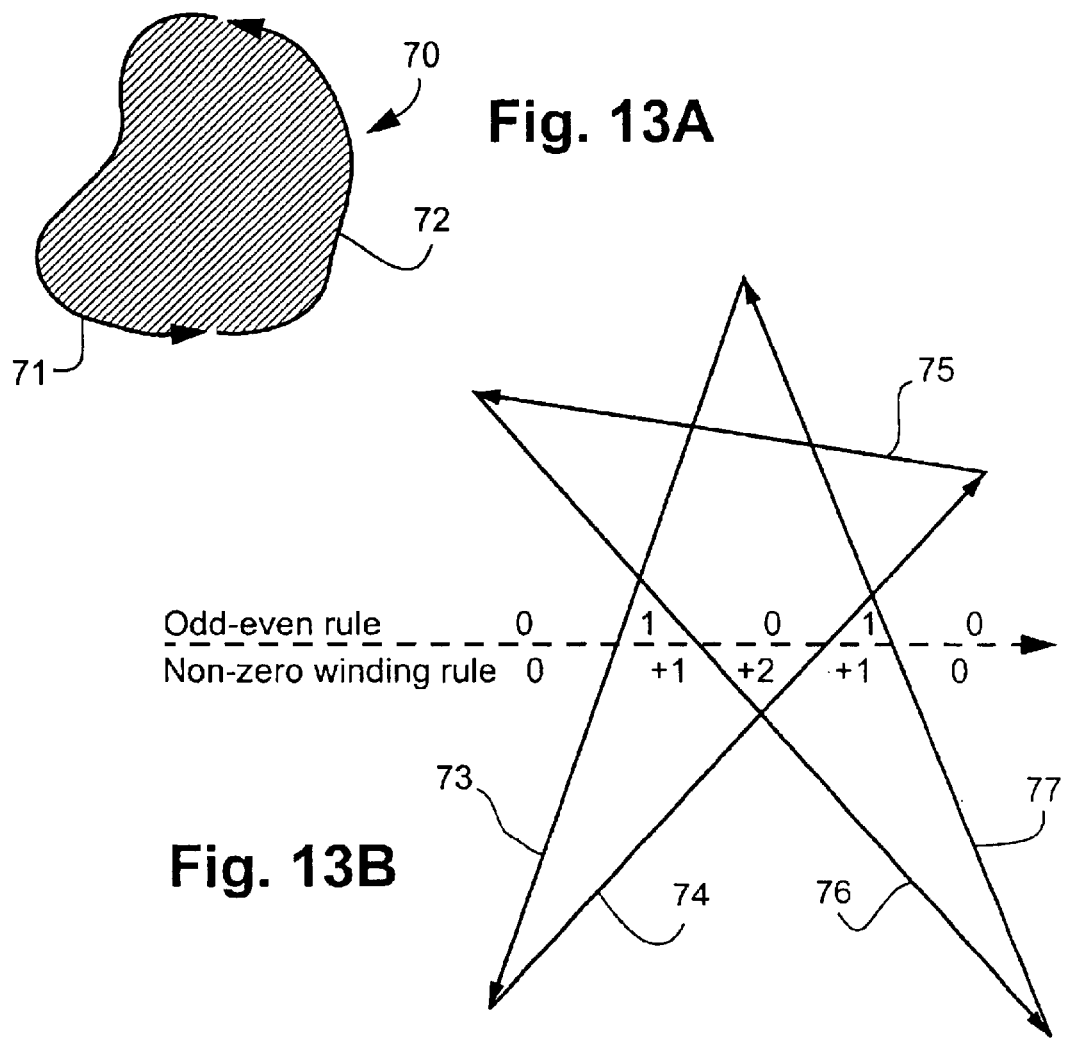
Fig. 13A
Fig. 13B
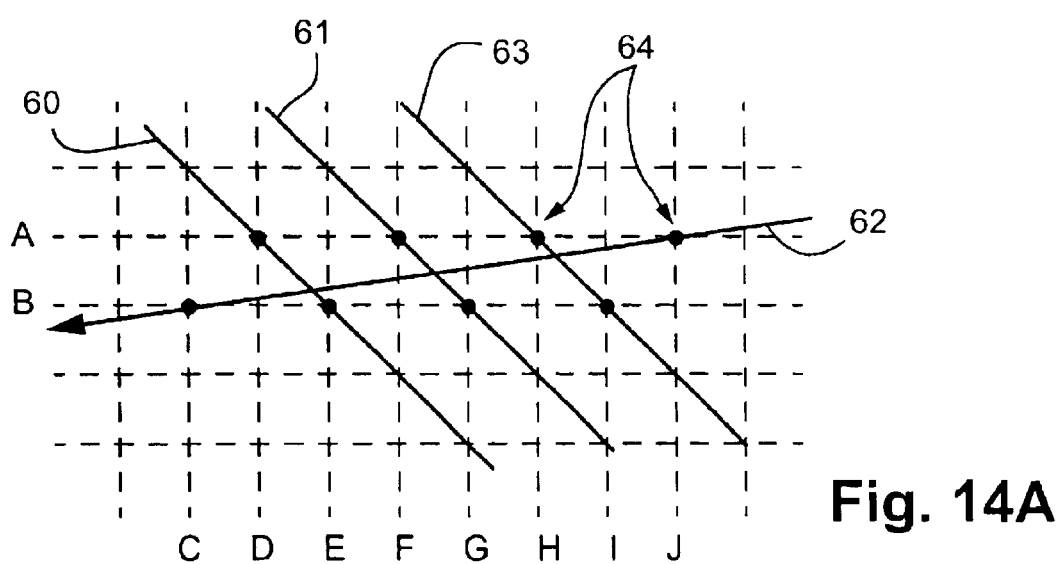
Fig. 14A

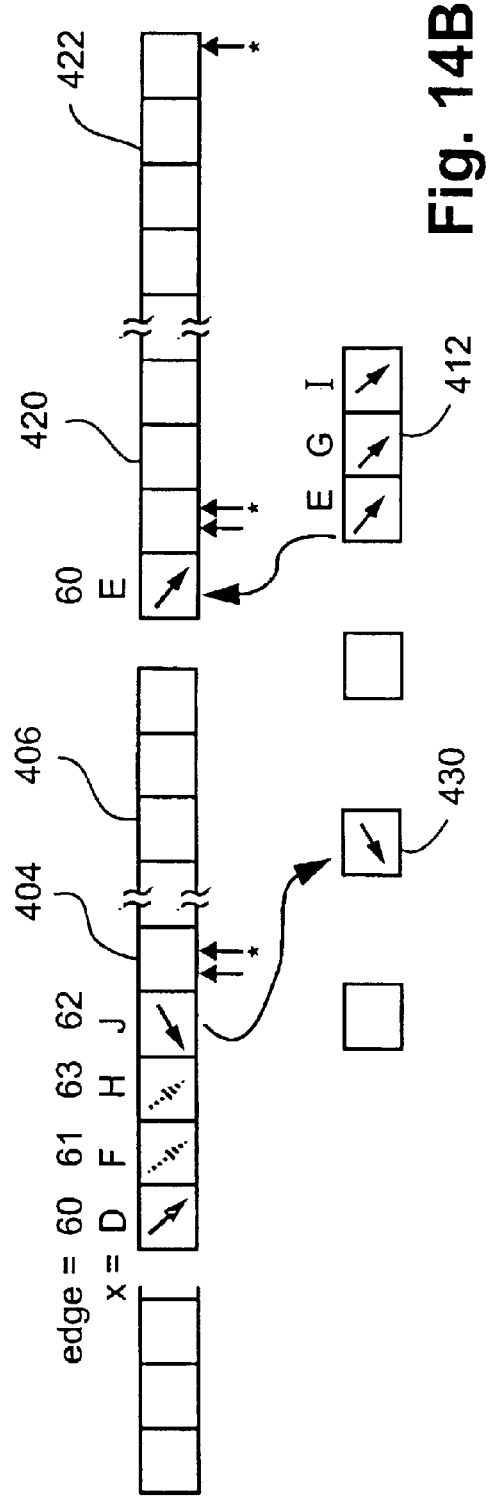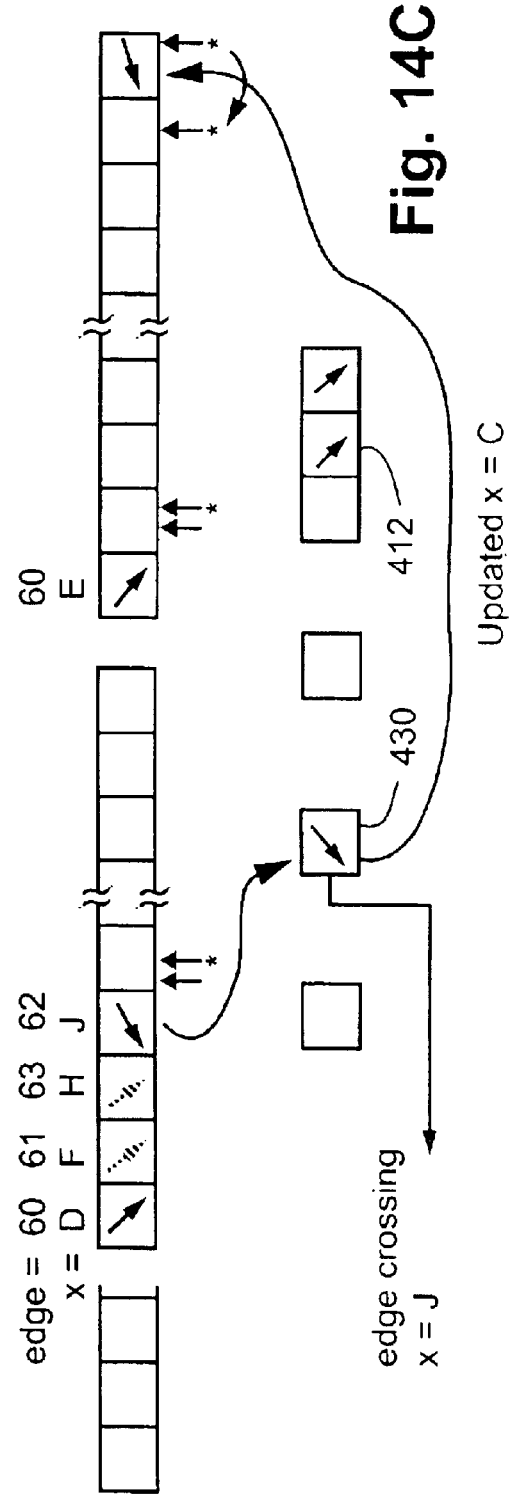

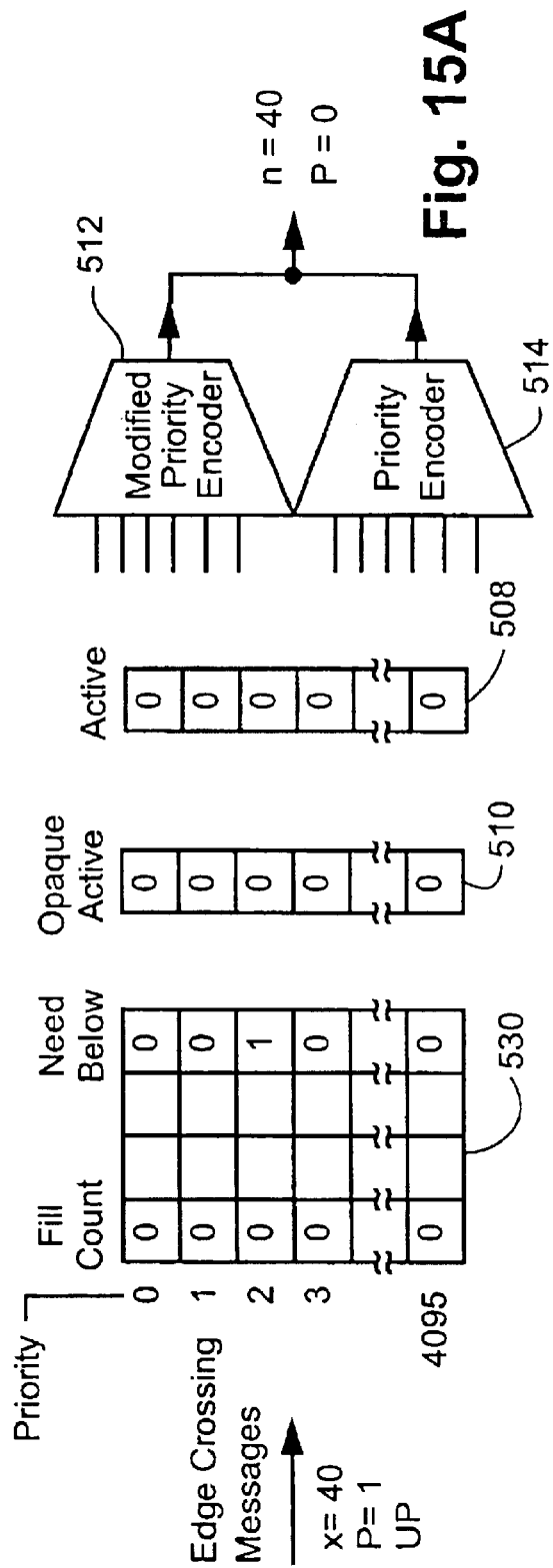

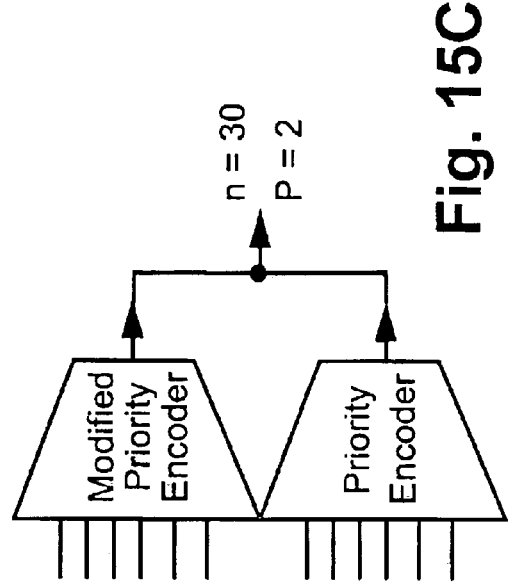
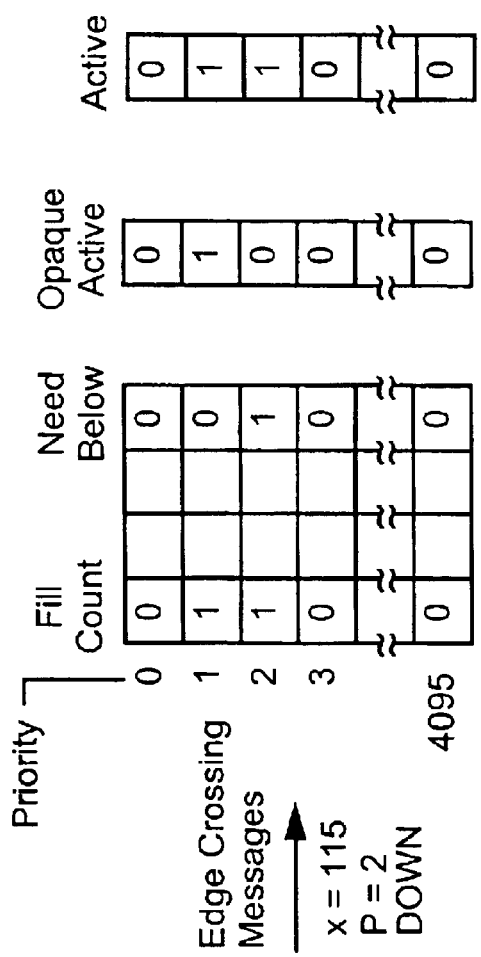
Fig. 15C
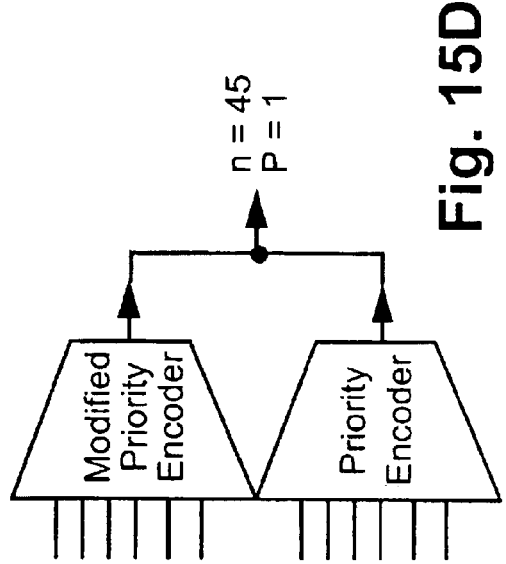
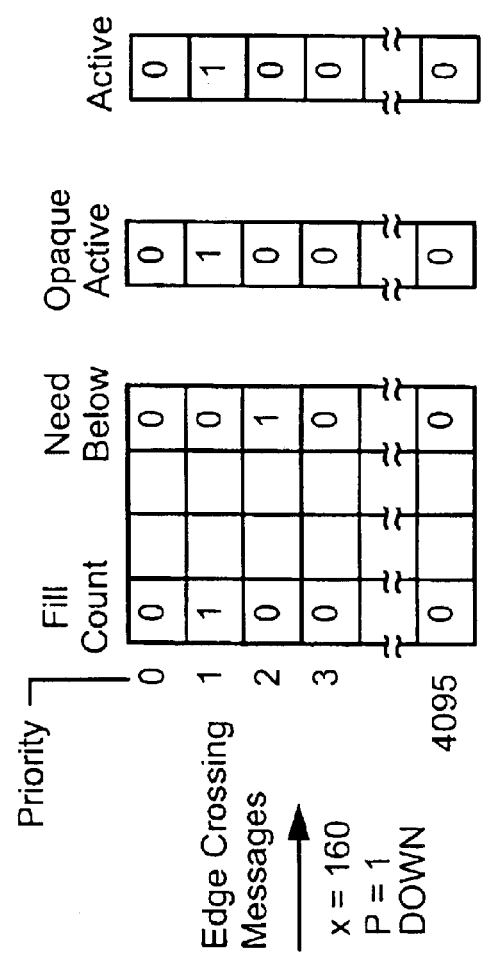
Fig. 15D

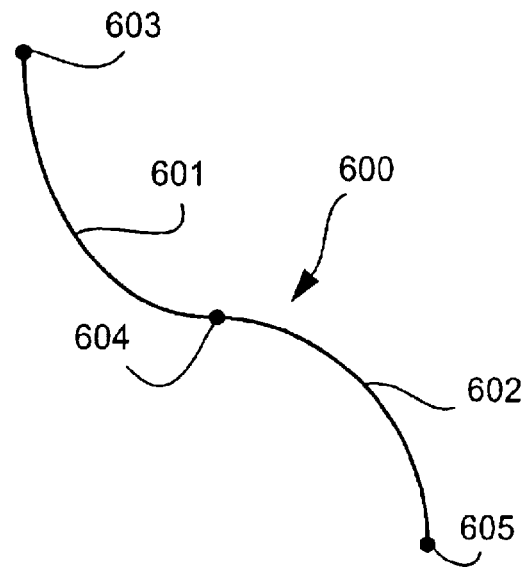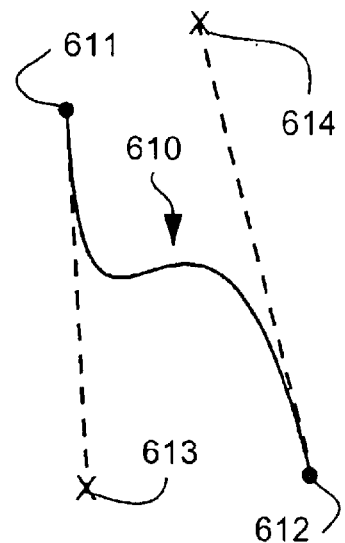
Fig. 16A (Prior Art)
Fig. 16B (Prior Art)
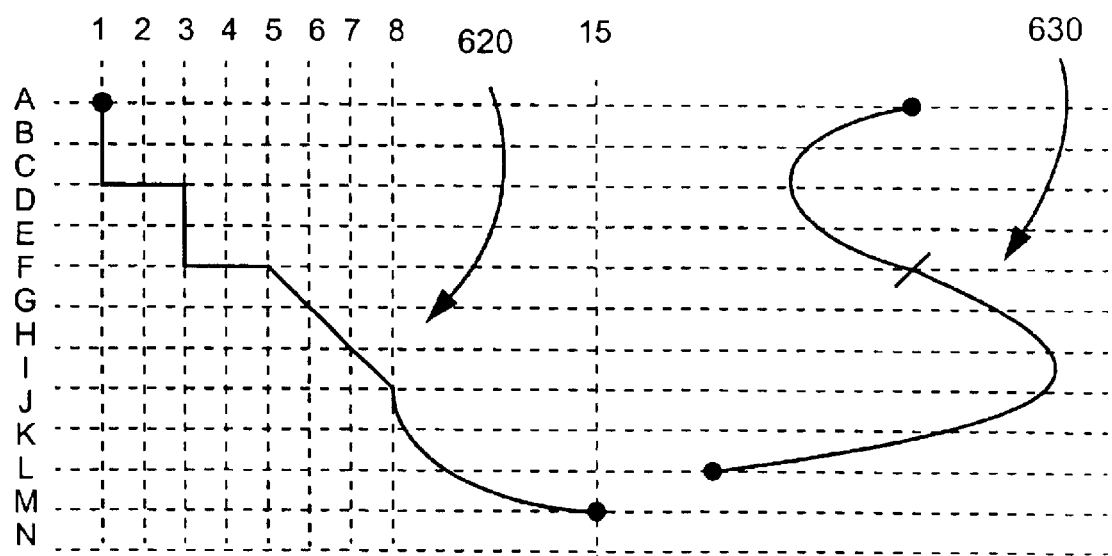
Fig. 16C
Fig. 16D

| FILL COUNT | CLIP COUNT | FILL TYPE | CLIPPER | CLIP OUT | NEED_BELOW | X_INDEPENDENT | STACK_OP | USE_D_OUT_S | USE_S_OUT_D | USE_S_ROP_D | COLOR_OP | FILL_RULE_IS_ODD_EVEN | ATTRIBUTES | FILL INDEX |
|---|---|---|---|---|---|---|---|---|---|---|---|---|---|---|
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | ○ |
| | | | | | | | | | | | | | | ○ |

| Raster operation code | Operation | Operation Name |
|---|---|---|
| 0x00 | r = 0 | LCO_BLACK |
| 0x01 | r = src & dest | LCO_MASKPEN |
| 0x02 | r = src & ~dest | LCO_MASKPENNOT |
| 0x03 | r = src | LCO_COPYPEN |
| 0x04 | r = ~src & dest | LCO_MASKNOTPEN |
| 0x05 | r = dest | LCO_NOP |
| 0x06 | r = src ^ dest | LCO_XORPEN |
| 0x07 | r = src \| dest | LCO_MERGEPEN |
| 0x08 | r = ~(src \| dest) | LCO_NOTMERGEPEN |
| 0x09 | r = ~(src ^ dest) | LCO_NOTXORPEN |
| 0x0a | r = ~dest | LCO_NOT |
| 0x0b | r = src \| ~dest | LCO_MERGEPENNOT |
| 0x0c | r = ~src | LCO_NOTCOPYPEN |
| 0x0d | r = ~src \| dest | LCO_MERGENOTPEN |
| 0x0e | r = ~(src & dest) | LCO_NOTMASKPEN |
| 0x0f | r = 0xff | LCO_WHITE |
| 0x10 | r = min(src, dest) | LCO_MIN |
| 0x11 | r = max(src, dest) | LCO_MAX |
| 0x12 | r = clamp(src + dest) | LCO_PLUS |
| 0x13 | r = src | LCO_COPYPEN_PREMULTIPLIED |
| 0x14 | r = clamp(src - dest) | LCO_SRC_MINUS_DEST |
| 0x15 | r = dest | LCO_NOP_PREMULTIPLIED |
| 0x16 | r = clamp(dest - src) | LCO_DEST_MINUS_SRC |
| 0x17 | r = clamp(src + dest) where dest is signed | LCO_PLUS_SIGNED_DEST |
| 0x18 | r = threshold(dest, src) | LCO_THRESH_DEST_SRC |
| 0x19 | r = threshold(src, dest) | LCO_THRESH_SRC_DEST |
| 0x1a | r = ~dest | LCO_NOT_DATTR |
| 0x1b | o = luminance(dest; src) | LCO_LUMINANCE |
| 0x1c | r = ~src | LCO_NOTCOPYPEN_SATTR |
| 0x1d | o = ckey(dest; src+/-o) | LCO_CKEY |

Fig. 20A

| Operator | COLOR_OP | ALPHA_OP Flags Set | Diagram |
|---|---|---|---|
| clear | not used | none | |
| src | LCO_COPYPEN | LAO_USE_S_ROP_D<br>LAO_USE_S_OUT_D | |
| dest | LCO_NOP | LAO_USE_S_ROP_D<br>LAO_USE_D_OUT_S | |
| src over dest | LCO_COPYPEN | LAO_USE_S_ROP_D<br>LAO_USE_S_OUT_D<br>LAO_USE_D_OUT_S | |
| src rover dest<br>(dest over src) | LCO_NOP | LAO_USE_S_ROP_D<br>LAO_USE_S_OUT_D<br>LAO_USE_D_OUT_S | |
| src in dest | LCO_COPYPEN | LAO_USE_S_ROP_D | |
| src rin dest<br>(dest in src) | LCO_NOP | LAO_USE_S_ROP_D | |
| src out dest | not used | LAO_USE_S_OUT_D | |

Fig. 20B

| Operator | COLOR_OP | ALPHA_OP Flags Set | Diagram |
|---|---|---|---|
| src rout dest (dest out src) | not used | LAO_USE_D_OUT_S | |
| src atop dest | LCO_COPYPEN | LAO_USE_S_ROP_D LAO_USE_D_OUT_S | |
| src ratop dest (dest atop src) | LCO_NOP | LAO_USE_S_ROP_D LAO_USE_S_OUT_D | |
| src xor dest | not used | LAO_USE_S_OUT_D LAO_USE_D_OUT_S | |

Original Stream (first pixel)

| | STACK_OP | LAO_D_USE_D_OUT_S | LAO_USE_S_OUT_D | LAO_USE_S_ROP_D | COLOR_OP | ATTRI-BUTES | FILL TYPE | X_INDE-PENDENT | FILL INDEX | STORE | RE-STORE |
|---|---|---|---|---|---|---|---|---|---|---|---|
| 3008 | STD_OP | a | a | a | operation | xxx | xx | 0 | xxxxx | 0 | 0 |
| 3007 | POP_SRC | a | a | a | operation | xxx | xx | 0 | xxxxx | 0 | 0 |
| 3006 | STD_OP | a | a | a | operation | xxx | xx | 1 | xxxxx | 0 | 0 |
| 3005 | NO_POP_DEST | a | a | a | operation | xxx | xx | 1 | xxxxx | 0 | 0 |
| 3004 | POP_SRC | a | a | a | operation | xxx | xx | 1 | xxxxx | 1 | 0 |
| 3003 | STD_OP | a | a | a | operation | xxx | xx | 1 | xxxxx | 0 | 0 |
| 3002 | NO_POP_DEST | a | a | a | operation | xxx | xx | 1 | xxxxx | 0 | 0 |
| 3001 | STD_OP | a | a | a | operation | xxx | xx | 1 | xxxxx | 1 | 0 |

Fig. 30A

Optimised Stream (subsequent pixels)

| | STACK_OP | LAO_USE_D_OUT_S | LAO_USE_S_OUT_D | LAO_USE_S_ROP_D | COLOR_OP | ATTRI-BUTES | FILL TYPE | X_INDE-PENDENT | FILL INDEX | FILL STORE | RE-STORE |
|---|---|---|---|---|---|---|---|---|---|---|---|
| 3008 | STD_OP | a | a | a | operation | xxx | xx | 0 | xxxxx | 0 | 0 |
| 3007 | POP_SRC | a | a | a | operation | xxx | xx | 0 | xxxxx | 0 | 0 |
| 3006 | STD_OP | a | a | a | operation | xxx | xx | 1 | xxxxx | 0 | 0 |
| 3005 | NO_POP_DEST | a | a | a | operation | xxx | xx | 1 | xxxxx | 0 | 0 |
| 3004 | POP_SRC | a | a | a | operation | xxx | xx | 1 | xxxxx | 0 | 1 |

Fig. 30B

Original Stream (first pixel)

| | STACK_OP | LAO_USE_D_OUT_S | LAO_USE_S_OUT_D | LAO_USE_S_ROP_D | COLOR_OP | ATTRI-BUTES | FILL TYPE | X_INDE-PENDENT | FILL INDEX | STORE | RE-STORE |
|---|---|---|---|---|---|---|---|---|---|---|---|
| 3108 | STD_OP | a | a | a | operation | xxx | xx | 0 | xxxxx | 0 | 0 |
| 3107 | POP_SRC | a | a | a | operation | xxx | xx | 0 | xxxxx | 0 | 0 |
| 3106 | STD_OP | a | a | a | operation | xxx | xx | 1 | xxxxx | 0 | 0 |
| 3105 | NO_POP_DEST | a | a | a | operation | xxx | xx | 1 | xxxxx | 0 | 0 |
| 3104 | POP_SRC | a | a | a | operation | xxx | xx | 1 | xxxxx | 0 | 0 |
| 3103 | NO_POP_DEST | a | a | a | operation | xxx | xx | 1 | xxxxx | 0 | 0 |
| 3102 | STD_OP | a | a | a | operation | xxx | xx | 1 | xxxxx | 1 | 0 |
| 3101 | STD_OP | a | a | a | operation | xxx | xx | 1 | xxxxx | 1 | 0 |

Fig. 31A

Optimised Stream (subsequent pixels)

| | STACK_OP | LAO_USE_D_OUT_S | LAO_USE_S_OUT_D | LAO_USE_S_ROP_D | COLOR_OP | ATTRI-BUTES | FILL TYPE | X_INDE-PENDENT | FILL INDEX | FILL STORE | RE-STORE |
|---|---|---|---|---|---|---|---|---|---|---|---|
| 3108 | STD_OP | a | a | a | operation | xxx | xx | 0 | xxxxx | 0 | 0 |
| 3107 | POP_SRC | a | a | a | operation | xxx | xx | 0 | xxxxx | 0 | 0 |
| 3106 | STD_OP | a | a | a | operation | xxx | xx | 1 | xxxxx | 0 | 0 |
| 3105 | NO_POP_DEST | a | a | a | operation | xxx | xx | 1 | xxxxx | 0 | 0 |
| 3104 | POP_SRC | a | a | a | operation | xxx | xx | 1 | xxxxx | 0 | 0 |
| 3103 | NO_POP_DEST | a | a | a | operation | xxx | xx | 1 | xxxxx | 0 | 0 |
| 3102 | STD_OP | a | a | a | operation | xxx | xx | 1 | xxxxx | 0 | 1 |

Fig. 31B

Original Stream (first pixel)

| | STACK_OP | LAO_USE_D_OUT_S | LAO_USE_S_OUT_D | LAO_USE_S_ROP_D | COLOR_OP | ATTRI-BUTES | FILL TYPE | X_INDE-PENDENT | FILL INDEX | STORE | RE-STORE |
|---|---|---|---|---|---|---|---|---|---|---|---|
| 3208 | STD_OP | a | a | a | operation | xxx | xx | 0 | xxxxx | 0 | 0 |
| 3207 | POP_SRC | a | a | a | operation | xxx | xx | 0 | xxxxx | 1 | 0 |
| 3206 | STD_OP | a | a | a | operation | xxx | xx | 1 | xxxxx | 0 | 0 |
| 3205 | NO_POP_DEST | a | a | a | operation | xxx | xx | 1 | xxxxx | 0 | 0 |
| 3204 | POP_SRC | a | a | a | operation | xxx | xx | 1 | xxxxx | 0 | 0 |
| 3203 | STD_OP | a | a | a | operation | xxx | xx | 1 | xxxxx | 0 | 0 |
| 3202 | NO_POP_DEST | a | a | a | operation | xxx | xx | 1 | xxxxx | 0 | 0 |
| 3201 | STD_OP | a | a | a | operation | xxx | xx | 1 | xxxxx | 0 | 0 |

Fig. 32A

Optimised Stream (subsequent pixels)

| STACK_OP | LAO_USE_D_OUT_S | LAO_USE_S_OUT_D | LAO_USE_S_ROP_D | COLOR_OP | ATTRI-BUTES | FILL TYPE | X_INDE-PENDENT | FILL INDEX | STORE | RE-STORE |
|---|---|---|---|---|---|---|---|---|---|---|
| STD_OP | a | a | a | operation | xxx | xx | 0 | xxxxx | 0 | 0 |
| POP_SRC | a | a | a | operation | xxx | xx | 0 | xxxxx | 0 | 1 |

3208 → STD_OP
3207 → POP_SRC

Fig. 32B

Original Stream (first pixel)

| | STACK_OP | LAO_USE_D_OUT_S | LAO_USE_S_OUT_D | LAO_USE_S_ROP_D | COLOR_OP | ATTRI-BUTES | FILL TYPE | X_INDE-PENDENT | FILL INDEX | RE-STORE | STORE | ACC_EN |
|---|---|---|---|---|---|---|---|---|---|---|---|---|
| 3308 | STD_OP | a | a | a | operation | xxx | xx | 0 | xxxxx | 0 | 0 | 0 |
| 3307 | POP_SRC | a | a | a | ASS_OP | xxx | xx | 1 | xxxxx | 0 | 1 | 1 |
| 3306 | STD_OP | a | a | a | ASS_OP | xxx | xx | 1 | xxxxx | 0 | 0 | 1 |
| 3305 | NO_POP_DEST | 0 | 1 | 1 | lco_copypen | xxx | xx | 1 | xxxxx | 0 | 0 | 1 |
| 3304 | STD_OP | a | a | a | ASS_OP | xxx | xx | 1 | xxxxx | 0 | 1 | 1 |
| 3303 | STD_OP | a | a | a | ASS_OP | xxx | xx | 1 | xxxxx | 0 | 1 | 1 |
| 3302 | STD_OP | a | a | a | ASS_OP | xxx | xx | 1 | xxxxx | 0 | 1 | 1 |
| 3301 | STD_OP | a | a | a | operation | xxx | xx | 0 | xxxxx | 0 | 0 | 0 |

Fig. 33A

Optimised Stream (subsequent pixels)

| STACK_OP | LAO_USE_D_OUT_S | LAO_USE_S_OUT_D | LAO_USE_S_ROP_D | COLOR_OP | ATTRI-BUTES | FILL TYPE | X_INDE-PENDENT | FILL INDEX | RE-STORE | STORE | ACC_EN | |
|---|---|---|---|---|---|---|---|---|---|---|---|---|
| STD_OP | a | a | a | operation | xxx | xx | 0 | xxxxx | 0 | 0 | 0 | 3308 |
| STD_OP | a | a | a | ASS_OP | xxx | xx | 1 | xxxxx | 1 | 0 | 0 | 3307 |
| STD_OP | a | a | a | operation | xxx | xx | 0 | xxxxx | 0 | 0 | 0 | 3301 |

Fig. 33B

Original Stream (first pixel)

| | STACK_OP | LAO_USE_D_OUT_S | LAO_USE_S_OUT_D | LAO_USE_S_ROP_D | COLOR_OP | ATTRI-BUTES | FILL TYPE | X_INDE-PENDENT | FILL INDEX | STORE_0 | STORE_1 | STORE_2 |
|---|---|---|---|---|---|---|---|---|---|---|---|---|
| 3410 | STD_OP | a | a | a | op7 | xxx | xx | 0 | xxxxx | 0 | 0 | 0 |
| 3409 | POP_SRC | a | a | a | op6 | xxx | xx | 1 | xxxxx | 0 | 0 | 0 |
| 3408 | POP_SRC | a | a | a | op5 | xxx | xx | 1 | xxxxx | 0 | 1 | 0 |
| 3407 | NO_POP_DEST | a | a | a | lco_nop | xxx | xx | 1 | xxxxx | 0 | 0 | 0 |
| 3406 | STD_OP | a | a | a | op4 | xxx | xx | 1 | xxxxx | 0 | 1 | 0 |
| 3405 | STD_OP | a | a | a | op3 | xxx | xx | 1 | xxxxx | 0 | 1 | 0 |
| 3404 | NO_POP_DEST | a | a | a | lco_copypen | xxx | xx | 0 | xxxxx | 0 | 0 | 0 |
| 3403 | STD_OP | a | a | a | op2 | xxx | xx | 1 | xxxxx | 0 | 0 | 0 |
| 3402 | STD_OP | a | a | a | op1 | xxx | xx | 1 | xxxxx | 1 | 0 | 0 |
| 3401 | STD_OP | a | a | a | op0 | xxx | xx | 1 | xxxxx | 1 | 0 | 0 |

Fig. 34A

Optimised Stream (subsequent pixels)

| STACK_OP | LAO_USE_D_OUT_S | LAO_USE_S_OUT_D | LAO_USE_S_ROP_D | COLOR_OP | ATTRI-BUTES | FILL TYPE | X_INDE-PENDENT | FILL INDEX | RE-STORE_0 | RE-STORE_1 | RE-STORE_3 |
|---|---|---|---|---|---|---|---|---|---|---|---|
| STD_OP | a | a | a | op7 | xxx | xx | 0 | xxxxx | 0 | 0 | 0 |
| POP_SRC | a | a | a | op6 | xxx | xx | 1 | xxxxx | 0 | 0 | 0 |
| POP_SRC | a | a | a | op5 | xxx | xx | 1 | xxxxx | 0 | 1 | 0 |
| STD_OP | a | a | a | op2 | xxx | xx | 0 | xxxxx | 0 | 0 | 0 |
| STD_OP | a | a | a | op1 | xxx | xx | 1 | xxxxx | 1 | 0 | 0 |

REDUCING THE NUMBER OF COMPOSITING OPERATIONS PERFORMED IN A PIXEL SEQUENTIAL RENDERING SYSTEM

FIELD OF THE INVENTION

The present invention relates generally to rendering graphic object based images. In particular, the present invention relates to reducing the number of compositing operations performed in a pixel sequential rendering system.

BACKGROUND

When a computer application provides data to a device for printing and/or display, an intermediate description of the page is often given to the device driver software in a page description language, such as PostScript or PCL, which provide descriptions of the objects to be rendered onto the page, rather than a raster image to be printed. Equivalently, a set of descriptions of graphics objects may be provided in function calls to a graphics interface, such as the Microsoft Windows GDI, or Unix's X-11. The page is typically rendered for printing and/or display by an object-based graphics system (or Raster Image Processor).

Most of these object based graphics systems utilize a large area of memory, known to the art as a frame store or a page buffer, to hold a pixel-based image of the page or screen for subsequent printing and/or display. Typically, the outlines of the graphic objects are calculated, filled and written into the frame store. For two-dimensional graphics, objects that appear in front of other objects are simply written into the frame store after the background objects, thereby replacing the background on a pixel by pixel basis. This is commonly known to the art as "Painter's algorithm". Objects are considered in priority order, from the rearmost object to the foremost object, and typically, each object is rasterized in scanline order and pixels are written to the framestore in sequential runs along each scanline. Some graphics interfaces allow a logical or arithmetic operation to be specified, to be performed between one or more graphics objects and the already rendered pixels in the frame buffer. In these cases the principle remains the same: objects (or groups of objects) are rasterized in scanline order, and the result of the specified operation is calculated and written to the framestore in sequential runs along each scanline.

There are essentially two problems with this technique. The first is that it requires fast random access to all of the pixels in the framestore. This is because each new object could affect any pixel in the frame store. For this reason, the frame store is normally kept in semiconductor random access memory (RAM). For high-resolution color printers the amount of RAM required is very large, typically in excess of 100 Mbytes, which is costly and difficult to run at high speed. The second problem is that many pixels, which are painted (rendered), are over-painted (re-rendered) by later objects. Painting these pixels with the earlier objects is a waste of time.

One method for overcoming the large frame-store problem is the use of "banding". When banding is used, only part of the framestore exists in memory at any one time. All of the objects to be drawn are retained in a "display list", which is an internal representation of the information required to draw the objects on the page. The display list is considered in object order as above, and only those pixel operations which fall within the fraction of the page which is held in the band are actually performed. After all objects in the display list have been drawn, the band is sent to the printer (or to intermediate storage) and the process is repeated for the next band of the page. There are some penalties with this technique, however. For example, the objects being drawn must be reconsidered many times, once for each band. As the number of bands increases, so does the repetitious examination of the objects requiring rendering. Also, the technique of banding does not solve the problem of the cost of over-painting.

Some other graphic systems consider the image in scan line order. Again, all of the objects on the page are retained in a display list. On each scanline the objects which intersect that scanline are then considered in priority order and for each object, spans of pixels between the intersection points of the object edges with the scanline are filled in a line store. This technique overcomes the large framestore problem, however it still suffers from the over-painting problem.

Other graphic systems utilise pixel-sequential rendering to overcome both the large framestore problem and the over-painting problem. In these systems, each pixel is generated in raster order. Again, all objects to be drawn are retained in a display list. On each scan line, the edges of objects, which intersect that scanline, are held in increasing order of their intersection with the scan line. These points of intersection, or edge crossings, are considered in turn, and used to toggle an array of fields that indicate the activity of the objects in the display list. There is one activity field for each object painting operation that is of interest on the scan line. There is also a field to indicate operations that do not require previously generated data. Between each pair of edges considered, the color data for each pixel, which lies between the first edge and the second edge, is generated by using a priority encoder on the activity flags to determine which operations are required to generate the color, and performing only those operations for the span of pixels between the two edges. In preparation for the next scanline, the coordinate of intersection of each edge is updated in accordance with the nature of each edge, and the edges are sorted into increasing order of intersection with that scanline. Any new edges are also merged into the list of edges.

Graphic systems which use pixel-sequential rendering have significant advantages in that there is no frame store or line store, no unnecessary over-painting, and the object priorities are dealt with in constant order time by the priority encoder, rather than in order N time, where N is the number of priorities.

However, it is still often necessary to perform several compositing operations to combine color from several different objects into a rendered pixel, and this can form a significant bottleneck in the overall rendering process.

SUMMARY

It is an object of the present invention to substantially overcome, or at least ameliorate, one or more disadvantages of existing arrangements.

According to one aspect of the invention, there is provided an apparatus for rendering an object-based image one pixel at a time in scanline order, the apparatus comprising: an optimisation module for minimising a number of compositing messages for compositing the object-based image, the optimisation module comprising: a first unit for setting, for a first pixel in a run of pixels between adjacent edges of one or two objects, first data in one or more compositing messages of a set of compositing messages to indicate a compositing result of these one or more compositing messages is to be stored for use in compositing of each pixel subsequent to the first pixel in the run of pixels; and a second unit for generating, for each pixel subsequent to the first pixel in the run of pixels, a reduced set of compositing messages from the set of compositing messages, the second unit comprising: a sub-unit for generating, for each pixel subsequent to the first pixel in the run of pixels, the reduced set of compositing messages; and a sub-unit for setting, for each pixel subsequent to the first pixel in the run of pixels, second data in one or more compositing messages of the reduced set to indicate the stored compositing result is to be retrieved for use in compositing of each pixel subsequent to the first pixel in the run of pixels; and a compositing module for generating a resultant color and opacity for a currently scanned pixel in accordance with the compositing messages, wherein the compositing module generates the color and opacity of the first pixel in the run of pixels in accordance with the set of compositing operations, and the compositing module generates the color and opacity of each pixel in the run subsequent to the first pixel in accordance with the reduced set and the retrieved result.

According to another aspect of the invention, there is provided a method for rendering an object-based image one pixel at a time in scanline order, the method comprising the steps of: an optimisation step for minimising a number of compositing messages for compositing the object-based image, the optimisation step comprising the sub-steps: a setting step for setting, for a first pixel in a run of pixels between adjacent edges of one or two objects, first data in one or more compositing messages of a set of compositing messages to indicate a compositing result of these one or more compositing messages is to be stored for use in compositing of each pixel subsequent to the first pixel in the run of pixels; and a generating step for generating, for each pixel subsequent to the first pixel in the run of pixels, a reduced set of compositing messages from the set of compositing messages, the generating step comprising: a generating sub-step for generating, for each pixel subsequent to the first pixel in the run of pixels, the reduced set of compositing messages; and a setting sub-step for setting, for each pixel subsequent to the first pixel in the run of pixels, second data in one or more compositing messages of the reduced set to indicate the stored compositing result is to be retrieved for use in compositing of each pixel subsequent to the first pixel in the run of pixels; and a compositing step for generating a resultant color and opacity for a currently scanned pixel in accordance with the compositing messages, wherein the compositing module generates the color and opacity of the first pixel in the run of pixels in accordance with the set of compositing operations, and the compositing module generates the color and opacity of each pixel in the run subsequent to the first pixel in accordance with the reduced set and the retrieved result.

Other aspects of the invention are also disclosed.

BRIEF DESCRIPTION OF THE DRAWINGS

One or more arrangements of the present invention will now be described with reference to the drawings, in which:

FIGS. 12C to 12J illustrate the edge update routine implemented by the arrangement of FIG. 4 for the example of FIG. 8A;

FIGS. 13A and 13B illustrate the odd-even and non-zero winding fill rules;

FIGS. 14A to 14E illustrate how large changes in X coordinates contribute to spill conditions and how they are handled;

FIGS. 15A to 15E illustrates the priority filling routine implemented by the arrangement of FIG. 5;

FIGS. 16A to 16D provide a comparison between two prior art edge description formats and that used in the preferred apparatus;

FIG. 18 depicts the priority properties and status table of the priority determination module of FIG. 3;

FIG. 19 shows a table of a number of raster operations;

FIGS. 20A and 20B shows a table of the principal compositing operations and their corresponding raster operations and opacity flags;

FIGS. 30A and 30B compares the original sequence of fill priority messages for a first pixel with the optimised sequence of fill priority messages for subsequent pixels in accordance with the first arrangement of the optimisation module 550;

FIGS. 31A and 31B compares the original sequence of fill priority messages for a first pixel with the optimised sequence of fill priority messages for subsequent pixels in accordance with the second arrangement of the optimisation module 550;

FIGS. 32A and 32B compares the original sequence of fill priority messages for a first pixel with the optimised sequence of fill priority messages for subsequent pixels in accordance with the third arrangement of the optimisation module 550;

FIGS. 33A and 33B compares the original sequence of fill priority messages for a first pixel with the optimised sequence of fill priority messages for subsequent pixels in accordance with the fourth arrangement of the optimisation module 550; and FIGS. 34A and 34B compares the original sequence of fill priority messages for a first pixel with the optimised sequence of fill priority messages for subsequent pixels in accordance with the fifth arrangement of the optimisation module 550.

DETAILED DESCRIPTION INCLUDING BEST MODE

Figure 1:
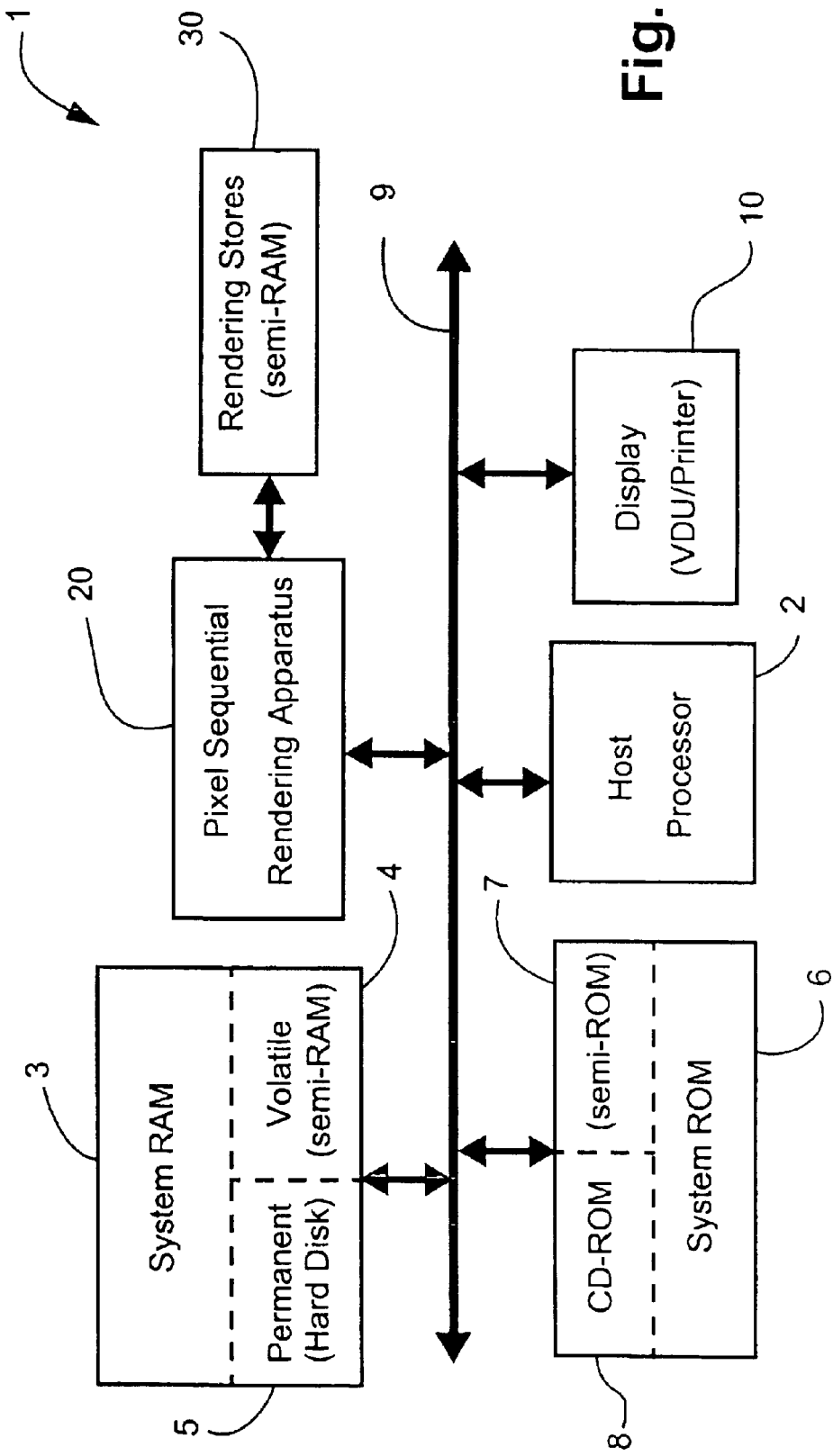
FIG. 1 is a schematic block diagram representation of a computer system incorporating the preferred arrangement.

Where reference is made in any one or more of the accompanying drawings to steps and/or features, which have the same reference numerals, those steps and/or features have for the purposes of this description the same function(s) or operation(s), unless the contrary intention appears.

For a better understanding of the pixel sequential rendering system 1, a brief overview of the system is first undertaken in Section 1.0. Then follows a brief discussion in Section 2.0 of the driver software for interfacing between a third party software application and the pixel sequential rendering apparatus 20 of the system. A brief overview of the pixel sequential rendering apparatus 20 is then discussed in Section 3.0. As will become apparent, the pixel sequential rendering apparatus 20 comprises an instruction execution module 300; an edge tracking module 400; a priority determination module 500; an optimisation module 550, a fill color determination module 600; a pixel compositing module 700; and a pixel output module 800. A brief overview of these modules is described in Sections 3.1 to 3.7. A more detailed description of the optimisation module 550 and pixel compositing module 700 then follows in sections 4.0 to 4.5, and 5.0.

The general principles of the invention have application in reducing the number of compositing operations being performed in a pixel sequential rendering system. This is realised in the preferred system in the optimisation module 550 and pixel compositing module 700, which are described in more detail in Sections 4.0, 4.1, 4.2, 4.3, 4.4, 4.5 and 5.0.

1.0 OVERVIEW OF PIXEL SEQUENTIAL RENDERING SYSTEM

FIG. 1 illustrates schematically a computer system 1 configured for rendering and presentation of computer graphic object images. The system includes a host processor 2 associated with system random access memory (RAM) 3, which may include a non-volatile hard disk drive or similar device 5 and volatile, semiconductor RAM 4. The system 1 also includes a system read-only memory (ROM) 6 typically founded upon semiconductor ROM 7 and which in many cases may be supplemented by compact disk devices (CD ROM) 8. The system 1 may also incorporate some means 10 for displaying images, such as a video display unit (VDU) or a printer, both, which operate in raster fashion.

The above-described components of the system 1 are interconnected via a bus system 9 and are operable in a normal operating mode of computer systems well known in the art, such as IBM PC/AT type personal computers and arrangements evolved therefrom, Sun Sparcstations and the like.

Figure 3:
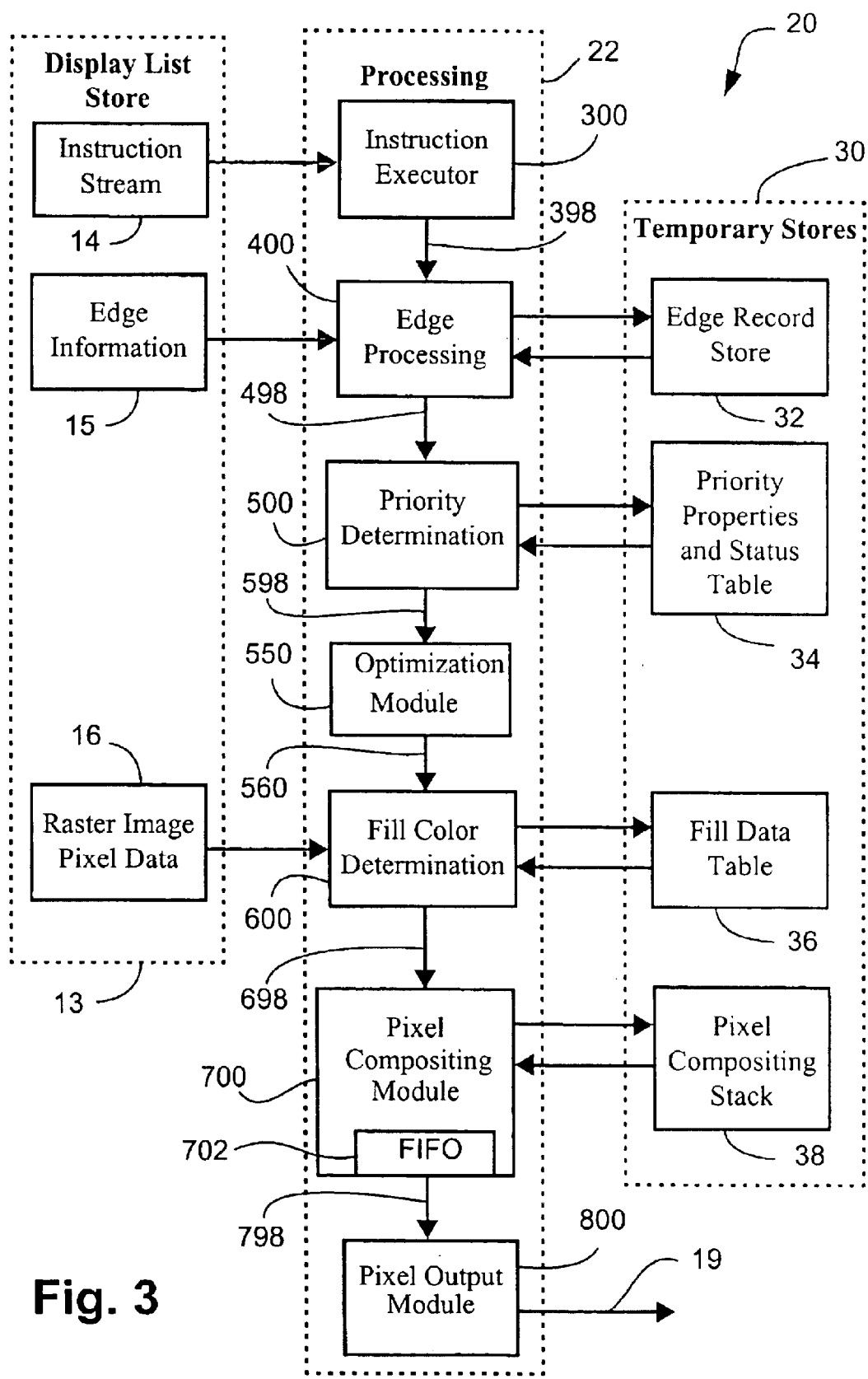
FIG. 3 is a schematic block diagram representation of the pixel sequential rendering apparatus and associated display list and temporary stores of the preferred arrangement.

Also seen in FIG. 3, a pixel sequential rendering apparatus 20 connects to the bus 9, and in the preferred arrangement is configured for the sequential rendering of pixel-based images derived from graphic object-based descriptions supplied with instructions and data from the system 1 via the bus 9. The apparatus 20 may utilise the system RAM 3 for the rendering of object descriptions although preferably the rendering apparatus 20 may have associated therewith a dedicated rendering store arrangement 30, typically formed of semiconductor RAM.

The pixel sequential renderer operates generally speaking in the following manner. A render job to be rendered is given to the driver software by third party software for supply to the pixel sequential renderer. The render job is typically in a page description language or in a sequence of function calls to a standard graphics API, which defines an image comprising objects placed on a page from a rearmost object to a foremost object to be composited in a manner defined by the render job. The driver software converts the render job to an intermediate render job, which is then fed to the pixel sequential renderer. The pixel sequential renderer generates the color and opacity for the pixels one at a time in raster scan order. At any pixel currently being scanned and processed, the pixel sequential renderer composites only those exposed objects that are active at the currently scanned pixel. The pixel sequential render determines that an object is active at a currently scanned pixel if that pixel lies within the boundary of the object. The pixel sequential renderer achieves this by reference to a fill counter associated with that object. The fill counter keeps a running fill count that indicates whether the pixel lies within the boundary of the object. When the pixel sequential renderer encounters an edge associated with the object it increments or decrements the fill count depending upon the direction of the edge. The renderer is then able to determine whether the current pixel is within the boundary of the object depending upon the fill count and a predetermined winding count rule. The pixel sequential renderer determines whether an active object is exposed with reference to a flag associated with that object. This flag associated with an object indicates whether or not the object obscures lower order objects. That is, this flag indicates whether the object is partially transparent, and in which case the lower order active objects will thus make a contribution to the color and opacity of the current pixel. Otherwise, this flag indicates that the object is opaque in which case active lower order objects will not make any contribution to the color and opacity of the currently scanned pixel. The pixel sequential renderer determines that an object is exposed if it is the uppermost active object, or if all the active objects above the object have their corresponding flags set to transparent. The pixel sequential renderer then composites these exposed active objects to determine and output the color and opacity for the currently scanned pixel.

The driver software, in response to the page, also extracts edge information defining the edges of the objects for feeding to the edge tracking module. The driver software also generates a linearised table (herein after called the priority properties and status table) of the expression tree of the objects and their compositing operations which is fed to the priority determination module. The priority properties and status table contains one record for each object on the page. In addition, each record contains a field for storing a pointer to an address for the fill of the corresponding object in a fill table. This fill table is also generated by the driver software and contains the fill for the corresponding objects, and is fed to tile fill determination module. The priority properties and status table together with the fill table are devoid of any edge information and effectively represent the objects, where the objects are infinitively extending. The edge information is fed to the edge tracking module, which determines, for each pixel in raster scan order, the edges of any objects that intersect a currently scanned pixel. The edge tracking module passes this information onto the priority determination module. Each record of the priority properties and status table contains a counter, which maintains a fill count associated with the corresponding object of the record. The priority determination module processes each pixel in a raster scan order. Initially, the fill counts associated with all the objects are zero, and so all objects are inactive. The priority determination module continues processing each pixel until it encounters an edge intersecting that pixel. The priority determination module updates the fill count associated with the object of that edge, and so that object becomes active. The priority determination continues in this fashion updating the fill count of the objects and so activating and de-activating the objects. The priority determination module also determines whether active objects are exposed or not, and consequently whether they make a contribution to the currently scanned pixel. In the event that they do, the pixel determination module generates a series of messages which ultimately instructs the pixel compositing module to composite the color and opacity for these exposed active objects in accordance with the compositing operations specified for these objects in the priority properties and status table so as to generate the resultant color and opacity for the currently scanned pixel. These series of messages do not at that time actually contain the color and opacity for that object but rather an address to the fill table, which the fill determination module uses to determine the color and opacity of the object.

For ease of explanation the location (viz level) of the object in the order of the objects from the rearmost object to the foremost is herein referred to as the object's priority. Preferably, a number of non-overlapping objects that have the same fill and compositing operation, and that form a contiguous sequence in the order of the objects, may be designated as having the same priority. Most often, only one priority (viz level) is required per object, however some objects may require several instructions, and thus the object may require several priorities (viz levels). For example, a character with a color fill may be represented by, a bounding box (B) on a first level having the color fill, a one-bit bitmap (S) which provides the shape of the character on a second level, and the same bounding box (B) on a third level having the color fill, where the levels are composited together ((B xor Page) and S) xor B to produce the color character.

The pixel sequential renderer also utilises clip objects to modify the shape of another object. The pixel sequential renderer maintains an associated clip count for the clip in a somewhat similar fashion to the fill count to determine whether the current pixel is within the clip region.

As will become apparent, there exist runs of pixels having constant color and opacity between adjacent edges. The pixel sequential renderer can composite the color and opacity for the first pixel in the run and in subsequent pixels in the run reproduce the previous composited color and opacity without any further compositions, thus reducing the overall number of compositing operations. In the circumstances where a run of pixels comprises varying color and opacity at one or more priority levels, this technique cannot be used. However, in the latter case the preferred arrangements are still able to minimise the number of compositing operations, as will be described below in more detail.

2.0 Overview of Software Driver

A software program (hereafter referred to as the driver), is loaded and executed on the host processor 2 for generating instructions and data for the pixel-sequential graphics rendering apparatus 20, from data provided to it by a third-party application. Said third-party application may provide data in the form of a standard language description of the objects to be drawn on the page, such as PostScript and PCL, or in the form of function calls to the driver through a standard software interface, such as the Windows GDI or X-11.

The driver software separates the data associated with an object (supplied by the third-party application) into data about the edges of the object, any operation or operations associated with painting the object onto the page, and the color and opacity with which to fill pixels which fall inside the edges of the object.

The driver software partitions the edges of each object into edges which are monotonic increasing in the Y-direction, and then divides each partitioned edge of the object into segments of a form suitable for the edge module described below. Partitioned edges are sorted by the X-value of their starting positions and then by Y. Groups of edges starting at the same Y-value remain sorted by X-value, and may be concatenated together to form a new edge list, suitable for reading in by the edge module when rendering reaches that Y-value.

The driver software sorts the operations, associated with painting objects, into priority order, and generates instructions to load the data structure associated with the priority determination module (described below). This structure includes a field for the fill rule, which describes the topology of how each object is activated by edges, a field for the type of fill which is associated with the object, being painted, and a field, to identify whether data on levels below the current object is required by the operation. There is also a field, herein called clip count, that identifies an object as a clipping object, that is, as an object which is not, itself, filled, but which enables or disables filling of other objects on the page.

The driver software also prepares a data structure (the fill table) describing how to fill objects, said fill table is indexed by the data structure in the priority determination module. This allows several levels in the priority determination module to refer to the same fill data structure.

The driver software assembles the aforementioned data into a job containing instructions for loading the data and rendering pixels, in a form that can be read by the rendering system, and transfers the assembled job to the rendering system. This may be performed using one of several methods known to the art, depending on the configuration of the rendering system and its memory.

3.0 OVERVIEW OF PIXEL SEQUENTIAL RENDERING APPARATUS

Figure 2:
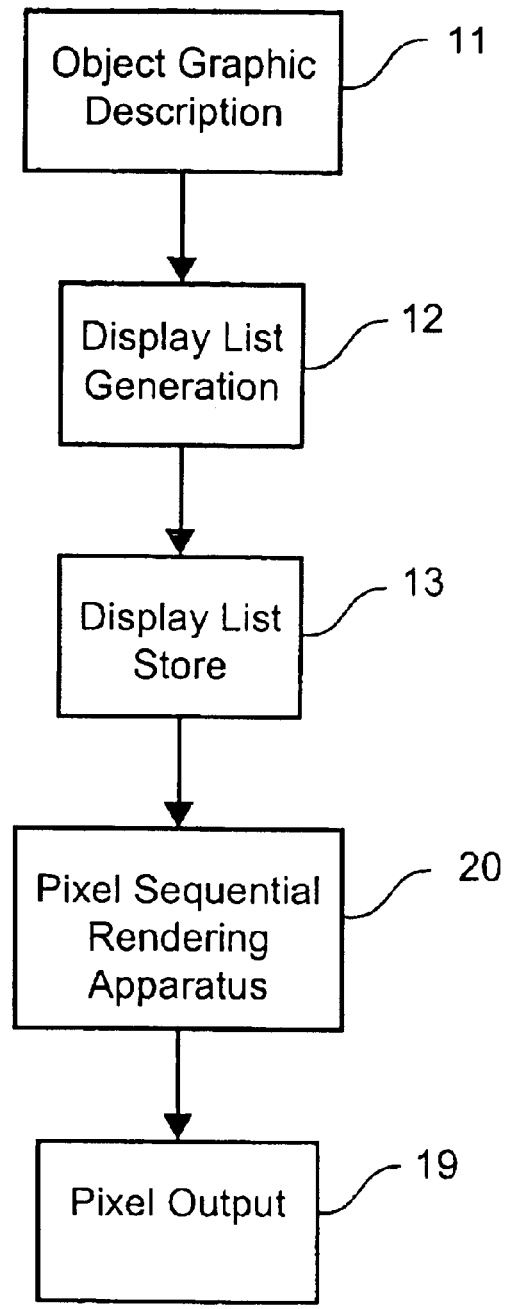
FIG. 2 is a block diagram showing the functional data flow of the preferred arrangement.

Referring now to FIG. 2, a functional data flow diagram of the preferred arrangement is shown. The functional flow diagram of FIG. 2 commences with an object graphic description 11 which is used to describe those parameters of graphic objects in a fashion appropriate to be generated by the host processor 2 and/or, where appropriate, stored within the system RAM 3 or derived from the system ROM 6, and which may be interpreted by the pixel sequential rendering apparatus 20 to render therefrom pixel-based images. For example, the object graphic description 11 may incorporate objects with edges in a number of formats including straight edges (simple vectors) that traverse from one point on the display to another, or an orthogonal edge format where a two-dimensional object is defined by a plurality of edges including orthogonal lines. Further formats, where objects are defined by continuous curves are also appropriate and these can include quadratic polynomial fragments where a single curve may be described by a number of parameters which enable a quadratic based curve to be rendered in a single output space without the need to perform multiplications. Further data formats such as cubic splines and the like may also be used. An object may contain a mixture of many different edge types. Typically, common to all formats are identifiers for the start and end of each line (whether straight or curved) and typically, these are identified by a scan line number thus defining a specific output space in which the curve may be rendered.

For example, FIG. 16A shows a prior art edge description of an edge 600 that is required to be divided into two segments 601 and 602 in order for the segments to be adequately described and rendered. This arises because the prior art edge description, whilst being simply calculated through a quadratic expression, could not accommodate an inflexion point 604. Thus the edge 600 was dealt with as two separate edges having end points 603 and 604, and 604 and 605 respectively. FIG. 16B shows a cubic spline 610 that is described by endpoints 611 and 612, and control points 613 and 614. This format requires calculation of a cubic polynomial for render purposes and thus is expensive of computational time.

FIGS. 16C and 16D show examples of edges applicable to the preferred arrangement. In the preferred arrangement, a edge is considered as a single entity and if necessary, is partitioned to delineate sections of the edge that may be described in different formats, a specific goal of which is to ensure a minimum level of complexity for the description of each section.

In FIG. 16C, a single edge 620 is illustrated spanning between scanlines A and M. An edge is described by a number of parameters including start_x, start_y, one or more segment descriptions that include an address that points to the next segment in the edge, and a finish segment used to terminate the edge. According to the preferred arrangement, the edge 620 may be described as having three step segments, a vector segment, and a quadratic segment. A step segment is simply defined as having a x-step value and a y-step value. For the three step segments illustrated, the segment descriptions are [0,2], [+2,2], and [+2,0]. Note that the x-step value is signed thereby indicating the direction of the step, whilst the y-step value is unsigned as such is always in a raster scan direction of increasing scalene value. The next segment is a vector segment which typically requires parameters start_x (X), start_y (Y), num_of_scanlines (NY) and slope (DX). In this example, because the vector segment is an intermediate segment of the edge 620, the start_x and start_y may be omitted because such arise from the preceding segment(s). The parameter num_of_scanlines (NY) indicates the number of scanlines the vector segment lasts. The slope value (DX) is signed and is added to the x-value of a preceding scanline to give the x-value of the current scanline, and in the illustrated case, DX=+1. The next segment is a quadratic segment which has a structure corresponding to that of the vector segment, but also a second order value (DDX) which is also signed and is added to DX to alter the slope of the segment.

FIG. 16D shows an example of a cubic curve according the preferred arrangement which includes a description corresponding to the quadratic segment save for the addition of a signed third-order value (DDDX), which is added to DDX to vary the rate of change of slope of the segment. Many other orders may also be implemented.

It will be apparent from the above that the ability to handle plural data formats describing edge segments allows for simplification of edge descriptions and evaluation, without reliance on complex and computationally expensive mathematical operations. In contrast, in the prior art system of FIG. 16A, all edges, whether, orthogonal, vector or quadratic were required to be described by the quadratic form.

Figures 8A, 8B:
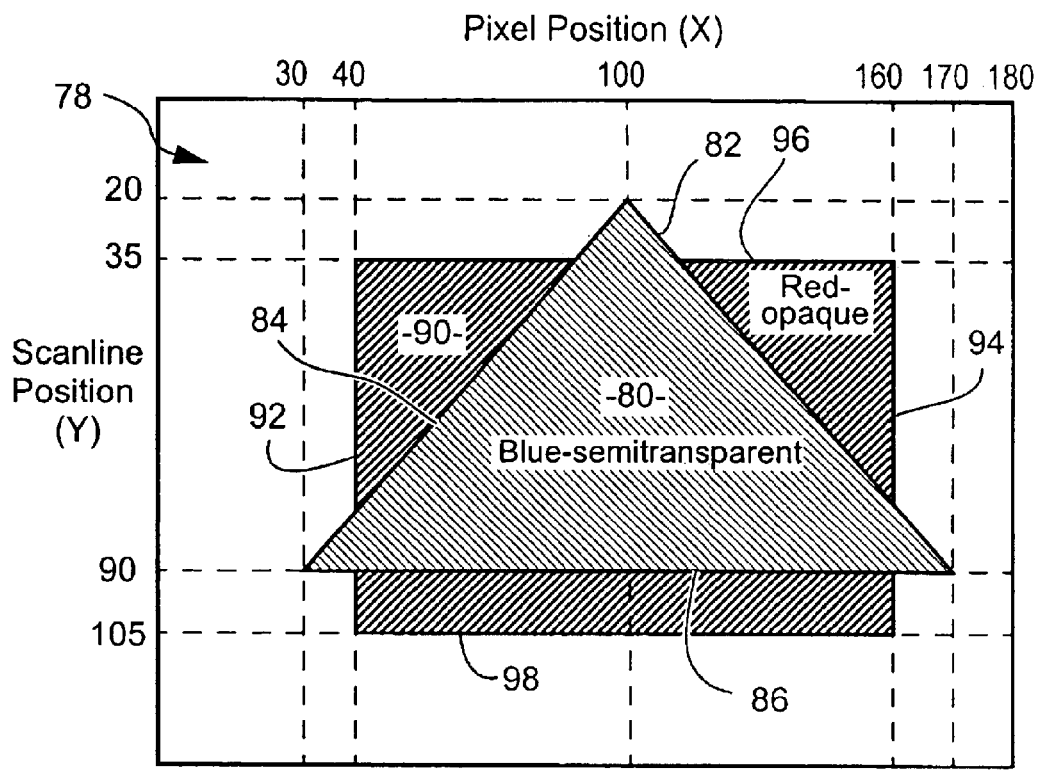
FIG. 8A illustrates a two-object image used as an example for explaining the operation of the preferred arrangement.
FIG. 8B shows a table of a number of edge records of the two-object image shown in FIG. 8A.
Figure 9A:
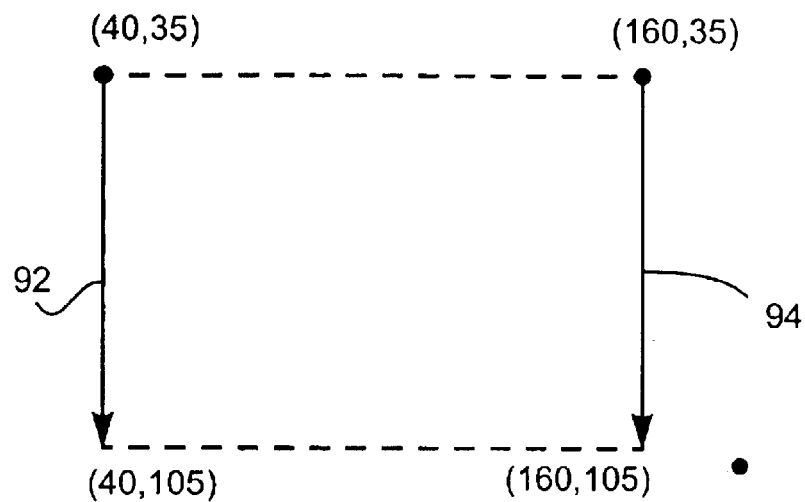
FIGS. 9A and 9B illustrate the vector edges of the objects of FIG. 8A.

The operation of the preferred arrangement will be described with reference to the simple example of rendering an image 78 shown in FIG. 8 which is seen to include two graphical objects, in particular, a partly transparent blue-colored triangle 80 rendered on top of and thereby partly obscuring an opaque red colored rectangle 90. As seen, the rectangle 90 includes side edges 92, 94, 96 and 98 defined between various pixel positions (X) and scan line positions (Y). Because the edges 96 and 98 are formed upon the scan lines (and thus parallel therewith), the actual object description of the rectangle 90 can be based solely upon the side edges 92 and 94, such as seen in FIG. 9A. In this connection, edge 92 commences at pixel location (40,35) and extends in a raster direction down the screen to terminate at pixel position (40,105). Similarly, the edge 94 extends from pixel position (160,35) to position (160,105). The horizontal portions of the rectangular graphic object 90 may be obtained merely by scanning from the edge 92 to the edge 94 in a rasterised fashion.

The blue triangular object 80 however is defined by three object edges 82, 84 and 86, each seen as vectors that define the vertices of the triangle. Edges 82 and 84 are seen to commence at pixel location (100,20) and extend respectively to pixel locations (170,90) and (30,90). Edge 86 extends between those two pixel locations in a traditional rasterised direction of left to right. In this specific example because the edge 86 is horizontal like the edges 96 and 98 mentioned above, it is not essential that the edge 86 be defined. In addition to the starting and ending pixel locations used to describe the edges 82 and 84, each of these edges will have associated therewith the slope value in this case +1 and −1 respectively.

Returning to FIG. 2, having identified the data necessary to describe the graphic objects to the rendered, the graphic systems 1 then performs a display list generation step 12.

The display list generation 12 is preferably implemented as a software driver executing on the host processor 2 with attached ROM 6 and RAM 3. The display list generation 12 converts an object graphics description, expressed in any one or more of the well known graphic description languages, graphic library calls, or any other application specific format, into a display list. The display list is typically written into a display list store 13, generally formed within the RAM 4 but which may alternatively be formed within the rendering stores 30. As seen in FIG. 3, the display list store 13 can include a number of components, one being an instruction stream 14, another being edge information 15 and where appropriate, raster image pixel data 16.

The instruction stream 14 includes code interpretable as instructions to be read by the pixel sequential rendering apparatus 20 to render the specific graphic objects desired in any specific image. For the example of the image shown in FIG. 8, the instruction stream 14 could be of the form of:

(1) render (nothing) to scan line 20;

(2) at scan line 20 add two blue edges 82 and 84;

(3) render to scan line 35;

(4) at scan line 35 add two red edges 92 and 94; and (5) render to completion.

Similarly, the edge information 15 for the example of FIG. 8 may include the following:

(i) edge 84 commences at pixel position 100, edge 82 commences at pixel position 100;

(ii) edge 92 commences at pixel position 40, edge 94 commences at pixel position 160;

(iii) edge 84 runs for 70 scan lines, edge 82 runs for 70 scanlines;

(iv) edge 84 has slope=−1, edge 84 has slope=+1;

(v) edge 92 has slope=0 edge 94 has slope=0.

(vi) edges 92 and 94 each run for 70 scanlines.

It will be appreciated from the above example of the instruction stream 14 and edge information 15 and the manner in which each are expressed, that in the image 78 of FIG. 8, the pixel position (X) and the scanline value (Y) define a single output space in which the image 78 is rendered. Other output space configurations however can be realised using the principles of the present disclosure.

FIG. 8 includes no raster image pixel data and hence none need be stored in the store portion 16 of the display list 13, although this feature will be described later.

The display list store 13 is read by a pixel sequential rendering apparatus 20, which is typically implemented as an integrated circuit. The pixel sequential rendering apparatus 20 converts the display list into a stream of raster pixels which can be forwarded to another device, for example, a printer, a display, or a memory store.

Although the preferred arrangement describes the pixel sequential rendering apparatus 20 as an integrated circuit, it may be implemented as an equivalent software module executing on a general purpose processing unit, such as the host processor 2.

FIG. 3 shows the configuration of the pixel sequential rendering apparatus 20, the display list store 13 and the temporary rendering stores 30. The processing stages 22 of the pixel-sequential render apparatus 20 include an instruction executor 300, an edge processing module 400, a priority determination module 500, an optimisation module 550, a fill color determination module 600, a pixel compositing module 700, and a pixel output module 800. The processing operations use the temporary stores 30 which as noted above, may share the same device (eg. magnetic disk or semiconductor RAM) as the display list store 13, or may be implemented as individual stores for reasons of speed optimisation. The edge processing module 400 uses an edge record store 32 to hold edge information which is carried forward from scan-line to scan-line. The priority determination module 500 uses a priority properties and status table 34 to hold information about each priority, and the current state of each priority with respect to edge crossings while a scan-line is being rendered. The fill color determination module 600 uses a fill data table 36 to hold information required to determine the fill color of a particular priority at a particular position. The pixel compositing module 700 uses a pixel compositing stack 38 to hold intermediate results during the determination of an output pixel that requires the colors from multiple priorities to determine its value.

The display list store 13 and the other stores 32–38 detailed above may be implemented in RAM or any other data storage technology.

The processing steps shown in the arrangement of FIG. 3 take the form of a processing pipeline 22. In this case, the modules of the pipeline may execute simultaneously on different portions of image data in parallel, with messages passed between them as described below. In another arrangement, each message described below may take the form of a synchronous transfer of control to a downstream module, with upstream processing suspended until the downstream module completes the processing of the message.

3.1 OVERVIEW OF INSTRUCTION EXECUTOR

The instruction executor 300 reads and processes instructions from the instruction stream 14 and formats the instructions into messages that transferred via an output 398 to the other modules 400, 500, 550, 600 and 700 within the pipeline 22. In the preferred arrangement, the instruction stream 13 may include the instructions:

LOAD_PRIORITY_PROPERTIES: This instruction is associated with data to be loaded into the priority properties and status table 34, and an address in that table to which the data is to be loaded. When this instruction is encountered by the instruction executor 300, the instruction executor 300 issues a message for the storage of the data in the specified location of the priority properties and status table 34. This may be accomplished by formatting a message containing this data and passing it down the processing pipeline 22 to the priority determination module 500 which performs the store operation.

LOAD_FILL_DATA: This instruction is associated with fill data associated with an object to be loaded into the fill data table 36, and an address in that table to which the data is to be loaded. When this instruction is encountered by the instruction executor 300, the instruction executor 300 issues a message for the storage of the data at the specified address of the fill data table 36. This may be accomplished by formatting a message containing this data and passing it down the processing pipeline 22 to the fill color determination module which performs the store operation.

LOAD_NEW_EDGES_AND_RENDER: This instruction is associated with an address in the display list store 13 of new edges 15 which are to be introduced into the rendering process when a next scanline is rendered. When this instruction is encountered by the instruction executor, the instruction executor 300 formats a message containing this data and passes it to the edge processing module 400.

The edge processing module 400 store the address of the new edges in the edge record store 32. The edges at the specified address are sorted on their initial scanline intersection coordinate before the next scanline is rendered. In one arrangement, they are sorted by the display list generation process 12. In another arrangement, they are sorted by the pixel-sequential rendering apparatus 20.

SET_SCANLINE_LENGTH: This instruction is associated with a number of pixels which are to be produced in each rendered scanline. When this instruction is encountered by the instruction executor 300, the instruction executor 300 passes the value to the edge processing module 400 and the pixel compositing module 700.

SET_OPACITY_MODE: This instruction is associated with a flag, which indicates whether pixel compositing operations will use an opacity channel (also known in the art as an alpha channel). When this instruction is encountered by the instruction executor 300, the instruction executor 300 passes the flag value in the pixel compositing module 700.

SET_BUF: This instruction sets the address of external memory buffers used by the pixel sequential rendering apparatus 20. Preferably, at least the input, output and spill buffers of the edge processing module 400 are stored in external memory.

The instruction executor 300 is typically formed by a microcode state machine that maps instructions and decodes them into pipeline operations for passing to the various modules. A corresponding software process may alternatively be used.

3.2 OVERVIEW OF EDGE TRACKING MODULE

Figure 4:
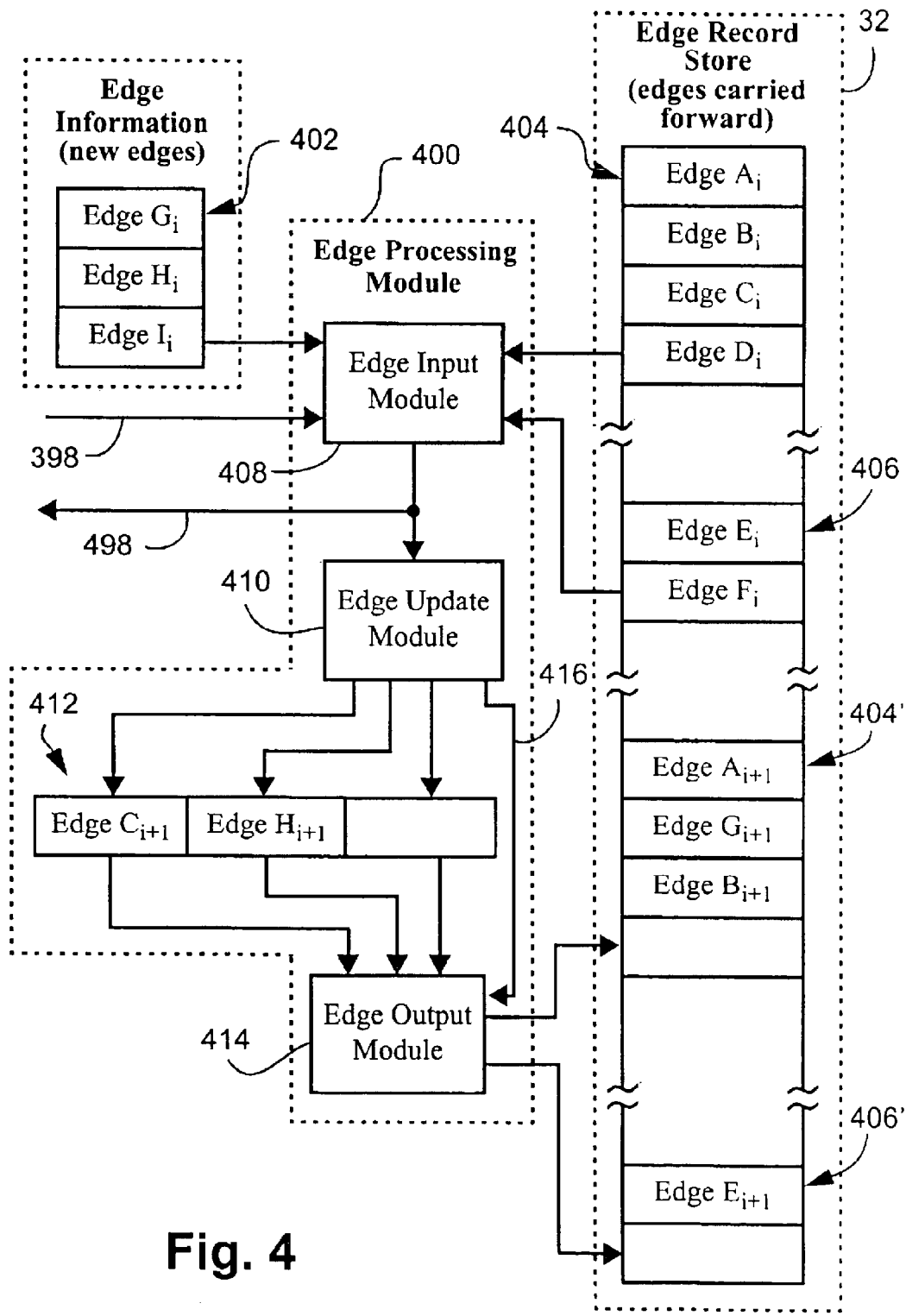
FIG. 4 is a schematic functional representation of the edge processing module of FIG. 3.

The operation of the edge processing module 400 during a scanline render operation will now be described with reference to FIG. 4. The initial conditions for the rendering of a scanline is the availability of three lists of edge records. Any or all of these lists may be empty. These lists are a new edge list 402, obtained from the edge information 15 and which contains new edges as set by the LOAD_NEW_EDGES_AND_RENDER instruction, a main edge list 404 which contains edge records carried forward from the previous scanline, and a spill edge list 406 which also contains edge records carried forward from the previous scanline.

Figure 12A:
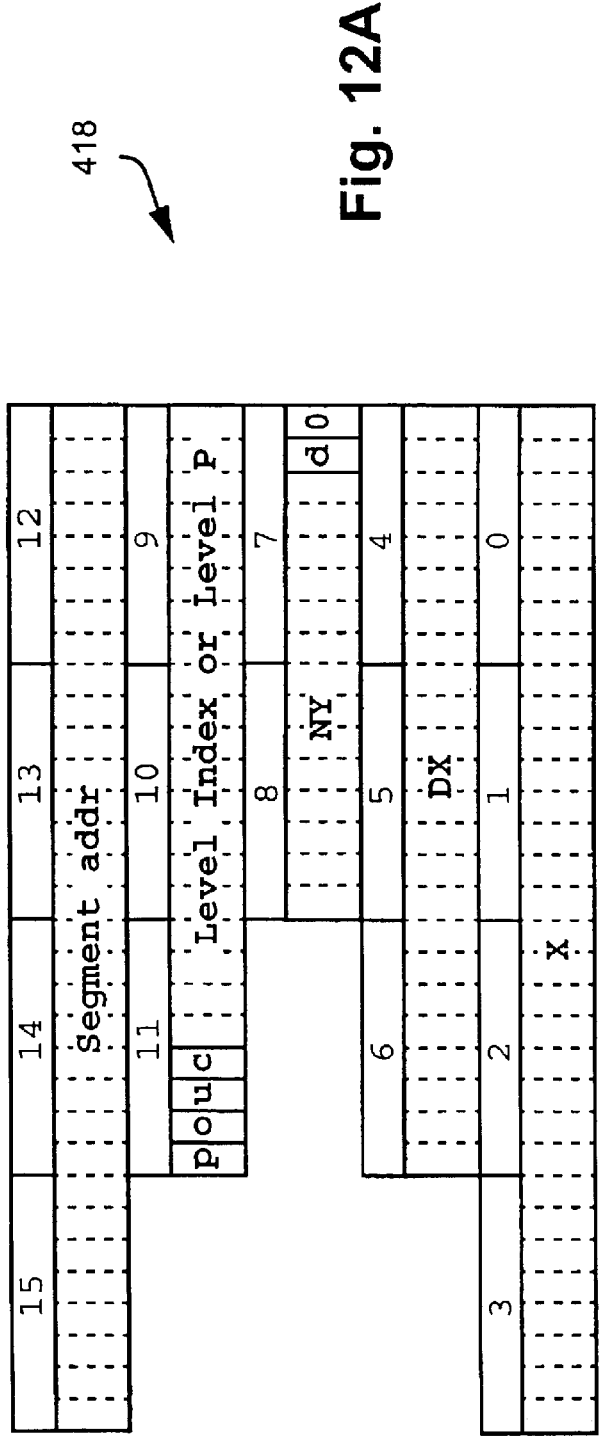
FIG. 12A depicts the format of an active edge record created by the edge processing module 400 of FIG. 4.

Turning now to FIG. 12A, there is shown the format of such an edge record, which may include:

(i) a current scanline intersection coordinate (referred to here as the X coordinate), (ii) a count (referred to herein as NY) of how many scanlines a current segment of this edge will last for (in some arrangements this may be represented as a Y limit), (iii) a value to be added to the X coordinate of this edge record after each scanline (referred to here as the DX), (iv) a priority number (P) or an index (P) to a list of priority numbers, (v) an address (addr) of a next edge segment in the list; and (vi) a number of flags, marked p, o, u, c and d. The flag d determines whether the edge effects the clipping counter or the fill counter. The flag u determines whether the fill counter is incremented or decremented by the edge. The remaining flags are not essential to the invention and will not be further described.

Such a format may accommodate vectors, and orthogonally arranged edges. The format may also include a further parameter herein called DDX, which is a value to be added to the DX of this edge record after each scanline. The latter enables the rendering of edges comprising quadratic curves. The addition of further parameters, DDDX for example, may allow such an arrangement to accommodate cubic curves. In some applications, such as cubic Bezier spline, a 6-order polynomial (ie: up to DDDDDDX) may be required. The flag (u) indicates whether a winding count is to be incremented or decremented by an edge. The winding count is stored in a fill counter and is used to determine whether a currently scanned pixel is inside or outside the object in question. In the example of the edges 84 and 94 of FIG. 8A, the corresponding edge records at scanline 20 could read as shown in the Table of FIG. 8B.

In this description, coordinates which step from pixel to pixel along a scanline being generated by the rendering process will be referred to as X coordinates, and coordinates which step from scanline to scanline will be referred to as Y coordinates. Preferably, each edge list contains zero or more records placed contiguously in memory. Other storage arrangements, including the use of pointer chains, are also possible. The records in each of the three lists 402, 404 and 406 are arranged in order of scanline intersection (X) coordinate. This is typically obtained by a sorting process, initially managed by an edge input module 408 which receives messages, including edge information, from the instruction executor 300. It is possible to relax the sort to only regard the integral portion of each scanline intersection coordinate as significant. It is also possible to relax the sort further by only regarding each scanline intersection coordinate, clamped to the minimum and maximum X coordinates which are being produced by the current rendering process. Where appropriate, the edge input module 408 relay messages to modules 500, 600 and 700 downstream in the pipeline 22 via an output 498.

The edge input module 408 maintains references into and receives edge data from each of the three lists 402, 404, and 406. Each of these references is initialised to refer to the first edge in each list at the start of processing of a scanline. Thereafter, the edge input module 408 selects an edge record from one of the three referenced edge records such that the record selected is the one with the least X coordinate out of the three referenced records. If two or more of the X-records are equal, each is processed in any order and the corresponding edge crossings output in the following fashion. The reference, which was used to select that record, is then advanced to the next record in that list. The edge just selected is formatted into a message and sent to an edge update module 410. Also, certain fields of the edge, in particular the current X, the priority numbers, and the direction flag, are formatted into a message which is forwarded to the priority determination module 500 as an output 498 of the edge processing module 400. Arrangements that use more or fewer lists than those described here are also possible.

Upon receipt of an edge, the edge update module 410 decrements the count of how many scanlines for which a current segment will last. If that count has reached zero, a new segment is read from the address indicated by the next segment address. A segment preferably specifies:

(i) a value to add to the current X coordinate immediately the segment is read, (ii) a new DX value for the edge, (iii) a new DDX value for the edge, and (iv) a new count of how many scanlines for which the new segment will last.

If there is no next segment available at the indicated address, no further processing is performed on that edge.

Otherwise, the edge update module 410 calculates the X coordinate for the next scanline for the edge. This typically would involve taking the current X coordinate and adding to it the DX value. The DX may have the DDX value added to it, as appropriate for the type of edge being handled. The edge is then written into any available free slot in an edge pool 412, which is an array of two or more edge records. If there is no free slot, the edge update module 410 waits for a slot to become available. Once the edge record is written into the edge pool 412, the edge update module 410 signals via a line 416 to an edge output module 414 that a new edge has been added to the edge pool 412.

As an initial condition for the rendering of a scanline, the edge output module 414 has references to each of a next main edge list 404' and a next spill edge list 406'. Each of these references is initialised to the location where the, initially empty, lists 404' and 406' may be built up. Upon receipt of the signal 416 indicating that an edge has been added to the edge pool 412, the edge output module 414 determines whether or not the edge just added has a lesser X coordinate than the edge last written to the next main edge list 404' (if any). If this is true, a "spill" is said to have occurred because the edge cannot be appended to the main edge list 404 without violating its ordering criteria. When a spill occurs, the edge is inserted into the next spill edge list 406', preferably in a manner that maintains a sorted next spill edge list 406'. For example this may be achieve using a insertion sorting routine. In some arrangements the spills may be triggered by other conditions, such as excessively large X coordinates.

If the edge added to the edge pool 412 has an X coordinate greater than or equal to the edge last written to the next main edge list 404' (if any), and there are no free slots available in the edge pool 412, the edge output module 414 selects the edge from the edge pool 412 which has the least X coordinate, and appends that edge to the next main edge list 404', extending it in the process. The slot in the edge pool 412 that was occupied by that edge is then marked as free.

Once the edge input module 408 has read and forwarded all edges from all three of its input lists 402, 404 and 406, it formats a message which indicates that the end of scanline has been reached and sends the message to both the priority determination module 500 and the edge update module 410. Upon receipt of that message, the edge update module 410 waits for any processing it is currently performing to complete, then forwards the message to the edge output module 414. Upon receipt of the message, the edge output module 414 writes all remaining edge records from the edge pool 412 to the next main edge list 404' in X order. Then, the reference to the next main edge list 404' and the main edge list 404 are exchanged between the edge input module 408 and the edge output module 414, and a similar exchange is performed for the next spill edge list 406' and the spill edge list 406. In this way the initial conditions for the following scanline are established.

Rather than sorting the next spill edge list 406' upon insertion of edge records thereto, such edge records may be merely appended to the list 406', and the list 406' sorted at the end of the scanline and before the exchange to the current spill list 406 becomes active in edge rasterisation of the next scanline.

It can be deduced from the above that edge crossing messages are sent to the priority determination module 500 in scanline and pixel order (that is, they are ordered firstly on Y and then on X) and that each edge crossing message is labelled with the priority to which it applies.

FIG. 12A depicts a specific structure of an active edge record 418 that may be created by the edge processing module 400 when a segment of an edge is received. If the first segment of the edge is a step (orthogonal) segment, the X-value of the edge is added to a variable called "X-step" for the first segment to obtain the X position of the activated edge. Otherwise, the X-value of the edge is used. The Xstep value is obtained from the segment data of the edge and is added once to the Xedge value of the next segment to obtain the X position of the edge record for that next segment. This means that the edges in the new edge record will be sorted by Xedge+Xstep. The Xstep of the first segment should, therefore, be zero, in order to simplify sorting the edges. The Y-value of the first segment is loaded into the NY field of the active edge record 418. The DX field of the active edges copied from the DX field identifier of vector or quadratic segments, and is set to zero for a step segment. A u-flag as seen in FIG. 12A is set if the segment is upwards heading (see the description relating to FIG. 13A). A d-flag is set when the edge is used as a direct clipping object, without an associated clipping level, and is applicable to closed curves. The actual priority level of the segment, or a level address is copied from the corresponding field of the new edge record into a level field in the active edge record 418. The address of the next segment in the segment list is copied from the corresponding field of the new edge record into a segment address field (segment addr) of the active edge record 418. The segment address may also be used to indicate the termination of an edge record.

It will be appreciated from FIG. 12A that other data structures are also possible, and necessary for example where polynomial implementations are used. In one alternative data structure, the 'segment addr' field is either the address of the next segment in the segment list or copied from the segments DDX value, if the segment is quadratic. In the latter case, the data structure has a q-flag which is set if the segment-is a quadratic segment, and cleared otherwise. In a further variation, the segment address and the DDX field may be separated into different fields, and additional flags provided to meet alternate implementations.

Figure 12B:
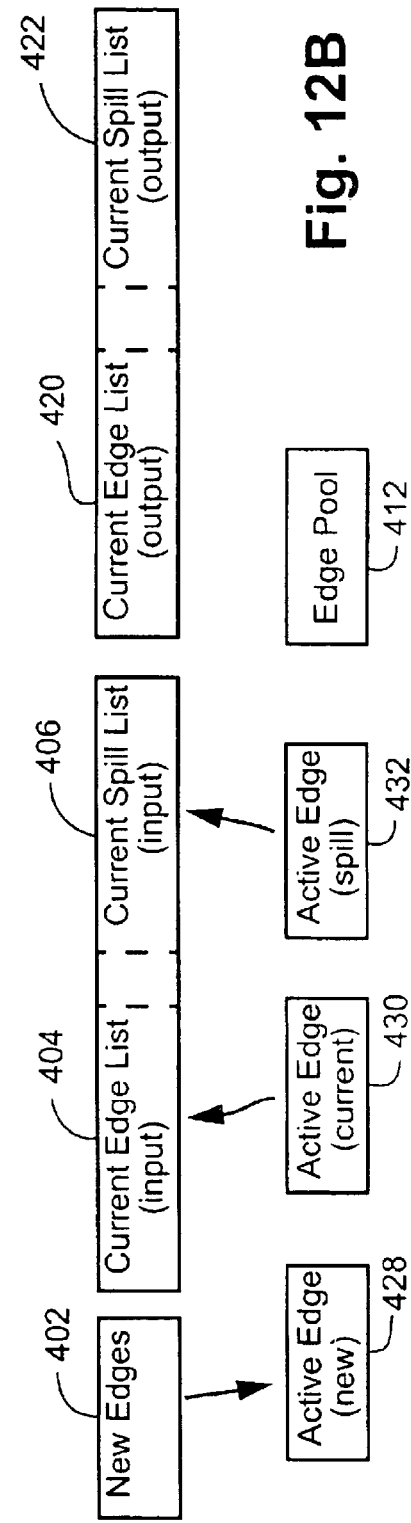
FIG. 12B depicts the arrangement of the edge records used in the edge processing module 400 of FIG. 4.

FIG. 12B depicts the arrangement of the edge records described above in the preferred arrangement and used in the edge processing module 400. A new active edge record 428, a current active edge record 430 and a spill active edge record 432, supplements the edge pool 412. As seen in FIG. 12B, the records 402, 404, 406, 404' and 406' are dynamically variable in size depending upon the number of edges being rendered at any one time. Each record includes a limit value which, for the case of the new edge list 402, is determined by a SIZE value incorporated with the LOAD_ EDGES_AND_RENDER instruction. When such an instruction is encountered, SIZE is checked and if non-zero, the address of the new edge record is loaded and a limit value is calculated which determines a limiting size for each of the lists 402, 404, 406, 404' and 406'.

Although the preferred arrangements utilizes arrays and associated pointers for the handling of edge records, other implementations, such as linked lists for example may be used. These other implementations may be hardware or software-based, or combinations thereof.

Figure 10:
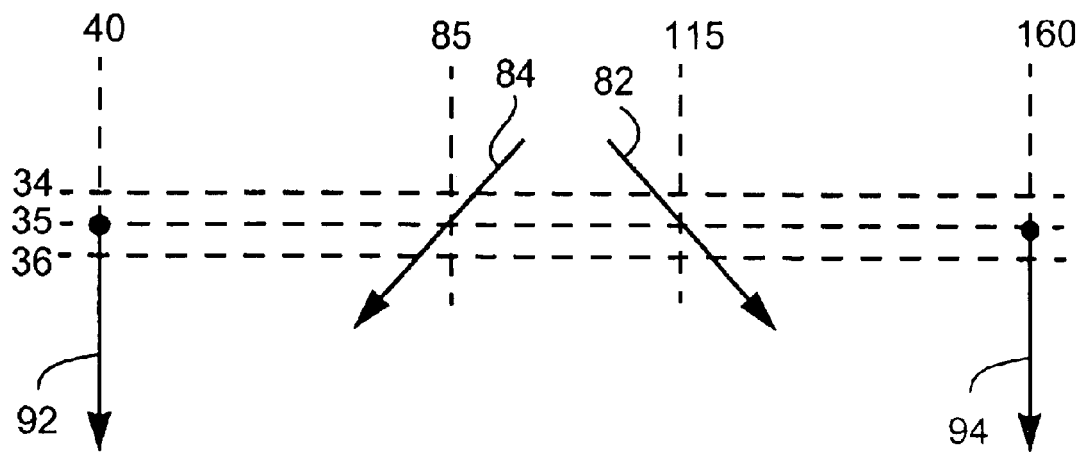
FIG. 10 illustrates the rendering of a number of scan lines of the image of FIG. 8A.
Figure 11:
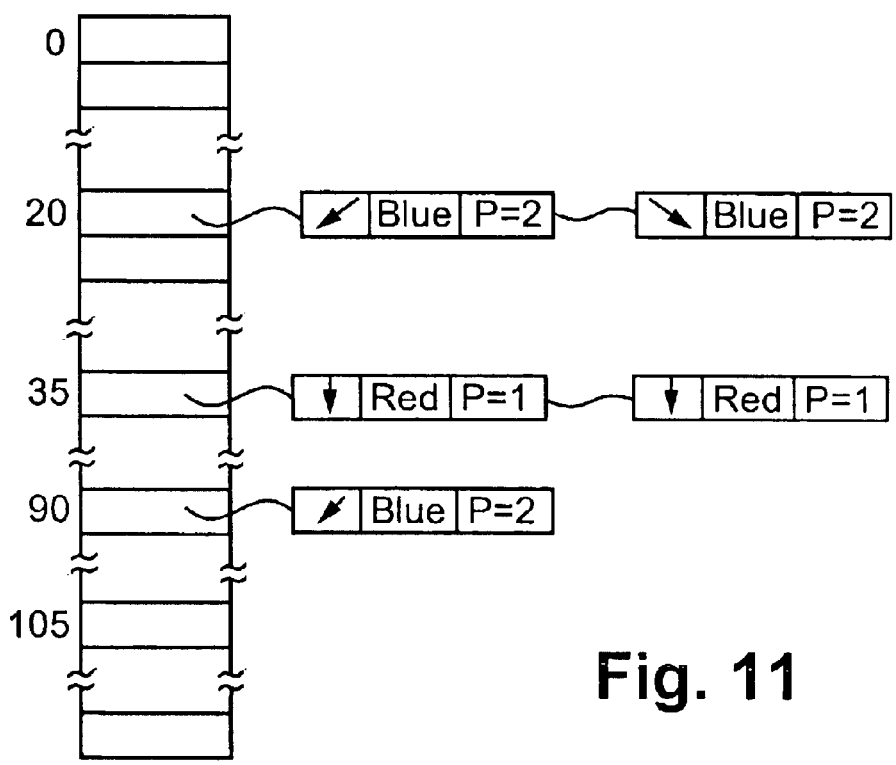
FIG. 11 depicts the arrangement of an edge record for the image of FIG. 8A.

The specific rendering of the image 78 shown in FIG. 8A will now be described with reference to scanlines 34, 35 and 36 shown in FIG. 10. In this example, the calculation of the new X coordinate for the next scanline is omitted for the purposes of clarity, with FIGS. 12C to 12I illustrating the output edge crossing being derived from one of the registers 428, 430 and 432 of the edge poll 412.

FIG. 12C illustrates the state of the lists noted above at the end of rendering scanline 34 (the top portion of the semitransparent blue triangle 80). Note that in scanline 34 there are no new edges and hence the list 402 is empty. Each of the main edge lists 404 and next main edge list 404' include only the edges 82 and 84. Each of the lists includes a corresponding pointer 434, 436, and 440 which, on completion of scanline 34, point to the next vacant record in the corresponding list. Each list also includes a limit pointer 450, denoted by an asterisk (*) which is required to point to-the-end of the corresponding list. If linked lists were used, such would not be required as linked lists include null pointer terminators that perform a corresponding function.

As noted above, at the commencement of each scanline, the next main edge list 404' and the main edge list 404 are swapped and new edges are received into the new edge list 402. The remaining lists are cleared and each of the pointers set to the first member of each list. For the commencement of scanline 35, the arrangement then appears as seen in FIG. 12D. As is apparent from FIG. 12D, the records include four active edges which, from FIG. 10, are seen to correspond to the edges 92, 94, 84 and 82.

Referring now to FIG. 12E, when rendering starts, the first segment of the new edge record 402 is loaded into an active edge record 428 and the first active edge records of the main edge list 404 and spill edge list 406 are copied to records 430 and 432 respectively. In this example, the spill edge list 406 is empty and hence no loading takes place. The X-positions of the edges within the records 428, 430 and 432 are then compared and an edge crossing is emitted for the edge with the smallest X-position. In this case, the emitted edge is that corresponding to the edge 92 which is output together with its priority value. The pointers 434, 436 and 438 are then updated to point to the next record in the list.

The edge for which the edge crossing was emitted is then updated (in this case by adding DX=0 to its position), and buffered to the edge pool 412 which, in this example, is sized to retain three edge records. The next entry in the list from which the emitted edge arose (in this case list 402) is loaded into the corresponding record (in this case record 428). This is seen in FIG. 12F.

Further, as is apparent from FIG. 12F, a comparison between the registers 428, 430 and 432 again selects the edge with the least X-value which is output as the appropriate next edge crossing (X=85, P=2). Again, the selected output edge is updated and added to the edge pool 412 and all the appropriate pointers incremented. In this case, the updated value is given by X←X+DX, which is evaluated as 84=85−1. Also, as seen, the new edge pointer 434 is moved, in this case, to the end of the new edge list 402.

In FIG. 12G, the next edge identified with the lowest current X-value is again that obtained from the register 430 which is output as an edge crossing (X=115, P=2). Updating of the edge again occurs with the value be added to the edge pool 412 as shown. At this time, it is seen that the edge pool 412 is now full and from which the edge with the smallest X-value is selected and emitted to the output list 404', and the corresponding limited pointer moved accordingly.

As seen in FIG. 12H, the next lowest edge crossing is that from the register 428 which is output (X=160 P=1). The edge pool 412 is again updated and the next small X-value emitted to the output list 404'.

Figure 12I:
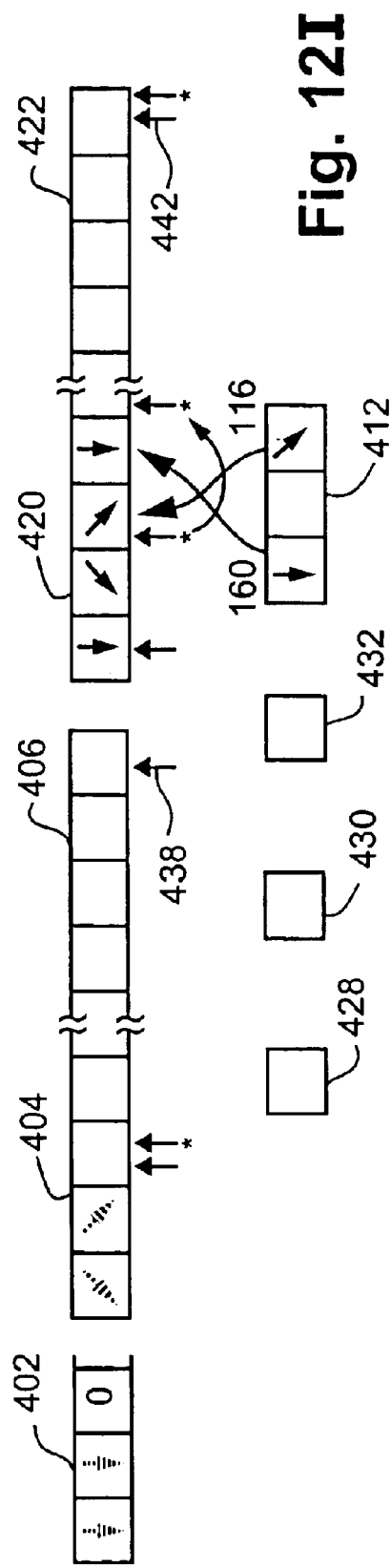
Figure 12J:
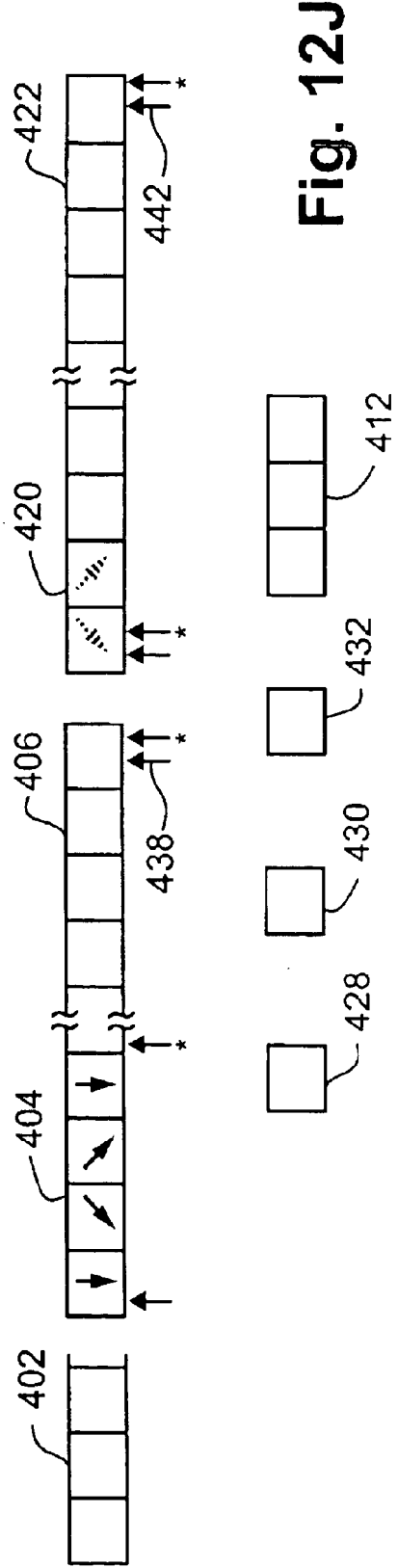

At the end of scanline 35, and as seen in FIG. 12I, the contents of the edge pool 412 are flushed to the output list 404' in order of smallest X-value. As seen in FIG. 12J, the next main edge list 404' and the main edge list 404 are swapped by exchanging their pointers in anticipation of rendering the next scanline 36. After the swapping, it is seen from FIG. 12J that the contents of the main edge list 404 include all edge current on scanline 36 arranged in order of X-position thereby permitting their convenient access which facilitates fast rendering.

Ordinarily, new edges are received by the edge processing module 400 in order of increasing X-position. When a new edge arrives, its position is updated (calculated for the next scanline to be rendered) and this determines further action as follows:

(a) if the updated position is less than the last X-position output on the line 498, the new edge is insertion sorted into the main spill list 406 and the corresponding limit register updated;

(b) otherwise, if there is space, it is retained in the edge pool 412.

As is apparent from the foregoing, the edge pool 412 aids in the updating of the lists in an ordered manner in anticipation of rendering the next scanline in the rasterised image. Further, the size of the edge pool 412 may be varied to accommodate larger numbers of non-ordered edges. However, it will be appreciated that in practice the edge pool 412 will have a practical limit, generally dependent upon processing speed and available memory with the graphic processing system. In a limiting sense, the edge pool 412 may be omitted which would ordinarily require the updated edges to be insertion sorted into the next output edge list 404'. However, in the preferred arrangement this situation is avoided, as a normal occurrence through the use of the spill lists mentioned above. The provision of the spill lists allows the preferred arrangement to be implemented with an edge pool of practical size and yet handle relatively complex edge intersections without having to resort to software intensive sorting procedures. In those small number of cases where the edge pool and spill list are together insufficient to accommodate the edge intersection complexity, sorting methods may be used.

An example of where the spill list procedure is utilised is seen in FIG. 14A where three arbitrary edges 60, 61 and 63 intersect an arbitrary edge 62 at a relative position between scanlines A and B. Further, the actual displayed pixel locations 64 for each of scanlines A, B, are shown which span pixel locations C to J. In the above described example where the edge pool 412 is size to retain three edge records, it will be apparent that such an arrangement alone will not be sufficient to accommodate three edge intersections occurring between adjacent scanlines as illustrated in FIG. 14A.

FIG. 14B shows the state of the edge records after rendering the edges 60, 61 and 63 on scanline. The edge crossing H is that most recently emitted and the edge pool 412 is full with the updated X-values E, G and I for the edges 60, 61 and 63 respectively for the next scanline, scanline B. The edge 62 is loaded into the current active edge record 430 and because the edge pool 412 is full, the lowest X-value, corresponding to the edge 60 is output to the output edge list 404'.

In FIG. 14C, the next edge crossing is emitted (X=J for edge 62) and the) corresponding updated value determined, in this case X=C for scanline B. Because the new updated value X=C is less than the most recent value X=E copied to the output list 404', the current edge record and its corresponding new updated value is transferred directly to the output spill list 406'.

Figure 14D:
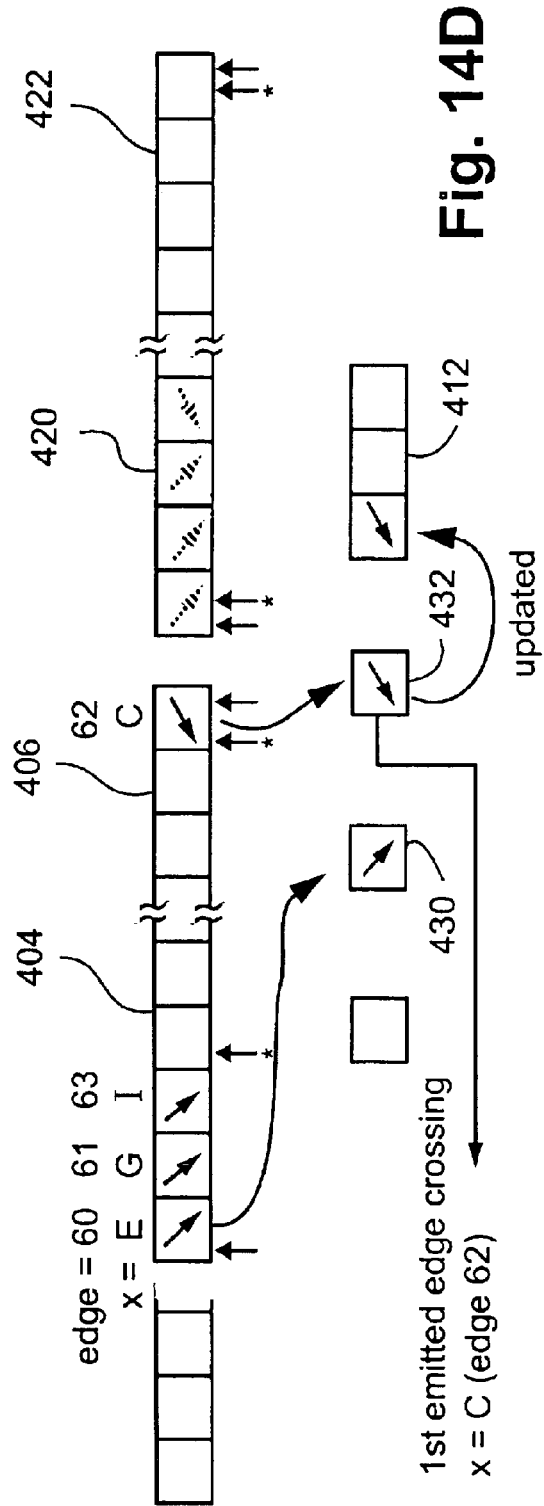

FIG. 14D shows the state of the edge records at the start of scanline B where it is seen that the main and output lists, and their corresponding spill components have been swapped. To determine the first emitted edge, the edge 60 is loaded into the current active edge register 430 and the edge 62 is loaded into the spill active edge register 432. The X-values are compared and the edge 62 with the least X-value (X=C) is emitted, updated and loaded to the edge pool 412.

Figure 14E:
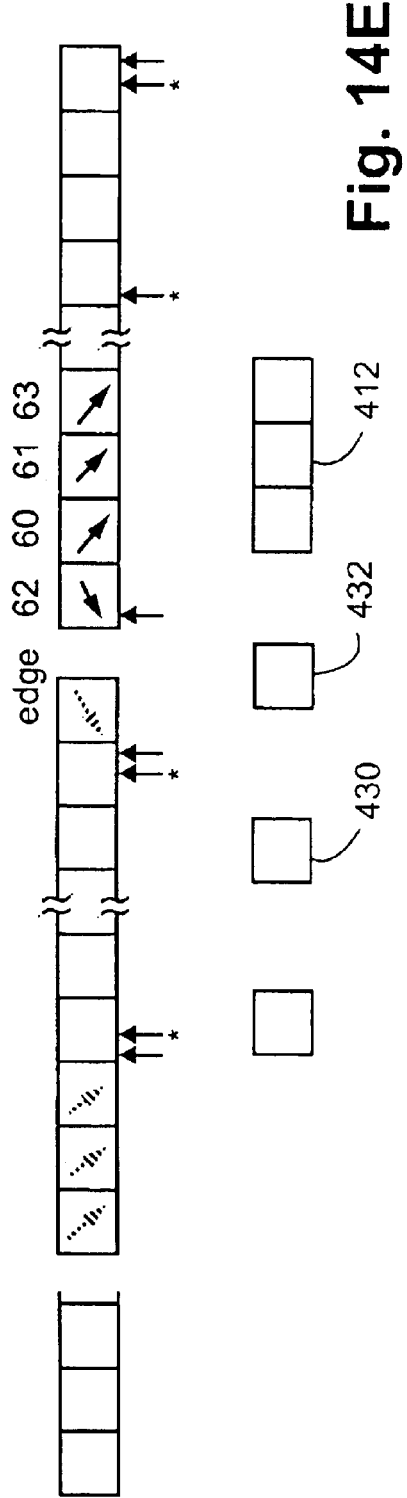

Edge emission and updating continues for the remaining edges in the main edge list 404 and at the end of the scanline, the edge pool 412 is flushed to reveal the situation shown in FIG. 14E, where it is seen that each of the edges 60 to 63 are appropriately ordered for rendering on the next scanline, having been correctly emitted and rendered on scanline B.

As will be apparent from the foregoing, the spill lists provide for maintaining edge rasterisation order in the presence of complex edge crossing situations. Further, by virtue of the lists being dynamically variable in size, large changes in edge intersection numbers and complexity may be handled without the need to resort to sorting procedures in all but exceptionally complex edge intersections.

In the preferred arrangement the edge pool 412 is sized to retain eight edge records and the lists 404, 404' together with their associated spill lists 406, 406' have a base (minimum) size of 512 bytes which is dynamically variable thereby providing sufficient scope for handling large images with complex edge crossing requirements.

3.3 OVERVIEW OF PRIORITY DETERMINATION MODULE

Figure 5:
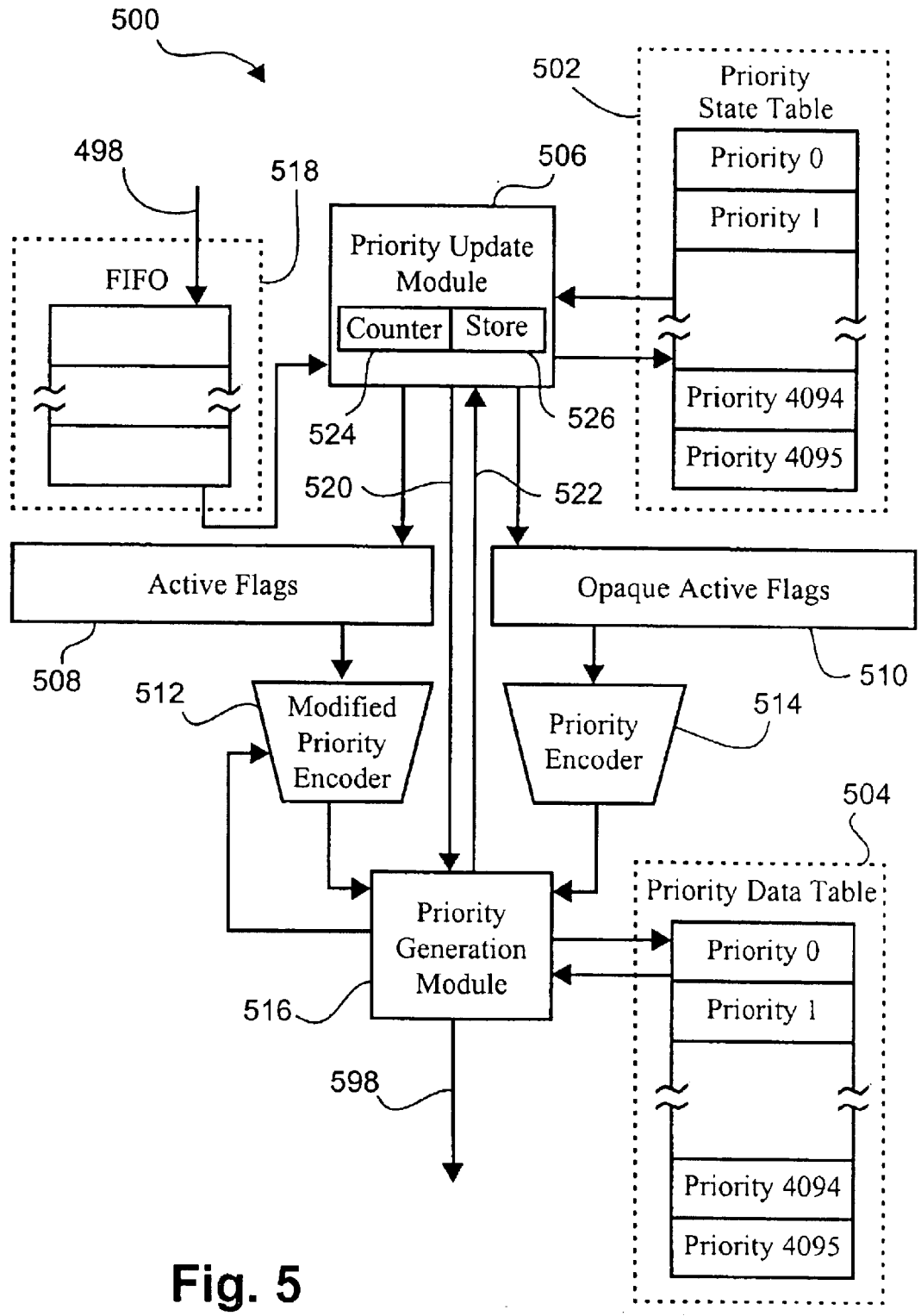
FIG. 5 is a schematic functional representation of the priority determination module of FIG. 3.

The operation of the priority determination module 500 will now be described with reference to FIG. 5. The primary function of the priority determination module 500 is to determine those objects that make a contribution to a pixel currently being scanned, order those contributing objects in accordance with their priority levels, and generate color composite messages for instructing the pixel compositing module 700 to composite the ordered objects to generate the required color and opacity for the current pixel.

The priority determination module 500 receives incoming messages 498 from the edge processing module 400. These incoming messages may include load priority data messages, load fill data messages, edge crossing messages, and end of scanline messages. These messages first pass through a first-in first-out (FIFO) buffer 518 before being read by a priority update module 506. The FIFO 518 acts to de-couple the operation of the edge processing module 400 and the priority determination module 500. Preferably the FIFO 518 is sized to enable the receipt from the edge processing module 400 and transfer a full scanline of edge-crossings in a single action. Such permits the priority determination module 500 to correctly handle multiple edge-crossings at the same pixel (X) location.

The priority determination module 500 is also adapted to access a priority state table 502, and a priority data table 504. These tables are used to hold information about each priority. Preferably, the priority state and priority data tables 502, 504 are combined into one table 34 as shown in FIG. 3. Alternatively these tables 502, 504 can be kept separate.

Preferably, the priority properties and status table 34 includes at least the following fields as shown in FIG. 18 for each priority level:
 (i) a fill-rule flag (FILL_RULE_IS_ODD_EVEN) which indicates whether this priority is to have its inside versus outside state determined by the application of the odd-even fill rule or the non-zero winding fill rule;
 (ii) a fill counter (FILL COUNT) for storing a current fill count which is modified in a manner indicated by the fill rule each time an edge effecting this priority is crossed;
 (iii) a clipper flag (CLIPPER) which indicates whether this priority is to be used for clipping or filling;
 (iv) a clip type flag (CLIP_OUT) which, for edges which have the clipper flag set, records whether the clipping type is a "clip-in" or a "clip-out";
 (v) a clip counter (CLIP COUNT) for storing a current clip count which is decremented and incremented when a clip-in type clip region effecting this priority is entered and exited respectively, and incremented and decremented when a clip-out type clip region effecting this priority is entered and exited respectively; and
 (vi) a flag (NEED_BELOW) which records whether this priority requires levels beneath it to be calculated first, referred to as the "need-below" flag.
 (vii) a fill table address (FILL INDEX), which point to an address where the fill of the priority is stored;
 (viii) a fill type (FILL TYPE),
 (ix) a raster operation code (COLOR_OP),
 (x) an alpha channel operation code (ALPHA_OP) consisting of three flags (LAO_USE_D_OUT_S, LAO_USE_S_OUT_D and LAO_USE_S_ROP_D),
 (xi) a stack operation code (STACK_OP), and
 (xii) a flag (X_INDEPENDENT) which records whether the color of this priority is constant for a given Y, referred to here as the "x-independent" flag; and
 (xiii) other information (ATTRIBUTES) of the priority Clipping objects are known in the art and act not to display a particular new object, but rather to modify the shape of an another object in the image. Clipping objects can also be turned-on and turned-off to achieve a variety of visual effects. For example, the object 80 of FIG. 8A could be configured as a clipping object acting upon the object 90 to remove that portion of the object 90 that lies beneath the clipping object 80. This may have the effect of revealing any object or image beneath the object 90 and within the clipping boundaries that would otherwise be obscured by the opacity of the object 90. The CLIPPER flag is used to identify whether the priority is a clipping object. Also, the CLIP flag is used to determine whether the priority is a clip in or a clip out, and the CLIP COUNT is used in a similar fashion to FILL COUNT to determine whether the current pixel is within the clip region.

FIGS. 13A and 13B demonstrate the application of the odd-even and non-zero winding rules for activating objects. The relevant rule to be used is determined by means of the fill-rule flag FILL_RULE_IS_ODD_EVEN.

For the purposes of the non-zero winding rule, FIG. 13A illustrates how the edges 71 and 72 of an object 70 are allocated a notional direction, according to whether the edges are downwards-heading or upwards-heading respectively. In order to form a closed boundary, edges link nose-to-tail around the boundary. The direction given to an edge for the purposes of the fill-rule (applied and described later) is independent of the order in which the segments are defined. Edge segments are defined in the order in which they are tracked, corresponding to the rendering direction.

FIG. 13B shows a single object (a pentagram) having two downwards-heading edges 73 and 76, and three upwards-heading edges 74, 75 and 77. The odd-even rule operates by simply toggling a Boolean value in the FILL COUNT as each edge is crossed by the scanline in question, thus effectively turning-on (activating) or turning-off (de-activating) an object's color. The non-zero winding rule increments and decrements a value stored in the fill counter FILL COUNT dependent upon the direction of an edge being crossed. In FIG. 13B, the first two edges 73 and 76 encountered at the scanline are downwards-heading and thus traversal of those edge increment the fill counter, to +1 and +2 respectively. The next two edges 74 and 77 encountered by the scanline are upwards-heading and accordingly decrement the fill counter FILL COUNT, to +1 and 0 respectively. The non-zero winding rule operates by turning-on (activating) an object's color when the fill counter FILL COUNT is non-zero, and turning-off (de-activating) the object's color when the fill counter FILL COUNT is zero.

The NEED_BELOW flag for a priority is established by the driver software and is used to inform the pixel generating system that any active priorities beneath the priority in question do not contribute to the pixel value being rendered, unless the flag is set. The flag is cleared where appropriate to prevent extra compositing operations that would otherwise contribute nothing to the final pixel value.

The raster operation code (COLOR_OP), alpha channel operation (ALPHA_OP) and stack operation (STACK_OP) together form the pixel operation (PIXEL_OP), that is to be performed by the pixel compositing module 700 on each pixel where the priority is active and exposed.

Preferably, most of the information contained in the combined table 34 is directly loaded by instructions from the driver software. In particular, the fill-rule flag, the clipper flag, the clip type flag, and the need-below flag, fill table address, fill type, raster operation, code, alpha channel operation code, stack operation code, x_independent flag, and other attributes may be handled in this manner. On the other hand, the fill counter, and clip counter are initially zero and are changed by the priority determination module 500 in response to edge crossing messages.

The priority determination module 500 determines that a priority is active at a pixel if the pixel is inside the boundary edges which apply to the priority, according to the fill-rule for that priority, and the clip count for the priority. A priority is exposed if it is the uppermost active priority, or if all the active priorities above it have their corresponding need-below flags set. In this fashion, pixel values may be generated using only the fill data of the exposed priorities. It is important to note that an object's priority designates the location (viz level) of the object in the order of the objects from the rearmost object to the foremost object. Preferably, a number of non-overlapping objects that have the same fill and compositing operation, and that form a contiguous sequence, may be designated as having the same priority. This effectively saves memory space in the fill table. Furthermore, the corresponding edge records of objects need only reference the corresponding priority in order to reference the corresponding fill and compositing operation.

Returning now to FIG. 5, the priority update module 506 maintains a counter 524 which records the scanline intersection coordinate up to which it has completed processing. This will be referred to as the current X of the priority update module 506. The initial value at the start of a scanline is zero.

Upon examining an edge crossing message received at the head of the FIFO 518, the priority update module 506 compares the X intersection value in the edge crossing message with its current X. If the X intersection value in the edge crossing message is less than or equal to the current X of the priority update module 506 processes the edge crossing message. Edge crossing message processing comes in two forms, "normal edge processing" (described below) is used when the record in the priority state table 502 of the combined table 34 indicated by the priority in the edge crossing message has a clipper flag which indicates that this is not a clip priority, otherwise "clip edge processing" (described below) is performed.

"Normal edge processing" includes, for each priority in the edge crossing message and with reference to fields of the record of combined table 34 indicated by that priority, the steps of:
  (i) noting the current fill count of the current priority;
  (ii) either:
    (a) if the fill rule of the current priority is odd-even, setting the fill count to zero if it is currently non-zero, else setting it to any non-zero value, or
    (b) if the fill rule of the current priority is non-zero winding, incrementing or decrementing (depending on the edge direction flag) the fill count; and
  iii) comparing the new fill count with the noted fill count and if one is zero and the other is non-zero performing an "active flag update" (described below) operation on the current priority.

Some arrangements may use a separate edge crossing message for each priority rather than placing a plurality of priorities in each edge crossing message.

An active flag update operation includes first establishing a new active flag for the current priority. The active flag is non-zero if the fill count for the priority in the priority state table 502 is non-zero and the clip count for the priority is zero, else the active flag is zero. The second step in the active flag update operation is to store the determined active flag in an active flags array 508 at the position indicated by the current priority, then if the need-below flag in the priority state table for the current priority is zero, also storing the active flag in an opaque active flags array 510 at the position indicated by the current priority.

"Clip edge processing" includes, with reference to fields of the priority state table record indicated by the first priority in the edge crossing message, the steps of:
  (i) noting the current fill count of the current priority;
  (ii) either:
    (a) if the fill rule of the current priority is odd-even, setting the fill count to zero if it is currently non-zero else setting it to any non-zero value, or
    (b) if the fill rule of the current priority is non-zero winding, incrementing or decrementing (depending on the edge direction flag) the fill count; and
  (iii) comparing the new fill count with the noted fill count and determining a clip delta value of:
    (a) zero, if both the new fill count is zero and the noted fill count is zero, or both the new fill count is non-zero and the noted fill count is non-zero,
    (b) plus one, if the clip type flag of the current priority is clip-out and the noted fill count is zero and the new fill count is non-zero, or the clip type flag of the current priority is clip-in and the noted fill count is non-zero and the new fill count is zero, or otherwise,
    (c) minus one; and
  (iv) for every subsequent priority after the first in the edge crossing message, add the determined clip delta value to the clip count in the record in the priority state stable indicated by that subsequent priority, and if the clip count either moved from non-zero to zero, or from zero to non-zero in that process, performing an active flag update operation as described above on that subsequent priority. It should be noted that the initial value of each clip count is set by the LOAD_PRIORITY_PROPERTIES instruction described previously. The clip count is typically initialised to the number of clip-in priorities, which affect each priority.

Some arrangements do not associate a priority with a clip, but instead directly increment and decrement the clip count of all priorities given in the edge crossing message. This technique can be used, for example, when clip shapes are simple and do not require the application of a complex fill rule. In this specific application, the clip count of the level controlled by an edge is incremented for an upwards heading edge or decremented for a downwards heading edge. A simple closed curve, described anticlockwise, acts a clip-in, whereas a simple closed curve, described clockwise, acts as a clip-out.

When the X intersection value in the edge crossing message is greater than the current X of the priority update module 506, the priority update module 506 forms a count of how many pixels to generate, being the difference between the X intersection value in the edge crossing message and the current X, this count is formatted into a priority generation message, which is sent via a connection 520 to a priority generation module 516. The priority update module 506 then waits for a signal 522 from the priority generation module 516 indicating that processing for the given number of pixels has completed. Upon receipt of the signal 522, the priority update module 506 sets its current X to the X intersection value in the edge crossing message and continues processing as described above.

Upon receipt of a priority generation message 520, the priority generation module 516 performs a "pixel priority generation operation" (described below) a number of times indicated by the count it has been supplied, thereupon it signals 522 the priority update module 506 that it has completed the operation.

Each pixel priority generation operation includes firstly using a priority encoder 514 (eg. a 4096 to 12 bit priority encoder) on the opaque active flags array 510 to determine the priority number of the highest opaque active flag. This priority (if any) is used to index the priority data table 504 and the contents of the record so referenced is formed into a fill priority message output 598 from the priority generation module 516 and sent to the fill color determination module 600 via the optimisation module 550. Further, if a priority was determined by the previous step (ie. there was at least one opaque active flag set), the determined priority is held, and is referred to as the "current priority". If no priority was determined the current priority is set to zero. The priority generation module 516 then repeatedly uses a modified priority encoder 512 on the active flag array 508 to determine the lowest active flag which is greater than the current priority. The priority so determined (if any) is used to index the priority determination table 34 and the contents of the record so referenced is formed into a fill priority message. This fill priority message is then sent 598 to the fill color determination module 600 via the optimisation module 550, then the determined priority is used to update the current priority. This step is used repeatedly until there is no priority determined (that is, there is no priority flagged in the active flags, which is greater than the current priority). Then the priority generation module 516 forms an end of pixel message and sends it to the fill color determination module 600. The priority determination module 500 then proceeds to the next pixel to generate another series of fill priority messages in similar fashion.

Figure 22A:
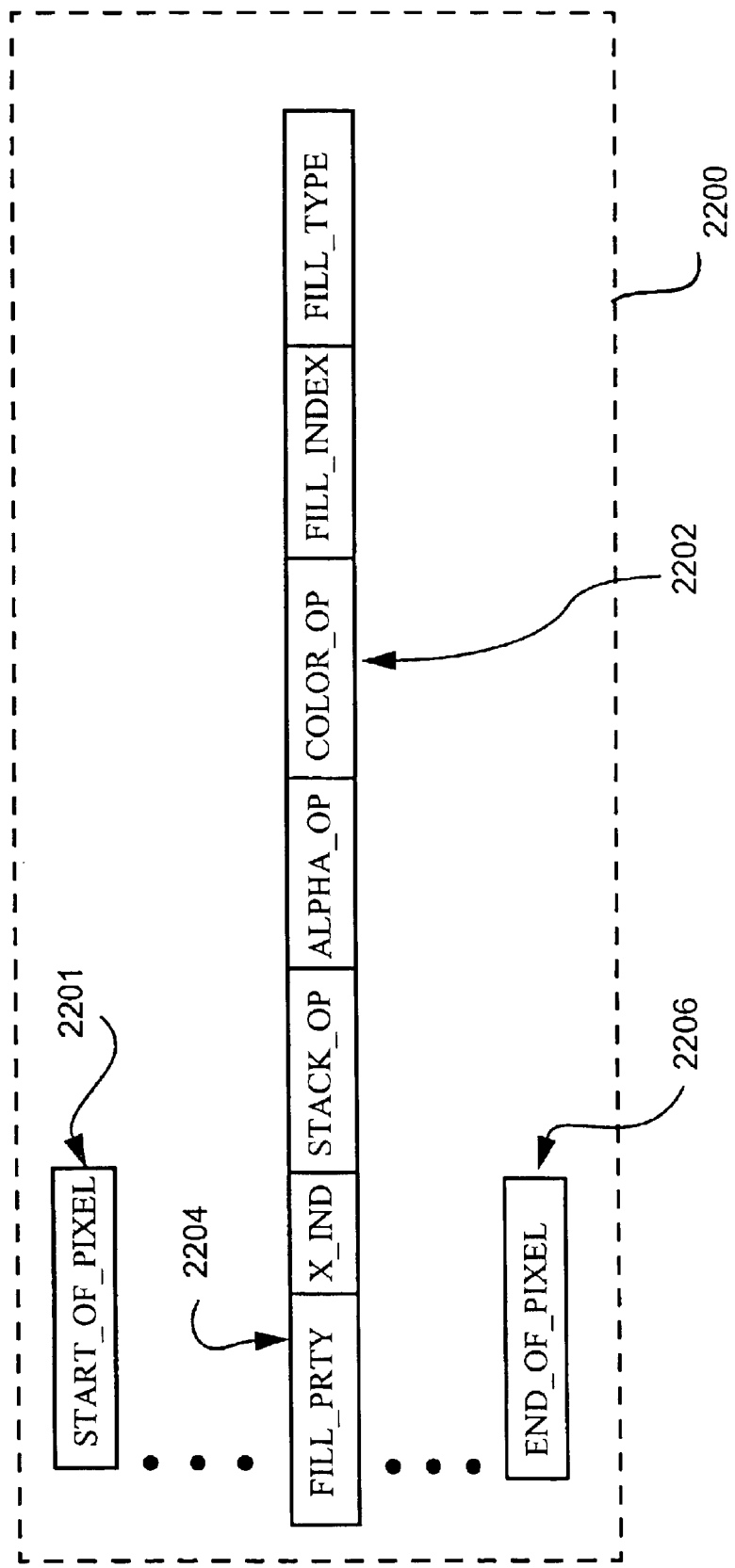
FIG. 22A shows a series of fill priority messages generated by the priority determination module 500.

Turning now to FIG. 22A, there is shown an example of such a series of fill priority messages 2200 generated by the priority determination module 500 for a single current pixel. As described above, these fill priority messages 2202 are first preceded by a START_OF_PIXEL command. The fill priority messages 2202 are then sent in priority order commencing with the lowest exposed active priority level. When there are no more fill priority messages 2202 for the current pixel, the priority determination module 500 then sends an END_OF_PIXEL message 2206.

Each of one these fill priority messages 2202 preferably includes at least the following fields:

(i) An identifier code FILL_PRTY 2204 for identifying the message as a fill priority message. This code also includes an index LEVEL_INDX to the corresponding record in the combined table 34, and also a code FIRST_PIXEL indicating whether or not this fill priority message belongs to a first pixel in a run of pixels having the same fill priority messages. The priority determination module 500 asserts the FIRST_PIXEL code for all those fill priority messages of a currently scanned pixel that is intersected by an edge as indicated by the edge crossing messages. The FIRST_PIXEL code is de-asserted for all fill priority messages of a currently scanned pixel if there is no edges intersecting that pixel as indicated by the edge crossing messages.

(ii) A fill table address FILL_INDEX,
(iii) A fill type FILL_TYPE,
(iv) A raster operation code COLOR_OP,
(v) An alpha channel operation code Alpha_OP,
(vi) A stack operation code STACK_OP, and
(vii) A flag X_IND which records whether the color of this priority is constant for a given Y, referred to here as the "x-independent" flag. This flag is asserted when the color for this priority is constant.

The values of fields (ii) to (vii) for the fill priority message are retrieved from the corresponding record in the combined table 34.

Preferably, the priority generation module 516 notes the value of the x-independent flag of each fill priority message that it forwards to the fill color determination module 600 while it processes the first pixel of a sequence. If all the forwarded messages have the x-independent flag specified, all subsequent messages in the span of pixels between adjacent edge intersections can be replaced by a single repeat specification of count minus one. This is done by producing a repeat message and sending it to the fill color determination module 600 in place of all further processing in this sequence. As will be recognised that if all the fill priority messages of a first pixel in a span of pixels between adjacent edges have their x-independent flag asserted, then the color and opacity of the pixels in the span of pixels will be constant. Thus in these cases, the pixel compositing module 700 need only composite the first pixel in the span of pixels to generate the required constant color and opacity and pass this onto the pixel output module 800. The generated repeat command then is passed to the pixel output module 800 which reproduces the constant color and opacity for the subsequent pixels in the span of pixels from the color and opacity of the first pixel. In this fashion, the number of compositing operations performed by the pixel compositing module 700 is reduced.

As another preferred feature to the basic operation described above, the priority generation module 516 sends the highest opaque priority via the connection 522 to the priority update module 506 after each edge crossing message. The priority update module 506 holds this in a store 526. The priority determination module 506 then, instead of a simple test that the X intersection in the message is greater than the current X, performs a test that the X intersection in the message is greater than the current X and that at least one of the levels in the message is greater than or equal to the highest opaque priority, before producing a fill priority message. By doing this, fewer pixel priority determination operations may be done and longer repeat sequences may be generated.

Figure 9B:
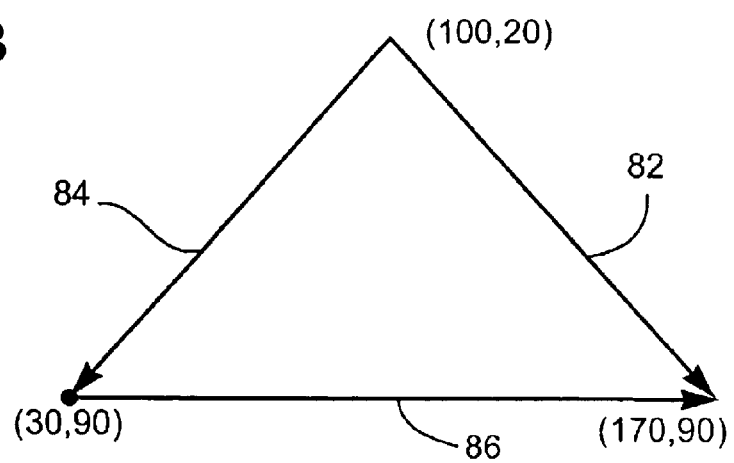

Using the example of the graphic objects shown in FIGS. 8A, 9A and 9B, the priority update process described above can be illustrated, for scanline 35 using the edge crossings seen from FIGS. 12C to 12J, as seen in FIGS. 15A to 15E.

FIGS. 15A to 15E illustrate operation of the priority tables 502 and 504, which in the preferred arrangement are merged into a single combined table 34 (see FIG. 18), called a priority determination table 34 together with arrays 508, 510 and encoders 512 and 514.

As seen in FIG. 15A, edge crossing messages are received in order for a scanline from the edge processing module 400 and are loaded into the table 34, which is arranged in priority order. The edge crossing messages include, in this example, an incrementing direction according to the non-zero winding rule of the edge traversal. It is possible for no entries in the priority table 34 to be set.

The priority determination table as illustrated 34 includes column entries for fill count, which are determined from the edge according to the non-zero winding rule or, where appropriate, the odd-even rule. The need-below flag is a property of a priority and is set as part of the LOAD_PRIORITIES_PROPERTIES instruction. The need-below is set for all priority levels when the table 34 is loaded. Other columns such as "clip count" and "fill index table" may be used, but for this example are omitted for simplicity of explanation. Where no level is active the corresponding entries are set to zero. Further, the values of the arrays 510 and 508 are updated from the table 34 after receiving a subsequent edge crossing.

From FIG. 15A, it will be apparent that, for convenience, a number of records have been omitted for clarity. As described previously, the contents of the table 34, where not used in the priority determination module 500 are passed as messages to each of the fill color determination module 600 for pixel generation, and to the pixel compositing module 700 for compositing operations.

The first edge crossing for scanline 35 (FIG. 12E) is seen in FIG. 15A where for P=1, the fill count is updated to the value of the edge according to the non-zero winding rule. The "need-below" flag for this level has been set to zero by the driver software as the object in question is opaque.

Because a previous state of the table 34 was not set, the arrays 510 and 508 remain not set and the priority encoder 514 is disabled from outputting a priority. This is interpreted by priority generation module 516 which outputs a count n=40 (pixels) for a "no object" priority (eg: P=0), being the first, blank, portion of the scanline 35.

FIG. 15B shows the arrangement when the edge crossing of FIG. 12F is received. The fill count is updated. The arrays 510 and 508 are then set with the previous highest level from the table 34. At this time, the module 516 outputs a count n=45, P=1 representing the edge 96 of the opaque red object 90 before intersection with the semitransparent triangle 80.

FIG. 15C shows the arrangement when the edge crossing of FIG. 12G is received. Note that the fill count has been adjusted downwardly because of the non-zero winding rule. Because the object that is valid prior to receiving the current edge crossing is not opaque; the modified priority encoder 512 is used to select the priority P=2 as the highest active level which is output as is current for n=(115−85)=30 pixels.

FIG. 15D shows the arrangement when the edge crossing of FIG. 12H is received. Note that previously changed "need-below" for P=2 has been transferred to the active array 508, thus permitting the priority encoder to output a value P=1 current for n=(160−115)=45 pixels.

Figure 15E:
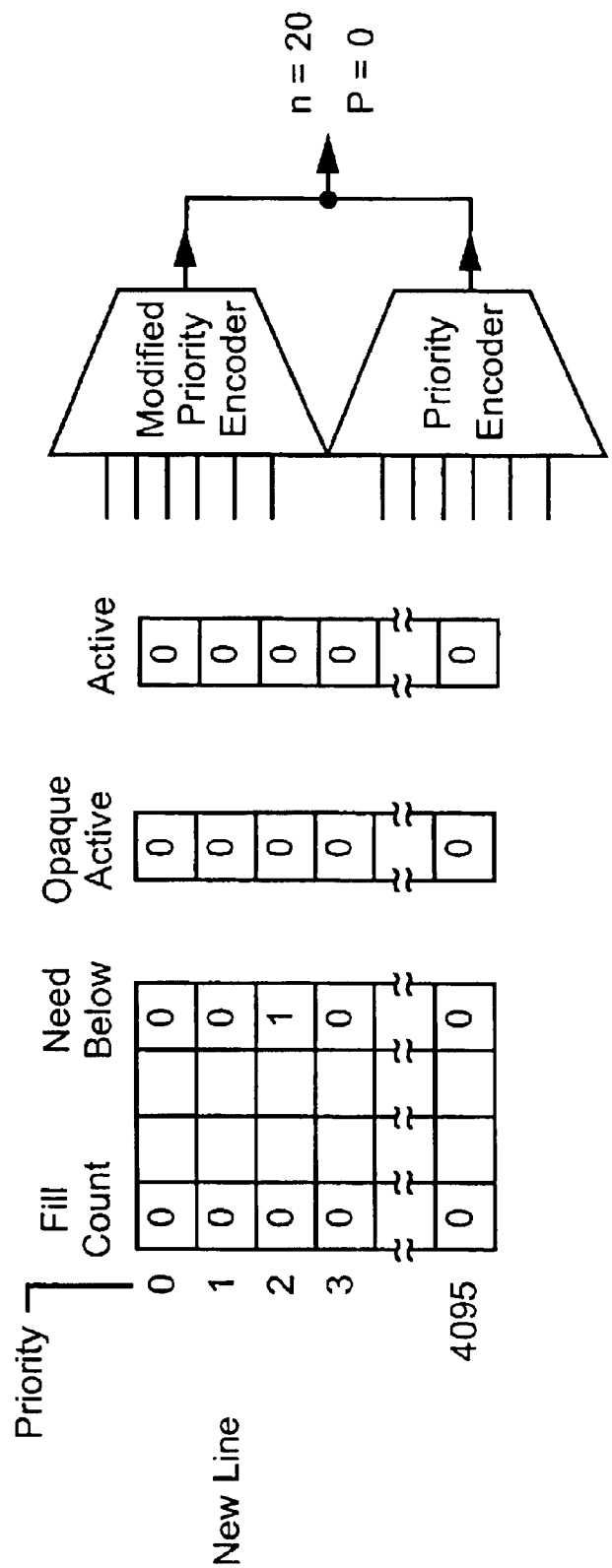

FIG. 15E shows the result when the edge crossing of FIG. 121 is received, providing for an output of P=0 for n=(180−160)=20 pixels.

As such, the priority module 500 outputs counts of pixels and corresponding priority display values for all pixels of a scanline.

3.4 OVERVIEW OF OPTIMISATION MODULE

The next module in the pipeline is the optimisation module 550. This module 550 looks for groups of instructions (viz fill priority messages) that can be combined into a single color and instruction, which can be calculated once and stored into a register at the pixel compositing module 700 on the first pixel in a run of pixels. On subsequent pixels, the color and instruction can be restored from the register, rather than being calculated each time. For example, in the situation where a resultant color for a pixel is x-independent over a run of pixels, the optimisation circuit can send a REPEAT PIXEL message to the compositing module 700 which can restore the resultant color for subsequent pixels. In this way, the optimisation module reduces the number of compositing operations being performed by the compositing module. In the circumstances where the first pixel in a run comprises an x-dependent pixel value at a particular level, the REPEAT PIXEL message cannot be used. However, the optimisation module is still able to minimise the number of compositing operations, as will be described below in sections 4.0 to 4.5 and 5.0 in more detail.

3.5 OVERVIEW OF FILL COLOR DETERMINATION MODULE

Figure 6:
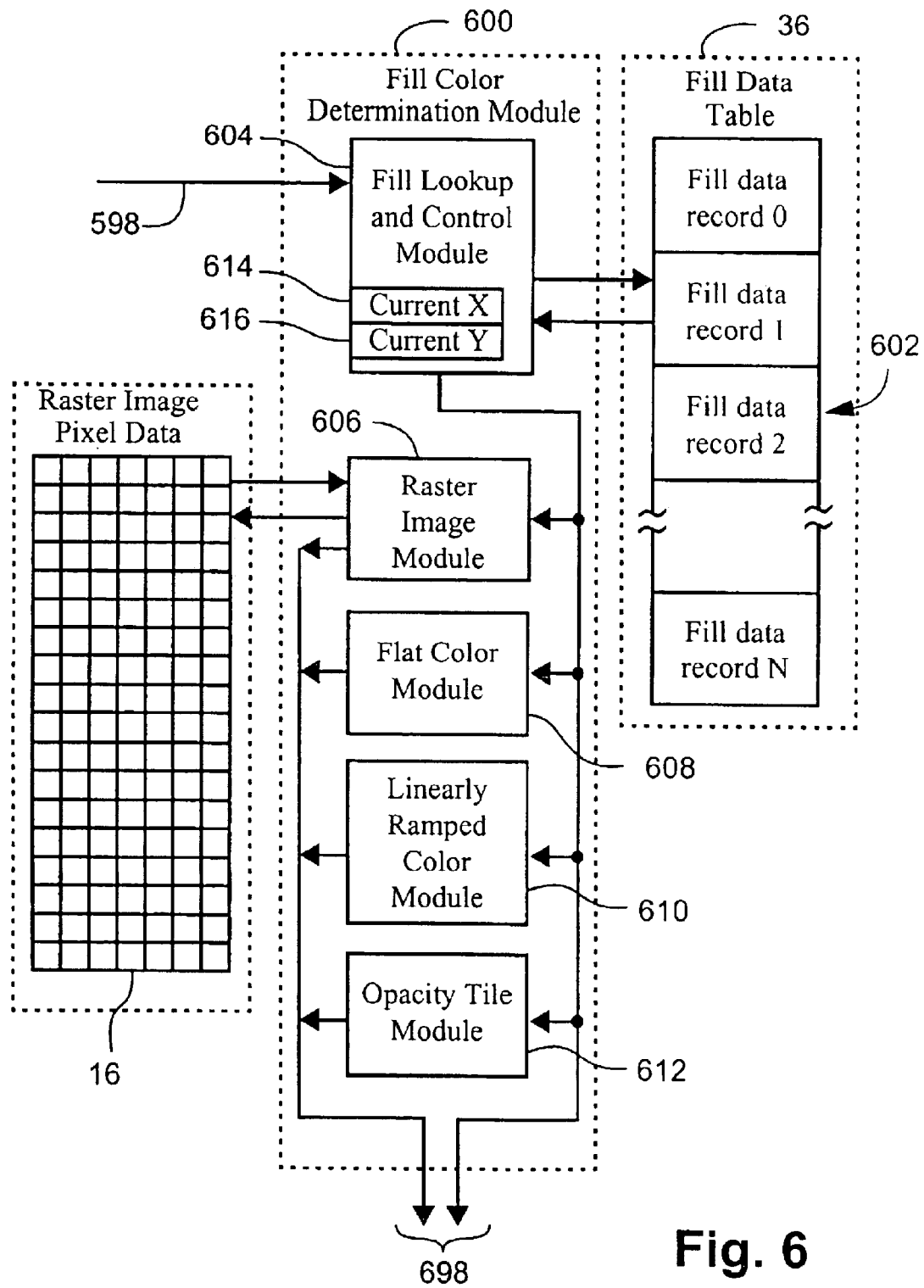
FIG. 6 is a schematic functional representation of the fill color determination module of FIG. 3.

The operation of the fill color determination module 600 will now be described with reference to FIG. 6. Incoming messages 598 from the priority determination module 500, which include set fill data messages, repeat messages, fill priority messages, end of pixel messages, and end of scanline messages, first pass to a fill lookup and control module 604. The fill lookup and control module 604 maintains a current X position counter 614 and a current Y position counter 616 for use by various components of the fill color determination module 600.

Upon receipt of an end of scanline message, the fill lookup and control module 604 resets the current X counter 614 to zero and increments the current Y counter 616. The end of scanline message is then passed to the pixel compositing module 700.

Upon receipt of a set fill data message, the fill lookup and control module 604 stores the data in the specified location 602 of the fill data table 36.

Upon receipt of a repeat message, the fill lookup and control module 604 increments the current X counter 614 by the count from the repeat message. The repeat message is then passed to the pixel compositing module 700.

Upon receipt of an end of pixel message 2202, the fill lookup and control module 604 again increments the current X counter 614, and the end of pixel message is then passed to the pixel compositing module 700.

Upon receipt of a fill priority message, the fill lookup and control module 604 performs operations which include:

(i) the fill type from the fill priority message is used to select a record size in the table 36;

(ii) the fill table address from the fill priority message, and the record size as determined above, is used to select a record from the fill data table 36;

(iii) the fill type from the fill priority message is used to determine and select a sub-module to perform generation of the fill color. The sub-modules may include a raster image module 606, a flat color module 608, a linearly ramped color module 610, and an opacity tile module 612;

(iv) the determined record is supplied to the selected sub-module 606–612;

(v) the selected sub-module 606–612 uses the supplied data to determine a color and opacity value;

(vi) the determined color and opacity is combined with remaining information from the fill color message, namely the raster operation code, the alpha channel operation code, the stack operation code, to form a color composite message 2208, which is sent to the pixel compositing module 700 via the connection 698.

Figure 22B:
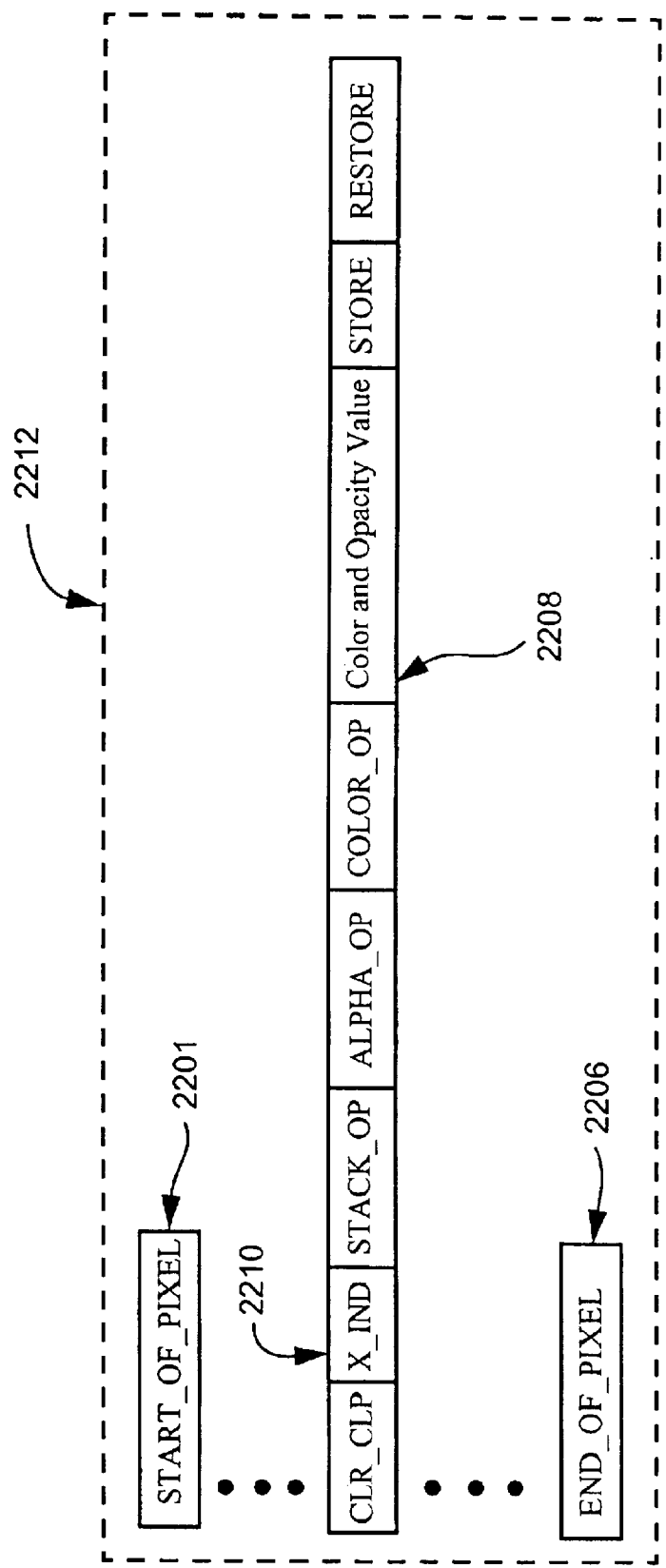
FIG. 22B shows a series of color composite messages generated by the fill color determination module 600.

Thus, as shown in FIGS. 22A and 22B, a message sequence 2200 starting with a start of pixel message 2201 message, then fill priority messages 2202 followed by an end of pixel message 2206 is transformed into a message sequence 2212 comprising a start of pixel message 2201, color composite messages 2208 followed by an end of pixel message 2206. These color composite messages 2202 preferably includes the same fields as the fill priority messages 2202, with the following exceptions:

(i) code CLR_CMP 2210 for identifying the message as a color composite message. This CLR_CMP code also includes the index to the corresponding record in the combined table 34;

(ii) a color and opacity field for containing the color and opacity value of the priority. The latter replaces the Fill index and fill type fields of the fill priority messages; and (iii) STORE and RESTORE bits. These bits are added by the optimisation module 550 and will be discussed in some detail below.

In the preferred arrangement the determined color and opacity is a red, green, blue and opacity quadruple with 8-bit precision in the usual manner giving 32 bits per pixel. However, a cyan, magenta, yellow and black quadruple with an implied opacity, or one of many other known color representations may alternatively be used. The red, green, blue and opacity case is used in the description below, but the description may also be applied to other cases.

The operation of the raster image module 606, the flat color module 608, the linearly ramped color module 610, and the opacity tile module 612 will now be described. The flat color module 608 interprets the supplied record as a fixed format record containing three 8-bit color components (typically interpreted as red, green and blue components) and an 8-bit opacity value (typically interpreted as a measure of the fraction of a pixel which is covered by the specified color, where 0 means no coverage, that is complete transparency, and 255 means complete coverage, that is, completely opaque). This color and opacity value is output directly via the connection 698 and forms the determined color and opacity without further processing.

The linearly ramped color module 610 interprets the supplied record as a fixed formal record containing four sets of three constants, cx, cy, and d, being associated with the three color and one opacity components. For each of these four sets, a result value r is computed by combining the three constants with the current X count, x, and the current Y count, y, using the formula:

$$r = \text{clamp}\,(cx^*x + cy^*y + d)$$

Where the function clamp is defined as:

$$\text{clamp}\,(x) = \begin{cases} 255 & 255 < x \\ \lfloor x \rfloor & 0 <= x <= 255 \\ 0 & x < 0 \end{cases}$$

The four results so produced are formed into a color and opacity value. This color and opacity value is output directly via the connection 698 and forms the determined color and opacity without further processing.

The opacity tile module 612 interprets the supplied record as a fixed format record containing three 8-bit color components, an 8-bit opacity value, an integer X phase, (px), a Y phase, (py), an X scale, (sx), a Y scale, (sy), and a 64 bit mask. These values originate in the display list generation and contained typically in the original page description. A bit address, a, in the bit mask, is determined by the formula:

$$a = ((x/2^{sx} + px) \bmod 8) + ((y/2^{sy} + py) \bmod 8) \times 8$$

The bit at the address "a" in the bit mask is examined. If the examined bit is one, the color and opacity from the record is copied directly to the output of the module 612 and forms the determined color and opacity. If the examined bit is zero, a color having three zero component values and a zero opacity value is formed and output as the determined color and opacity.

The raster image module 606 interprets the supplied record as a fixed format record containing six constants, a, b, c, d, tx, and ty; an integer count of the number of bits (bpl) in each raster line of the raster image pixel data 16 to be sampled; and a pixel type. The pixel type indicates whether the pixel data 16 in the raster image pixel data is to be interpreted as one of:

(i) one bit per pixel black and white opaque pixels;
(ii) one bit per pixel opaque black or transparent pixels;
(iii) 8 bits per pixel grey scale opaque pixels;
(iv) 8 bits per pixel black opacity scale pixels;
(v) 24 bits per pixel opaque three color component pixels;, or
(vi) 32 bits per pixel three color component plus opacity pixels.

Many other formats are possible.

The raster image module 606 uses the pixel type indicator to determine a pixel size (bpp) in bits. Then a bit address, a, in the raster image pixel data 16 is calculated having the formula:

$$a = bpp^* \lfloor a^*x + c^*y + tx \rfloor + bpl^* \lfloor b^*x + d^*y + ty \rfloor$$

A pixel interpreted according to the pixel type from the record 602 is fetched from the calculated address "a" in the raster image pixel data 16. The pixel is expanded as necessary to have three eight bit color components and an eight bit opacity component. By "expanded", it is meant for example, that a pixel from an eight bit per pixel grey scale opaque raster image would have the sampled eight bit value applied to each of the red, green and blue component, and the opacity component set to fully opaque. This then forms the determined color and opacity output 698 to the pixel compositing module 700.

As a consequence, the raster pixel data valid within a displayable object is obtained through the determination of a mapping to the pixel image data within the memory 16. This effectively implements an affine transform of the raster pixel data into the object-based image and is more efficient than prior art methods which transfer pixel data from an image source to a frame store where compositing with graphic object may occur.

As a preferred feature to the above, interpolation between pixels in the raster image pixel data 16 may optionally be performed by first calculating intermediate results p, and q according to the formulae:

$$p=a*x+c*y+tx$$

$$q=b*x+d*y+ty$$

Next the bit addresses, a00, a01, a10, and a11, of four pixels in the raster image pixel data 16 are determined according to the formulae:

$$a00=bpp*\lfloor p \rfloor+bpl*\lfloor q \rfloor$$

$$a01=a00+bpp$$

$$a10=a00+bpl$$

$$a11=a00+bpl+bpp$$

Next, a result pixel component value, r, is determined for each color and opacity component according to the formula:

$$r=\text{interp}(\text{interp}(\text{get}(a00), \text{get}(a01), p), \text{interp}(\text{get}(a10),\text{get}(a11), p), q)$$

where the function interp is defined as:

$$\text{interp}(a, b, c)=a+(b-a)*(c-\lfloor c \rfloor)$$

In the above equations, the representation $\lfloor \text{value} \rfloor$=floor (value), where a floor operation involves discarding the fractional part of the value.

The get function returns the value of the current pixel component sampled from the raster image pixel data 16 at the given bit address. Note that for some components of some image types this can be an implied value.

As a preferred feature to the above, image tiling may optionally be performed by using x and y values in the above equations which are derived from the current X and Y counters 614,616 by a modulus operation with a tile size read from the supplied record.

Many more such fill color generation sub-modules are possible.

3.6 OVERVIEW OF PIXEL COMPOSITING MODULE

The operation of the pixel compositing module 700 will now be described. The primary function of the pixel compositing module is to composite the color and opacity of all those exposed object priorities that make an active contribution to the pixel currently being scanned.

Figure 21:
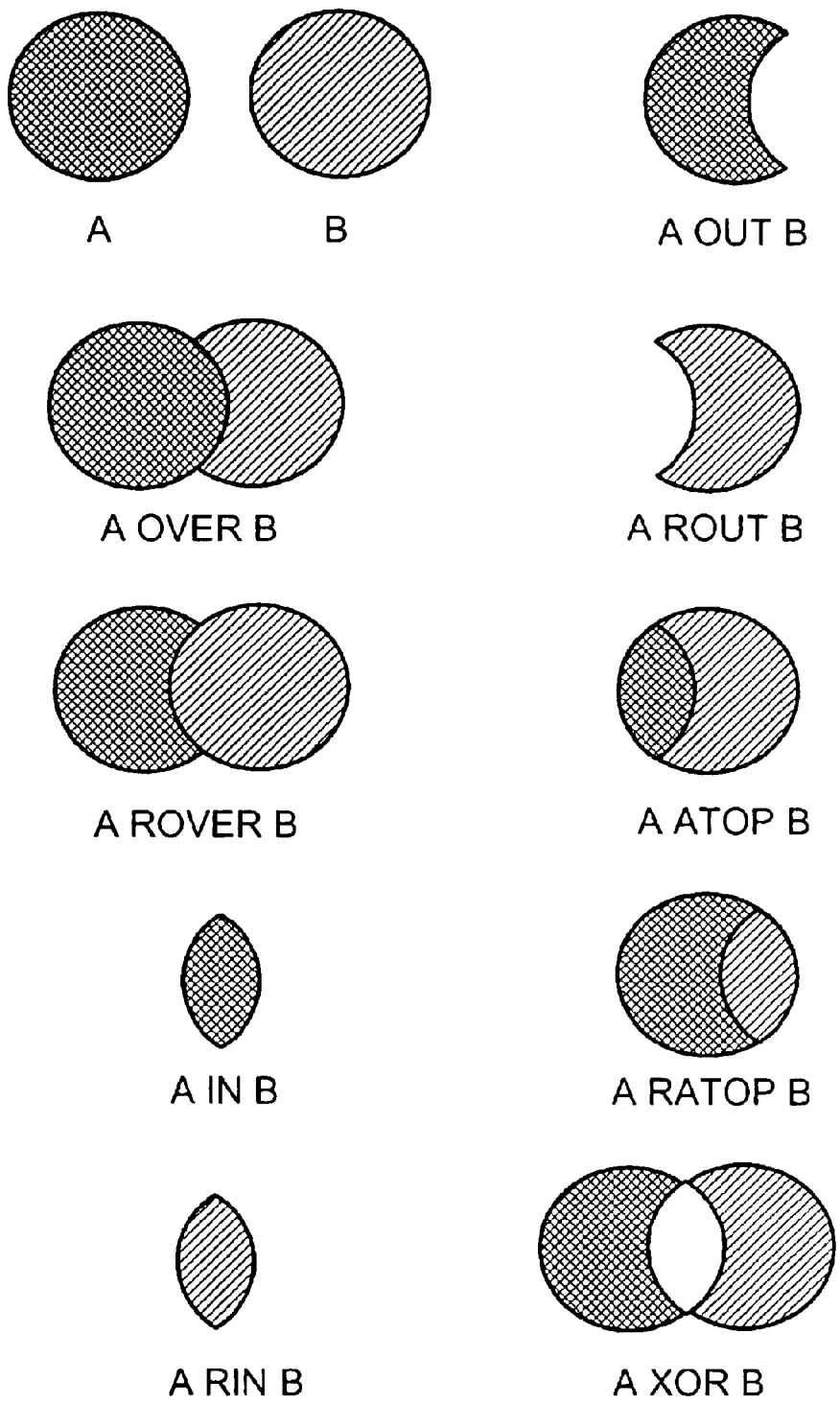
FIG. 21 depicts the result of a number of compositing operations.

Preferably, the pixel compositing module 700 implements a modified form of the compositing approach as described in "Compositing Digital Images", Porter, T: Duff, T; Computer Graphics, Vol 18 No 3 (1984) pp253–259. Examples of Porter and Duff compositing operations are shown in FIG. 21. However, such an approach is deficient in that it only permits handling a source and destination color in the intersection region formed by the composite, and as a consequence is unable to accommodate the influence of transparency outside the intersecting region. The preferred arrangement overcomes this by effectively padding the objects with completely transparent pixels. Thus the entire area becomes in effect the intersecting region, and reliable Porter and Duff compositing operations can be performed. This padding is achieved at the driver software level where additional transparent object priorities are added to the combined table. These Porter and Duff compositing operations are implemented utilising appropriate color operations as will be described below in more detail with reference to FIGS. 20A, 20B, and 19.

Preferably, the images to be composited are based on expression trees. Expression trees are often used to describe the compositing operations required to form an image, and typically comprise a plurality of nodes including leaf nodes, unary nodes and binary nodes. A leaf node is the outermost node of an expression tree, has no descendent nodes and represents a primitive constituent of an image. Unary nodes represent an operation which modifies the pixel data coming out of the part of the tree below the unary operator. A binary node typically branches to left and right subtrees; wherein each subtree is itself is an expression tree comprising at least one leaf node. An example of an expression tree is shown in FIG. 17C. The expression tree shown in FIG. 17C comprises four leaf nodes representing three objects A, B, and C, and the page. The expression tree of FIG. 17C also comprises binary nodes representing the Porter and Duff OVER operation. Thus the expression tree represents an image where the object A is composited OVER the object B, the result of which is then composited OVER object C, and the result of which is then composited OVER the page.

Figure 17A:
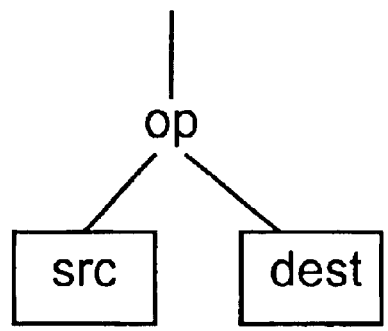
FIGS. 17A and 17B show a simple compositing expression illustrated as an expression tree and a corresponding depiction.
Figure 17B:
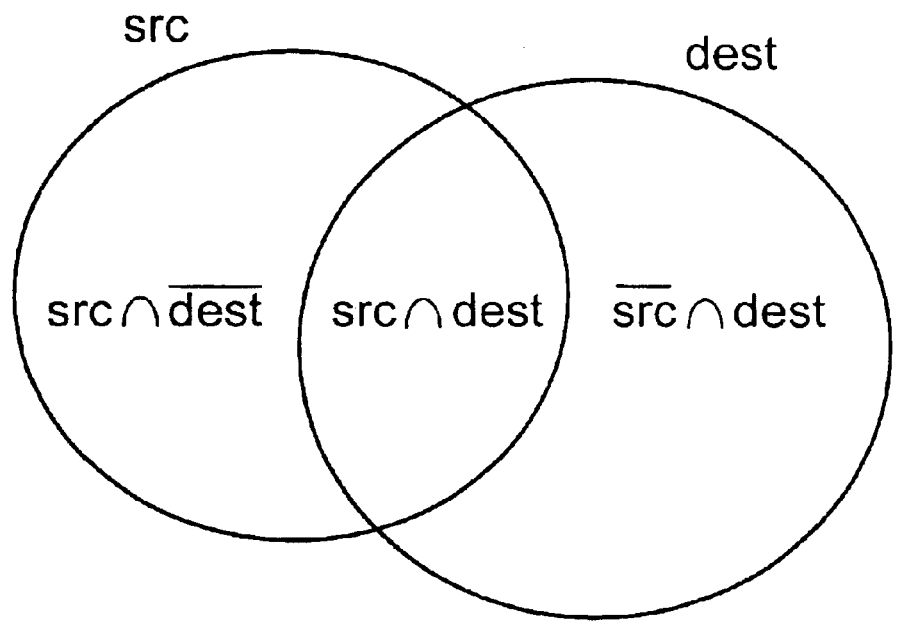
Figure 17C:
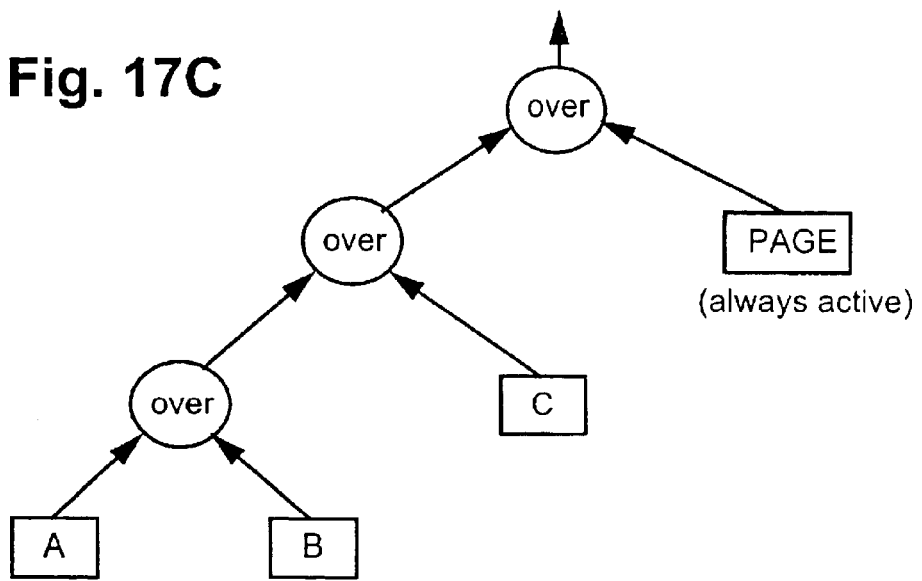
FIG. 17C shows an example of an expression tree.

Turning now to FIGS. 17A and 17B, there is shown a typical binary compositing operation in an expression tree. This binary operator operates on a source object (src) and a destination object (dest), where the source object src resides on the left branch and the destination object (dest) resides on the right branch of the expression tree. The binary operation is typically a Porter and Duff compositing operation. The area src ∩ dest represents the area on the page where the objects src and dest objects intersect (ie both active), the area src∩$\overline{\text{dest}}$ where only the src object is active, and the area $\overline{\text{src}}$∩dest where only the dest object is active.

The compositing operations of the expression tree are implemented by means of the pixel compositing stack 38, wherein the structure of the expression tree is implemented by means of appropriate stack operations on the pixel compositing stack 38.

Figure 23A:
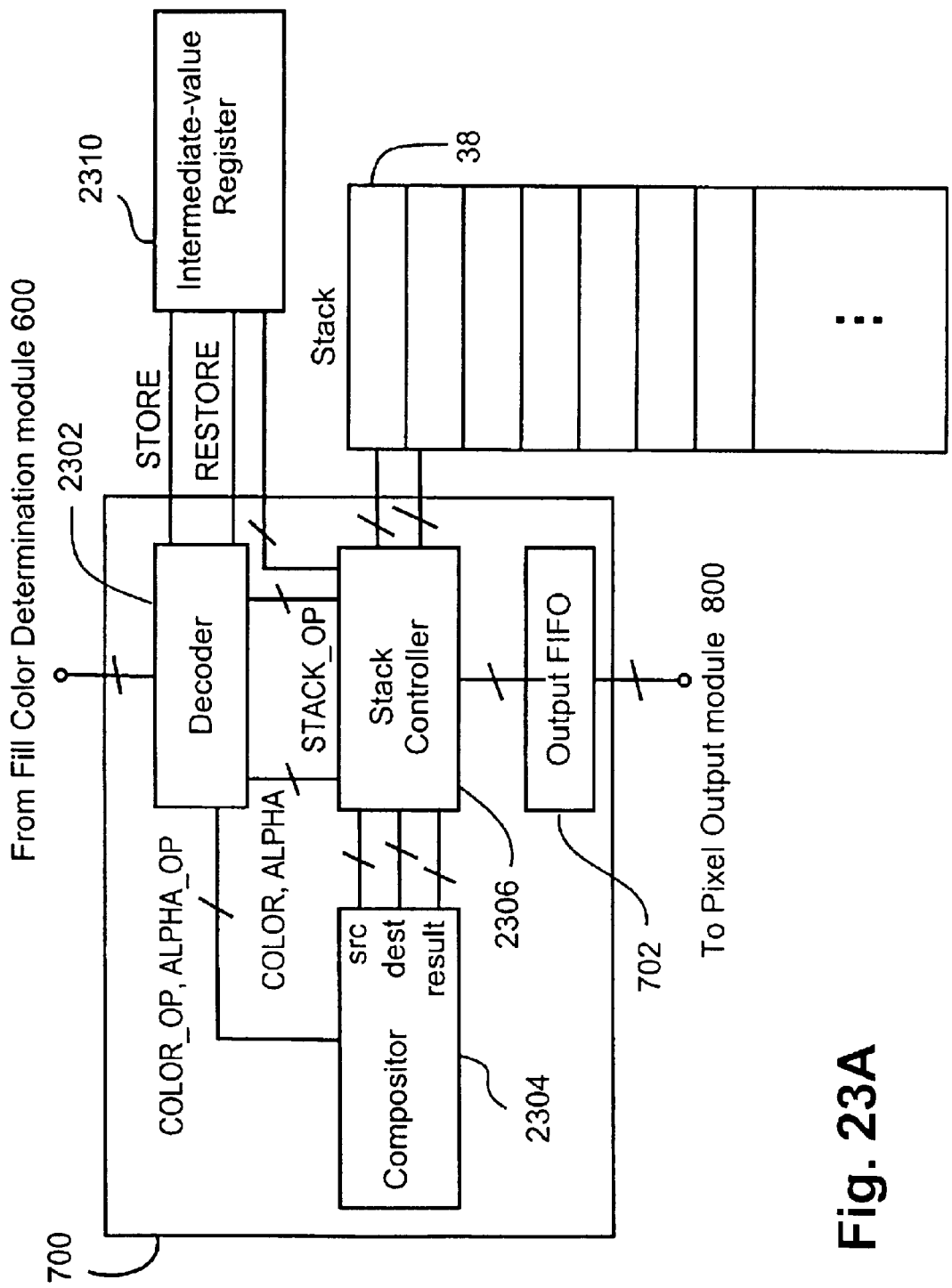
FIG. 23A is a schematic functional representation of the pixel compositing module of FIG. 3 in accordance with one arrangement.

Turning now to FIG. 23A, there is shown the pixel compositing module 700 in accordance with one arrangement in more detail. The pixel compositing module 700 receives incoming messages from the fill color determination module 600. These incoming messages include repeat messages, series of color composite messages (see FIG. 22B), end of pixel messages, and end of scanline messages, and are processed in sequence.

The pixel compositing module 700 comprises a decoder 2302 for decoding these incoming messages, a compositor 2304 for compositing the colors and opacities contained in the incoming color composite messages. The pixel compositing module 700 also comprises a stack controller 2306 for placing the resultant colors and opacities on a stack 38, and output FIFO 702 for storing the resultant color and opacity.

During the operation of the pixel compositing module 700, the decoder 2302, upon the receipt of a color composite message, extracts the raster operation COLOR_OP and alpha channel operation codes ALPHA_OP and passes them to the compositor 2304. The decoder 2302 also extracts the stack operation STACK_OP and color and opacity values COLOR, ALPHA of the color composite message and passes them to the stack controller 2306. Typically, the pixel composing module 700 combines the color and opacity from the color composite message with a color and opacity popped from the pixel compositing stack 38 according to the raster operation and alpha channel operation from the color composite message. It then pushes the result back onto the pixel compositing stack 38. More generally, the stack controller 2306 forms a source (src) and destination (dest) color and opacity, according to the stack operation specified. If at this time, or during any pop of the pixel compositing stack, the pixel compositing stack 38 is found to be empty, an opaque white color value is used without any error indication. These source and destination colors and opacity are then made available to the compositor 2304 which then performs the compositing operation in accordance with the COLOR_OP and ALPHA_OP codes. The resultant (result) color and opacity is then made available to the stack controller 2306, which stores the result on the stack 38 in accordance with the STACK_OP code. These stack operations are described below in more detail below.

During the operation of the pixel compositing module 700, if the decoder 2302 receives an end of pixel message, it then instructs the stack controller 2306 to pop a color and opacity from the pixel compositing stack 38. If the stack 38 is empty an opaque white value is used. The resultant color and opacity is then formed into an pixel output message which is forwarded to the pixel output FIFO 702. If the decoder 2302 receives a repeat message or an end of scanline message, the decoder 2302 by-passes (not shown) the compositor 2304 and stack controller 2306 and forwards the messages to the pixel output FIFO 702 without further processing.

Figure 23B:
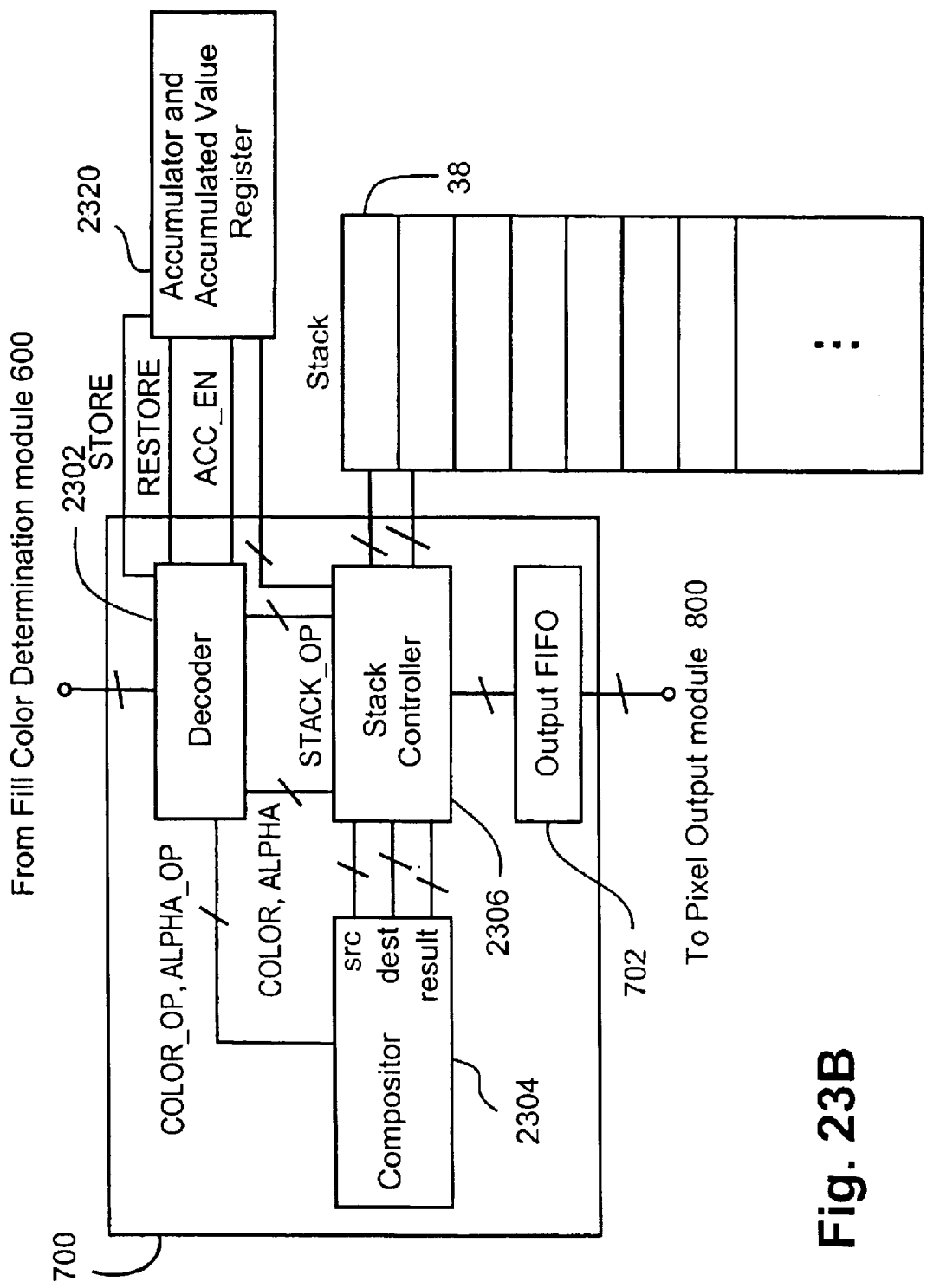
FIG. 23B is a schematic functional representation of the pixel compositing module of FIG. 3 in accordance with another arrangement.

As seen in FIG. 23A, an intermediate-value register 2310 is accessible to the decoder 2302 and the stack controller 2306. Values from the stack 38 may be stored in register 2310 and later restored to the stack 38, as described in more detail below. Another arrangement is seen in FIG. 23B, in which the register 2310 is replaced by an accumulator and accumulated value register 2320. The function of the accumulator unit 2320 is described in more detail in section 4.5.

Figure 24A:
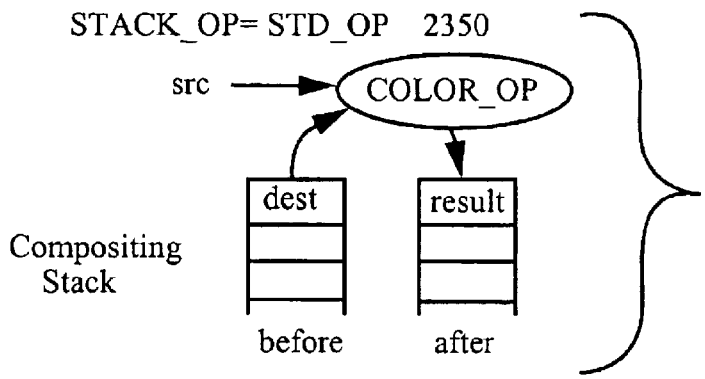
FIGS. 24A, B, C, and D shows the operation performed on the stack for each of the various stack operation commands in the Pixel Compositing Module 700 of FIG. 3.

FIGS. 24A, B, C, and D show the operation performed on the pixel compositing stack 38 for each of the various stack operation commands STACK_OP in the color composite messages.

FIG. 24A shows the standard operation STD_OP 2350 on the pixel compositing stack 38, where the source color and opacity (src) are obtained from the color composite message, and the destination color and opacity (dest) is popped from the top of the pixel compositing stack 38. The source color and opacity (src) is taken from the value in a current color composite message for the current operation, and destination color and opacity (dest) is popped from the top of the stack 38. The result of the COLOR_OP operation performed by the compositor 2304 is pushed back onto the stack 38.

Figure 24B:
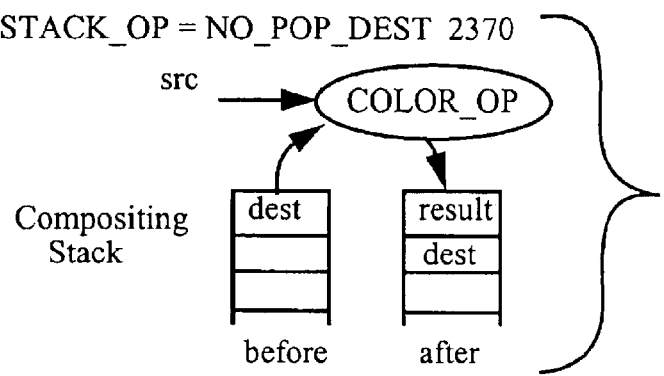

FIG. 24B shows the NO_POP_DEST stack operation 2370 on the pixel compositing stack 38. The source color and opacity (src) is taken from the value in a current composite message for the current operation, and the destination color and opacity (dest) is read from the top of the stack 38. The result of the COLOR_OP operation performed by the compositor 2304 is pushed onto the top of the stack 38.

Figure 24C:
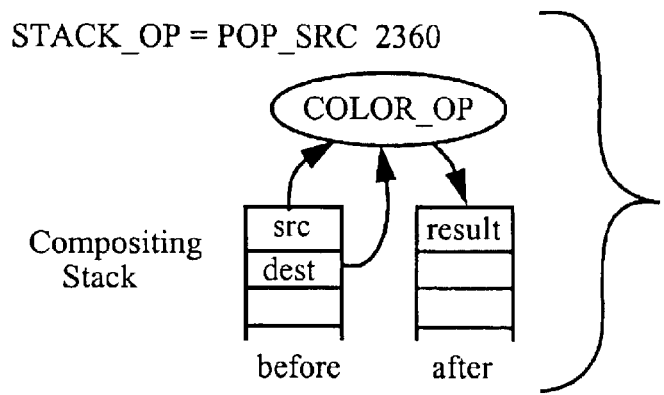

FIG. 24C shows the POP_SRC stack operation, where the source color and opacity are popped from the top of the stack, and the destination color and opacity is popped from the next level down the stack. The result of the COLOR_OP operation performed by the compositor 2304 is pushed onto the top of the stack.

Figure 24D:
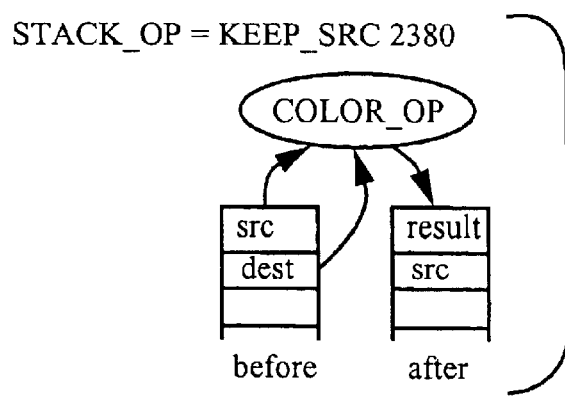

FIG. 24D shows the KEEP_SRC stack operation, where the source color and opacity are popped from the top of the stack, and the destination color and opacity is popped from the next level down the stack. The result of the COLOR_OP operation performed by the compositor 2304 is pushed onto the top of the stack.

Other stack operations can be used, without departing from the spirit of the invention.

Figure 7A:
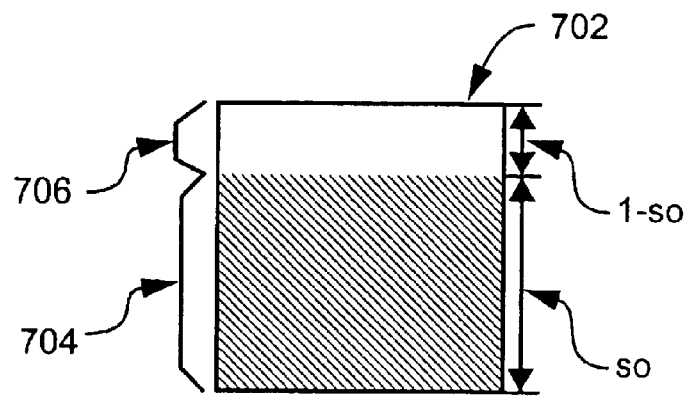
FIGS. 7A to 7C illustrate pixel combinations between source and destination.
Figure 7B:
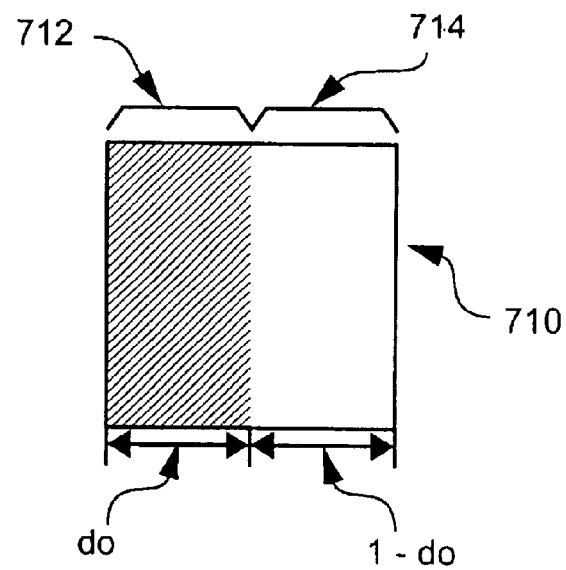
Figure 7C:
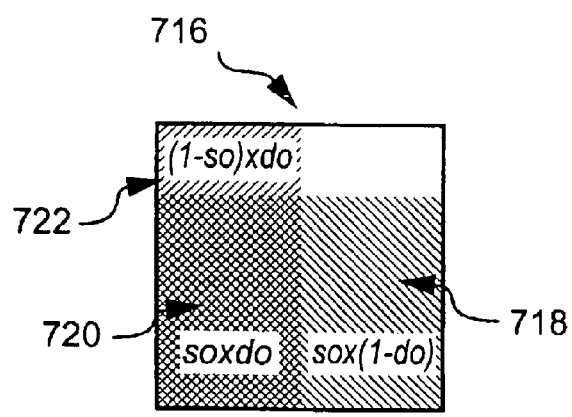

The manner in which the compositor 2304 combines the source (src) color and opacity with the destination (dest) color and opacity will now be described with reference to FIGS. 7A to 7C. For the purposes of this description, color and opacity values are considered to range from 0 to 1, (ie: normalised) although they are typically stored as 8-bit values in the range 0 to 255. For the purposes of compositing together two pixels, each pixel is regarded as being divided into two regions, one region being fully opaque and the other fully transparent, with the opacity value being an indication of the proportion of these two regions. FIG. 7A shows a source pixel 702 which has some three component color value not shown in the Figure and an opacity value, (so). The shaded region of the source pixel 702 represents the fully opaque portion 704 of the pixel 702. Similarly, the non-shaded region in FIG. 7A represents that proportion 706 of the source pixel 702 considered to be fully transparent. FIG. 7B shows a destination pixel 710 with some opacity value, (do). The shaded region of the destination pixel 710 represents the fully opaque portion 712 of the pixel 710. Similarly, the pixel 710 has a fully transparent portion 714. The opaque regions of the source pixel 702 and destination pixel 710 are, for the purposes of the combination, considered to be orthogonal to each other. The overlay 716 of these two pixels is shown in FIG. 7C. Three regions of interest exist, which include a source outside destination 718 which has an area of so*(1−do), a source intersect destination 720 which has an area of so*do, and a destination outside source 722 which has an area of (1−so)*do. The color value of each of these three regions is calculated conceptually independently. The source outside destination region 718 takes its color directly from the source color. The destination outside source region 722 takes its color directly from the destination color. The source intersect destination region 720 takes its color from a combination of the source and destination color.

The process of combining the source and destination color, as distinct from the other operations discussed above is termed a raster operation and is one of a set of functions as specified by the raster operation code from the pixel composite message. Some of the raster operations included in the preferred arrangement are shown in FIG. 19. Each function is applied to each pair of color components of the source and destination colors to obtain a like component in the resultant color. Many other functions are possible.

The alpha channel operation from the composite pixel message is also considered during the combination of the source and destination color. The alpha channel operation is performed using three flags LAO_USE_D_OUT_S, LAO_USE_S_OUT_D, LAO_USE_S_ROP_D, which respectively identify the regions of interest (1−so) *do, so*(1−do), and so*do in the overlay 716 of the source pixel 702 and the destination pixel 710. For each of the regions, a region opacity value is formed which is zero if the corresponding flag in the alpha channel operation is not set, else it is the area of the region.

The resultant opacity is formed from the sum of the region opacities. Each component of the result color is then formed by the sum of the products of each pair of region color and region opacity, divided by the resultant opacity.

As shown in FIG. 20, the Porter and Duff operations may be formed by suitable ALPHA_OP flag combinations and raster operators COLOR_OP, provided that both operands can be guaranteed to be active together. Because of the way the table is read, if only one of the operands is not active, then the operator will either not be performed, or will be performed with the wrong operand. Thus objects that are to be combined using Porter and Duff operations must be padded out with transparent pixels to an area that covers both objects in the operation. Other transparency operations may be formed in the same way as the Porter and Duff operations, using different binary operators as the COLOR_OP operation.

The resultant color and opacity is passed to the stack controller circuit and pushed onto the pixel compositing stack 38. However, if the stack operation is STACK_KEEP_SRC, the source value is pushed onto the stack before the result of the color composite message is pushed.

When an end of pixel message is encountered, the color and opacity value on top of the stack is formed into a pixel output message, and sent to the Pixel Output module. Repeat pixel messages are passed through the Pixel Compositing module to the Pixel Output module.

3.7 OVERVIEW OF PIXEL OUTPUT MODULE

The operation of the pixel output module 800 will now be described. Incoming messages are read from the pixel output FIFO, which include pixel output messages, repeat messages, and end of scanline messages are processed in sequence.

Upon receipt of a pixel output message the pixel output module 800 stores the pixel and also forwards the pixel to its output. Upon receipt of a repeat message the last stored pixel is forwarded to the output 898 as many times as specified by the count from the repeat message. Upon receipt of an end of scanline message the pixel output module 800 passes the message to its output.

The output 898 may connect as required to any device that utilizes pixel image data. Such devices include output devices such as video display units or printers, or memory storage devices such as hard disk, semiconductor RAM including line, band or frame stores, or a computer network. However, as will be apparent from the foregoing, a method and apparatus are described that provide for the rendering of graphic objects with full functionality demanded by sophisticated graphic description languages without a need for intermediate storage of pixel image data during the rendering process.

4.0 OPTIMISATION MODULE

The next module in the pipeline after the priority determination module 500 is the optimisation module 550. The optimisation module 550 seeks to minimise the number of fill priority messages and color composite messages that are sent to the fill determination and pixel compositing modules 600 and 700 respectively, and thus resulting in the reduction of compositing operations performed by the pixel compositing module 700.

The optimisation module 550 achieves this by looking for groups of fill priority messages that can be combined into a single color and opacity, which can be calculated once and stored into a register in the pixel compositing module 700 during the first pixel in a run. On subsequent pixels, the color and opacity can be restored from the register, rather than being calculated each time.

As mentioned previously, there are cases where all of the forwarded fill priority messages of the first pixel in a run of pixels between adjacent edge intersections have the x-independent flag asserted. In these cases all subsequent fill priority messages in the run of pixels can be replaced by a single repeat specification of count minus one. The pixel compositing module 700 then only needs to composite the first pixel in the run of pixels to generate the required constant color and opacity and pass this onto the pixel output module 800. The generated repeat command then is passed to the pixel output module 800 which reproduces the constant color and opacity for the subsequent pixels in the span of pixels from the color and opacity of the first pixel. In this fashion, compositing operations are not required for the subsequent pixels in the run of pixels and thus the number of compositing operations performed by the pixel compositing module 700 may be reduced.

There are many other cases, where one or more x-independent flags of the forwarded fill priority messages in a first pixel in run of pixels between adjacent edges are not asserted. For example, one of the objects associated with a fill priority message may be a bitmap, thus the color and opacity varies over the run of pixels. In these cases the optimisation module 550 identifies groups of fill priority messages in the first pixel of the run of pixels that have the x-independent flags asserted and passes this information to the pixel compositing module, which then calculates their combined color and opacity and stores it a register. On subsequent pixels, the color and opacity can be restored from the register rather than being calculated each time, thus leading to a reduction of compositing operations.

The optimisation module 550 can be implemented in a number of different ways, a few of which will now be described. The schematic block diagrams of FIGS. 25–29 describe hardware implementations of five arrangements.

In this regard it should be noted that, each one of the following first, second, third and fifth arrangements of the optimisation module is intended to be used in conjunction with the pixel compositing module as shown in FIG. 23A. On the other hand, the fourth arrangement of the optimisation module is intended to be used in conjunction with the pixel compositing module as shown in FIG. 23B.

4.1 A FIRST ARRANGEMENT OF THE OPTIMISATION MODULE

Figure 25:
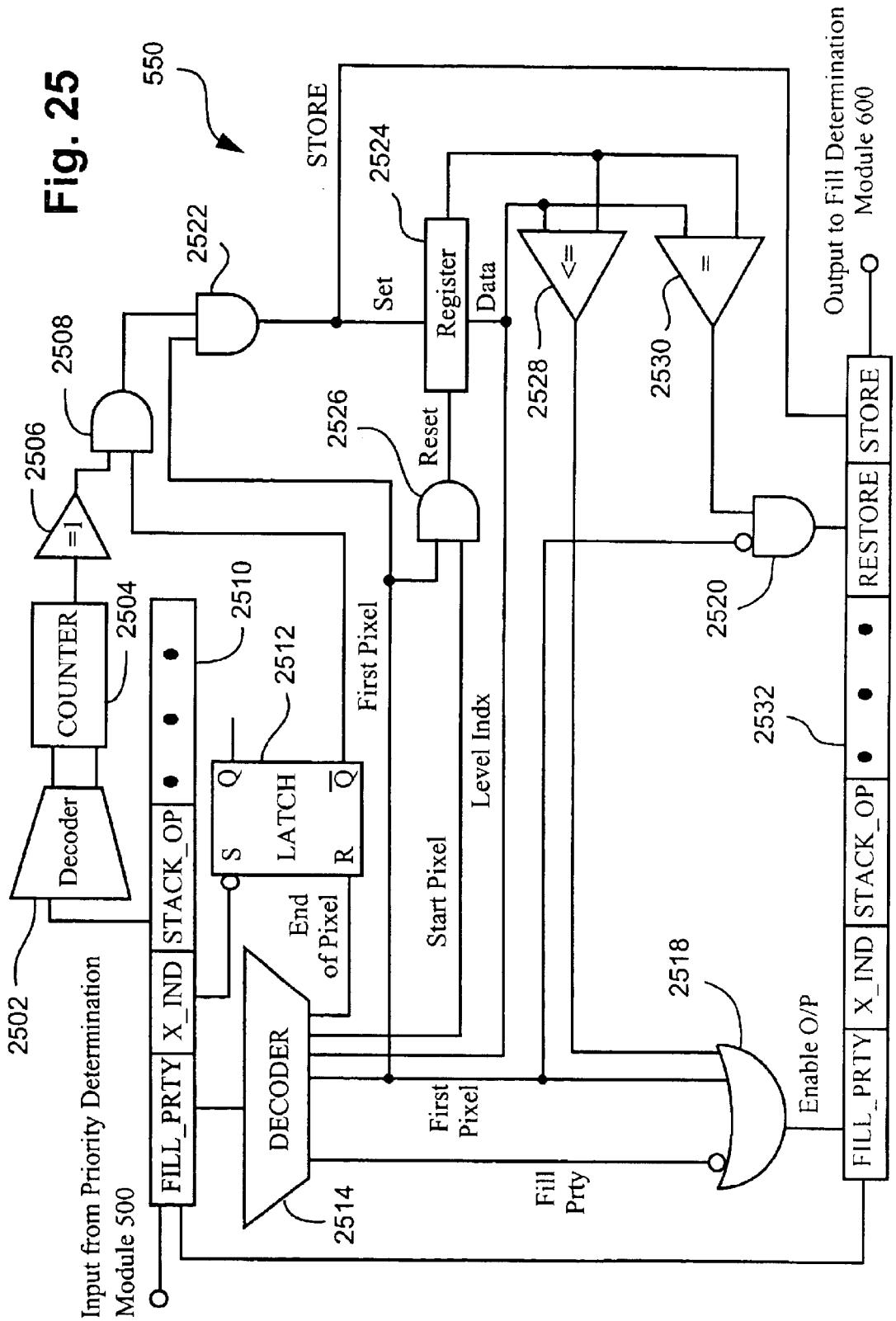
FIG. 25 shows a block diagram of the optimisation module 550 in accordance with a first arrangement.

Turning now to FIG. 25, there is shown a block diagram of the optimisation module 550 in accordance with the first arrangement. The optimisation module 550 takes as input the messages sent by the priority determination module 500 in sequence and stores them one at a time in an input shift register 2510. These messages may include start pixel, fill priority, end of pixel, and repeat messages etc. FIG. 25 shows, as an example, a fill priority message stored in the input shift register 2510. The optimisation module 550 also passes these messages to an output shift register 2532, in such a manner that the input and output registers 2510 and 2532 contain the same message at subsequent clock cycles. The output register 2532 outputs all of the messages that are not fill priority messages and only some of the fill priority messages to the fill determination module 600 as will be explained later. Those fill priority messages that are output from the output shift register 2532 are modified by the addition of two bits called STORE and RESTORE. FIG. 25 shows an example of such a modified fill priority message stored in the output shift register 2532. These STORE and RESTORE bits are initially de-asserted.

As mentioned previously, the fill priority messages are converted to color composite messages in the fill determination module 600 by the replacement of the fill index and fill type by the corresponding color and opacity values. These color composite messages including the STORE and RESTORE bits are then sent to the pixel compositing module 700 (FIG. 23A).

Turning now to FIG. 23A, the purpose of the STORE bit, when asserted, is to instruct the pixel compositing module 700 to store a copy of the top of the stack 38 in an intermediate-value register 2310 after completion of the compositing operation associated with the fill priority message having the STORE bit. The pixel compositing module 700 does not store a copy of the stack when the STORE bit is de-asserted. The purpose of the RESTORE bit, when asserted, is to instruct the pixel compositing module 700 to copy the contents of the intermediate-value register 2310 (FIG. 23A) to the top of the stack 38 (FIG. 23A). The pixel compositing module 700 does not copy the contents of the intermediate-value register 2310 to the stack when the RESTORE bit is de-asserted.

Returning now to FIG. 25, the optimisation module 550 comprises a decoder 2502 for decoding the type of stack operation contained in a fill priority message in the input register 2510. Specifically, the decoder 2502 determines whether the stack operation contained in the fill priority message is a NO_POP_DEST or a POP_SRC stack operation. The decoder 2502 is coupled to a counter 2504, and informs the counter when the stack operation is either a NO_POP_DEST or POP_SRC stack operation. The counter 2504 is initialised to one in response to a start of pixel message (not shown) and is incremented for each NO_POP_DEST stack operation, and decremented for each POP_SRC stack operation in the subsequent fill priority messages stored in the input register 2510. The current value of the counter 2504 determines the stack depth of the stack 38 in the pixel compositing module 700 that will be produced as a result of executing the determined stack operation of the current fill priority message. It is important to note that the counter 2504 predicts the depth of the stack 38 that results from the stack operation associated with a current fill priority message before the stack operation of the current fill priority message is actually performed. The counter 2504 does this by keeping a running count of the stack depth produced by the stack operations in the fill priority messages.

The counter 2504 is coupled to a comparator 2506 which detects when the counter 2504 increments/decrements to one, namely when the predicted stack depth is one. When the comparator 2506 detects that the count is one it asserts a first input to the AND gate 2508.

The optimisation module 550 also comprises a decoder 2514 for determining whether the message currently being stored in the input register 2510 is a fill priority message, a start of pixel message, or an end of pixel message, etc. Via latch 2512, the decoder 2514 also determines whether the fill priority message currently being stored in the input register 2510 is associated with a first pixel in a run of pixels, and the index to the corresponding record in the combined table 34 associated with that fill priority message. The decoder 2514 determines this information from the identifier code contained in the messages. For example, each fill priority message contains an identifier code FILL_PRTY for identifying the message as a fill priority message. This code also includes an index LEVEL_INDX to the corresponding record in the combined table 34, and also a code FIRST_PIXEL indicating whether or not this fill priority message belongs to a first pixel in a run of pixels.

The optimisation module 550 also comprises a RS latch 2512, which is reset when the decoder 2514 determines that the message stored in the input register 2510 is an end of pixel message. The latch 2512 is set when a x-dependent fill priority message is first encountered in the input register 2510. The latch 2512 when in the reset state asserts the second input to the aforementioned AND gate 2508 and when in the set state de-asserts the second input to the AND gate 2508.

The optimisation module 550 also comprises a further AND gate 2522 having a first and second input. The first input of the AND gate 2522 is coupled to the output of the AND gate 2508, and the second input is coupled the decoder 2514. The decoder 2514 asserts the second input of the AND gate 2522 when it determines that the fill priority message currently being stored in the input register 2510 is associated with the first pixel in a run of pixels.

The output of the AND gate 2522 is used to set the STORE bit instruction in the fill priority message currently being stored in the output register 2532. In this fashion, the optimisation module 550 asserts this STORE bit instruction if:

(1) The message in the input and output registers 2510 and 2532 is a fill priority message associated with a first pixel in a run of pixels;

(2) The counter 2504 currently has a count of one and thus the predicted depth of the stack 38 is one; and (3) All of the fill priority messages which have been processed so far, including the currently stored fill priority message, since the last end of pixel message have been X-independent.

The optimisation module 550 also comprises a register 2524 that stores an index of the lowest fill priority message that contributes to the subsequent pixels in the run. It is important to note that the fill priority messages are forwarded to the optimisation module 550 in bottom to top order. An object's priority designates the location (viz level) of the object in the order of the objects from the rearmost object to the foremost object. The fill priority messages corresponding to each object contributing to a pixel are forwarded to the optimisation module 550 in rearmost (lowest) to foremost (top) order. The optimisation module 550 passes to the fill determination module 600 all fill priority messages associated with a first pixel of a run of pixels, but passes only some of the fill priority messages during the subsequent pixels during that run. Specifically, the same subgroup of fill priority messages, of the group of fill priority messages passed during the first pixel of the run of pixels, is passed during each subsequent pixel of the run. The register 2524 stores the index to the record in the combined table 34 that corresponds to the lowest fill priority message of this subgroup sent during subsequent pixels in the run.

The storage of this index in the register 2524 is achieved in the following manner. The decoder 2514 decodes the identifier message stored in the input register 2510 and if it is a fill priority message obtains from this identifier the level index LEVEL_INDX of the record in the combined table 34 associated with the fill priority message. This level index LEVEL_INDX is sent to an input of the register 2524. If the output of the AND gate 2522 asserts the STORE bit instruction for this fill priority message it also sets the register 2525 to store the level index LEVEL_INDX currently on the register's 2524 input. Thus the register 2524 will have stored therein the level index of the fill priority message currently stored in the input registers 2510 and 2532 that has had its STORE bit instruction asserted. It should be noted that if a further fill priority message is stored in the input and output registers 2510 2532 for a current pixel and that fill priority message has had its STORE bit instruction asserted, then the level index currently stored in the register will be overwritten by the level index associated with the further fill priority message.

On the other hand, if the decoder 2514 identifies that the message in the input register is a start of pixel message and the next message is a fill priority message associated with a first pixel in a run of pixels, then the decoder asserts both inputs of the AND gate 2526, which in turn resets the register 2524.

The circuitry of the optimisation module 550 described so far is primarily concerned with the setting of the STORE instruction bit associated with a group of one or more fill priority messages associated with the first pixel in the run of pixels. The following description of the optimisation module 550 is primarily concerned with the setting of the RESTORE instruction bit associated with a subgroup of one or more fill priority messages associated with the subsequent pixels in the run of pixels.

The optimisation module further comprises a comparator 2530 which compares the level index currently stored in the register 2524 with the level index of the fill priority message currently being stored in the input register 2510. In the event the level indices are the same the comparator 2520 asserts a first input to an AND gate 2520. Additionally, if the decoder 2514 determines the fill priority message currently stored in the input register 2510 is associated with a first pixel of a run of pixels, then the decoder 2514 asserts an inverted second input of the AND gate 2520 and thus de-asserts the AND gate 2520. Otherwise, it de-asserts the inverted second input of the AND gate 2520. The AND gate 2520 when asserted will assert the RESTORE bit instruction of the fill priority message currently stored in the output register 2532.

In this fashion, the AND gate 2520 will assert the RESTORE bit instruction if:

(1) The message in the input and output registers 2510 and 2532 is a fill priority message associated with a pixel subsequent to a first pixel in a run of pixels; and (2) The level index of the fill priority message currently being stored in the input and output registers 2510 and 2532 is equal to the level index of that fill priority message of the first pixel in the run of pixels having the uppermost (foremost) level index that has a STORE bit instruction asserted.

The optimisation module further comprises a further comparator 2528 which compares the level index currently stored in the register 2524 with the level index of the fill priority message currently being stored in the input register 2510. In the event the level index of the fill message currently being stored in the input register 2510 is the same as or greater than the index currently stored in the register 2524, the comparator asserts a first input of an OR gate 2518.

The purpose of the OR gate 2518 is to enable the output of the messages contained in the output register 2532. In this fashion, all fill priority messages that are associated with a pixel subsequent to a first pixel in a run of pixels and whose index is the same as or greater than the index currently stored in the register 2524 will be enabled for output. The enabled fill priority messages are passed to the fill determination module 600. Any remaining fill priority messages that are not enabled for output are not passed to the fill determination module 600. Also any non fill priority messages are also enabled for output to the fill determination module 600.

Returning to the decoder 2514, the decoder 2514 reads the identifier in the message currently being stored in the input register 2510 and determines whether this message is a fill priority message. In the event the message is NOT a fill priority message, the decoder 2514 de-asserts an inverted input of the OR gate 2518, which in turn asserts the OR gate 2518 which in turn enables the output of the message contained in the output register 2532. In this fashion all messages that are not fill priority messages are enabled for output and passed to the fill determination module 600.

Similarly, in the event the decoder 2514 determines that the message currently being stored in the input register 2510 is a fill priority message associated with a first pixel of a run of pixels, the decoder asserts another input of the OR gate 2518. The OR gate 2518 is asserted and in turn enables the output of the message contained in the output register 2532. In this fashion all fill priority messages that are associated with a first pixel in a run of pixels are enabled for output and passed to the fill determination module 600.

The operation of the optimisation module 550 is now described with reference to FIG. 25.

At the start of a pixel run, the counter 2504 is set to 1, the latch 2512 is reset, and the register 2524 is reset to zero.

As each fill priority message for the pixel run passes through the optimisation module 550, the stack operation is decoded by the decoder 2502. If the stack operation is NO_POP_DEST, the counter 2504 is incremented because the operation will increase the depth of the stack 38 by one when performed by the pixel compositing module 700. If the stack operation is POP_SRC, the counter 2504 is decremented because such an operation decreases the stack depth by one. Otherwise, no action is taken by the counter 2504. Also the X-independent flag is checked, and if de-asserted, the latch 2512 is asserted. The latch 2512 remains asserted until the end of pixel message is encountered.

On the first pixel of a run, as each fill priority message passes out of the optimisation module 550, the STORE bit is asserted for operations where the stack depth counter is equal to 1, and the X-dependent latch 2512 is de-asserted. When the STORE bit is asserted, the register 2524 containing the index of the last stored level, is overwritten with the current level's index.

When the STORE bit is asserted in a fill priority message and the message is passed via the fill determination module 600 to the pixel compositing module 700 as a color composite message, it causes the pixel compositing module 700 to store, into the intermediate-value register 2310, the value on top of the compositing stack after the operation has been performed. Thus, the last stored value will be the last value on a 1-deep stack in the pixel compositing module 700 prior to the first operation with X-dependent data. Also, if the STORE bit has been asserted for an operation, the level index of the next contributing operation is saved in the register 2524.

When all of the fill priority messages have been passed to the downstream modules (indicated by an end of pixel message), the latch 2512 is reset.

On pixels subsequent to a first pixel in a run of pixels, if the fill priority message associated with a subsequent pixel has an index greater than or equal to the index stored in the register 2524, then the fill priority message is passed to the fill determination module 600. However, if the index of the fill priority message is less than the index currently stored in the register 2524, then the fill priority message is not passed to the fill determination module 600. In addition, if the fill priority message is equal to the index stored in the register 2524 then the optimisation module 550 asserts a RESTORE bit in the fill priority message prior to passing this message to the fill determination module 600. This RESTORE bit instructs the pixel compositing module 700 to copy the contents of the intermediate-value register 2310 (FIG. 23A) to the top of the stack 38 (FIG. 23A).

The hardware arrangement of FIG. 25 manipulates the STORE and RESTORE bits of the fill priority messages. The components that act on the STORE bit may be regarded as a first functional unit, and the components that act on the RESTORE bit may be regarded as a second functional unit.

Turning now to FIGS. 30A and 30B there is shown a comparison between an exemplary original sequence of fill priority messages for a first pixel in a run of pixels and the optimised sequence of fill priority messages for subsequent pixels optimised by the optimisation module 550 in accordance with the first arrangement.

FIG. 30A shows an exemplary sequence of fill priority messages 3001–3008 output by the optimisation module 550 for a first pixel in a run of pixels between adjacent edges. It is important to recognise that the sequences of fill priority messages generated by the fill priority determination module 500 for each pixel in a run of pixels and that are sent to the optimisation module 550 are the same.

The optimisation module 550 passes all of the fill priority messages for the first pixel in the run to the fill determination module 600. In addition, it adds two extra bits STORE and RESTORE. During the first pixel in the run, the optimisation module asserts the STORE bit if the counter 2504 currently has a count of one and thus the predicted depth of the stack 38 is one; and all of the fill priority messages which have been processed so far for the current pixel, including the current fill priority message, are X-independent.

Turning now to FIG. 30A, the fill priority messages 3001–3008 of the first pixel in the run are sent to and passed by the optimisation module 550 in order from the rearmost to the topmost priority order. Namely, the fill priority messages 3001–3008 are sent to and passed by the optimisation module 550 in the following order 3001, 3002, 3003, 3004, 3005, 3006, 3007, 3008. It can thus been seen that the counter 2504 has a count of 1, 2, 2, 1, 2, 2, 1, 1 for fill priority messages 3001–3008 respectively. Also, the fill priority messages 3001–3006 meet the criteria that all of the fill priority messages processed so far including the current fill message are X-independent. Thus the STORE bit will be asserted for fill messages 3001 and 3004. The RESTORE bit is de-asserted for all fill messages 3001–3008 associated with the first pixel in the run.

These fill priority messages 3001–3008 associated with the first pixel in the run are passed to the fill determination module 600 and converted to color composite messages and then sent to the pixel compositing module 700. The pixel compositing module 700 upon receipt of a color composite message having a STORE bit asserted will copy the top of the stack 38 to an intermediate-value register 2310 after the compositing operation of the pixel compositing message has been completed. In the event a sequence of color composite messages are received each having their STORE bit asserted, the pixel compositing module 700 will overwrite a previous value stored in the intermediate-value register with the copy of the stack 38 associated with a subsequent color composite message. In this particular example, the intermediate-value register 2310 will contain a copy of the top of the stack 38 that results after the completion of the compositing operation associated with the fill priority message 3004.

Turning now to FIG. 30B, there is shown the fill priority messages that are passed by the optimisation module 550 during each pixel that is subsequent to the first pixel in the run. Firstly, it should be noted that the register 2524 (FIG. 25) after the sending of the fill priority messages of the first pixel in the run contains the level index of the fill priority message 3004. Consequently, the output of the shift register 2532 is enabled for sending fill priority messages for subsequent pixels in the run only when the index of these fill priority messages have an index greater than or equal to the index stored in the register 2524. Thus the optimisation module 550 in this particular example will pass only fill priority messages 3004–3008 for subsequent pixels in the run. The optimisation module 550 also asserts the RESTORE bit instruction of the fill priority message 3004 as the level index of this instruction is equal to the level index stored in the register 2524 (FIG. 25). The STORE bit instruction is de-asserted for all fill priority messages associated with pixels subsequent to the first pixel in the run.

It should be noted that the optimisation module 550 manipulates only the STORE and RESTORE bits of the fill priority messages, it leaves the other fields of the fill priority messages unchanged.

These fill priority messages 3004–3008 are passed by the optimisation module 550 for each pixel subsequent to the first pixel in the run to the fill determination module 600. The fill determination converts these fill priority messages to corresponding color composite messages and then sent to the pixel compositing module 700. The pixel compositing module 700 upon receipt of a color composite message (eg. 3004) having a RESTORE bit asserted will copy the color and opacity value stored in the intermediate-value register 2310 to the top of the stack. The pixel compositing module 700 then proceeds in the usual fashion according to the instructions contained in the color composite messages corresponding to the fill priority messages 3005–3008.

It can thus be seen the resultant color and opacity of a group of X-independent compositing operations may been completed and stored during a first pixel in the run and retrieved for use during subsequent pixels in the run.

4.2 A SECOND ARRANGEMENT OF THE OPTIMISATION MODULE

Figure 26:
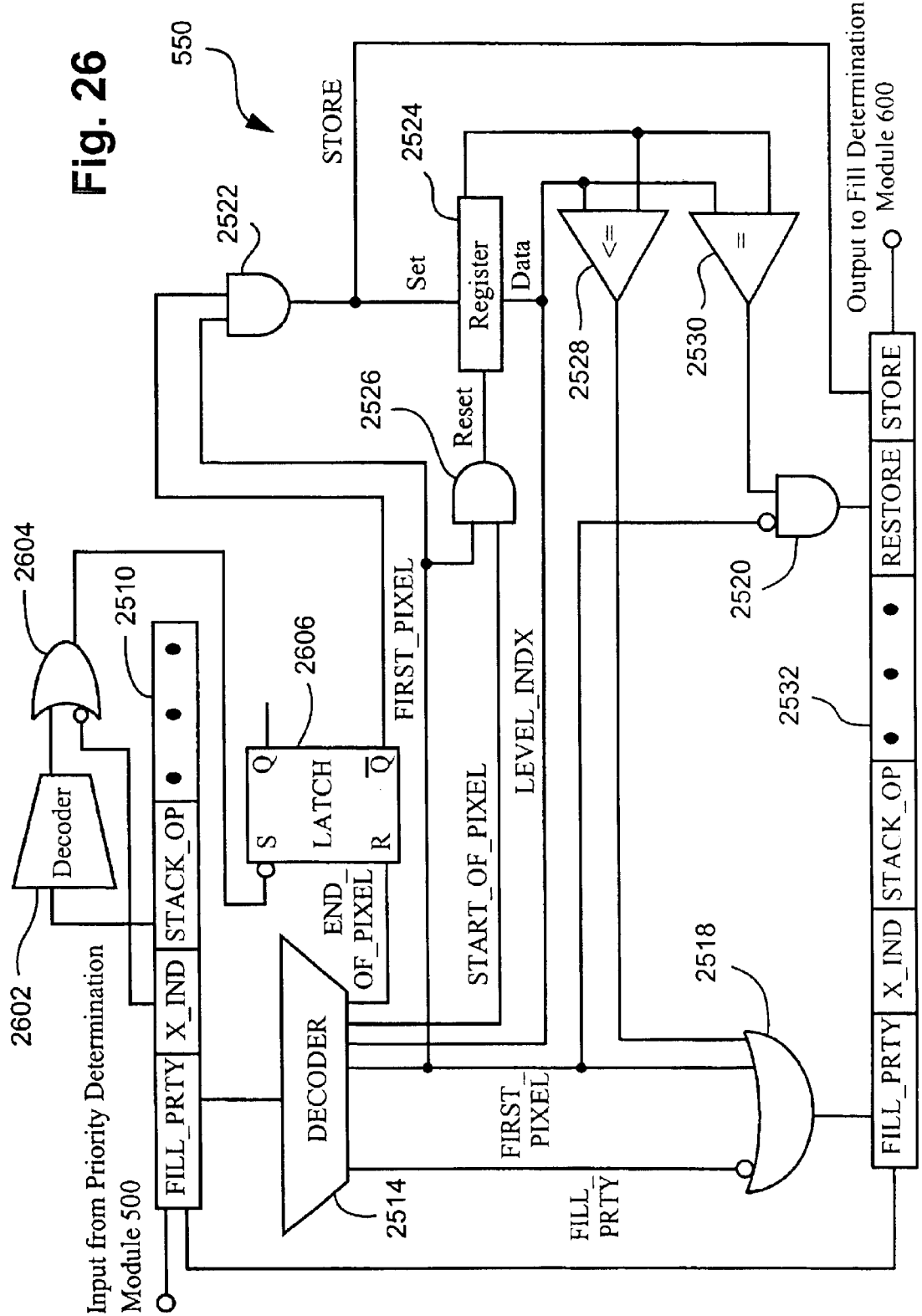
FIG. 26 shows a block diagram of the optimisation module 550 in accordance with a second arrangement.

Turning now to FIG. 26, there is shown a block diagram of the optimisation module 550 in accordance with the second arrangement, which implements another approach to that of the first arrangement.

The optimisation module 550 in accordance with the second arrangement passes the fill priority messages and sets the RESTORE bit instruction in the fill priority messages in substantially similar manner as the first arrangement and that part of the module will not be described in any detail. In this regard, those parts of the second arrangement having the same reference numerals as the first arrangement operate in the same manner as the first arrangement. Moreover, the pixel compositing module 700 used in conjunction with both these first and second arrangements has the same functionality and operates in the same manner.

The optimisation module 550 in accordance with the second arrangement asserts the STORE bit instruction in the fill priority messages in a different manner to that of the first arrangement. In this case, the decoder 2602 determines whether the stack operation in the fill priority message currently stored in the input register 2510 is a NO_POP_DEST and if this is the case asserts a first input of an OR gate 2604. The optimisation module 550 also feeds the state of the x-independent flag of the fill priority message to an inverted input of the OR-gate 2604. The output of the OR-gate 2604 is fed to an S input of an RS latch 2606. In addition, an END_OF_PIXEL message from decoder 2514 is fed to an R input of the RS latch 2606. The $\overline{Q}$ output of the latch 2606 is fed to one input of an AND gate 2522, and the decoder 2514 also feeds an FIRST_PIXEL message to the other input of the AND gate 2522.

Thus in this arrangement, the latch 2606 is initially de-asserted at the start of the pixel, and the first time a NO_POP_DEST stack operation, or a X-dependent operand is encountered in a fill priority message during the pixel, then the latch 2606 is asserted. If the latch 2606 is not asserted and the pixel is a first pixel in the run then the STORE bit is asserted and the register 2524 is set. When the latch 2606 is asserted for the first pixel in the run it remains asserted for that pixel and no longer sets the STORE bit, and the register 2524 for that first pixel in the run.

In this second arrangement, the determination of the STORE and RESTORE bit instructions differ from the determination of the STORE and RESTORE bit instruction in the first arrangement. Consequently, the fill priority messages that are passed by the optimisation module 550 in accordance with the second arrangement during subsequent pixels can differ from the first arrangement.

Turning now to FIGS. 31A and 31B there is shown a comparison between an exemplary original sequence of fill priority messages for a first pixel in a run of pixels and the optimised sequence of fill priority messages for subsequent pixels optimised by the optimisation module 550 in accordance with the second arrangement.

Turning now to FIG. 31A, the fill priority messages 3101–3108 of the first pixel in the run are sent to and passed by the optimisation module 550 in order from the rearmost to the topmost priority order. Namely, the fill priority messages 3101–3108 are sent to and passed by the optimisation module 550 in the following order 3101, 3102, 3103, 3104, 3105, 3106, 3107, and 3108. It can thus been seen that the STORE bit instruction will be asserted for those fill priority messages first in the priority order that are X-independent and that do not contain a NO_POP_DEST stack operation. Once a NO_POP_DEST stack operation or an X-dependent operand of a fill priority message is encountered the associated STORE bit is de-asserted and the STORE bits are de-asserted for the remaining fill priority messages in the priority order. Thus the STORE bit will be asserted for fill messages 3101 and 3102. The RESTORE bit is de-asserted for all fill messages 3101-3108 associated with the first pixel in the run.

Turning now to FIG. 31B, there is shown the fill priority messages that are passed by the optimisation module 550 during each pixel that is subsequent to the first pixel in the run. Firstly, it should be noted that the register 2524 (FIG. 26) after the sending of the fill priority messages of the first pixel in the run contains the level index of the fill priority message 3102. Consequently, the output of the shift register 2532 is enabled for sending fill priority messages for subsequent pixels in the run only when the index of these fill priority messages have an index greater than or equal to the index stored in the register 2524. Thus the optimisation module 550 in this particular example will pass only fill priority messages 3102–3108 for subsequent pixels in the run. The optimisation module 550 also asserts the RESTORE bit instruction of the fill priority message 3102 as the level index of this instruction is equal to the level index stored in the register 2524 (FIG. 26). The STORE bit instruction is de-asserted for all fill priority messages associated with pixels subsequent to the first pixel in the run.

In this fashion, the resultant color and opacity of a group of X-independent compositing operations can been completed and stored in a register in the pixel compositing module during a first pixel in the run and retrieved for use during subsequent pixels in the run.

4.3 A THIRD ARRANGEMENT OF THE OPTIMISATION MODULE

Another alternative is to store the state of the whole stack when the X-independent operation is encountered, and restore the stack from this store on subsequent pixels in the run. This is less restrictive, although in a hardware implementation it requires a lot of fast on-chip memory or registers.

If enough registers or memory cells are available in the pixel compositing module 700, then the state of the stack can be saved prior to the first occurrence of an X-dependent operation. This allows a relaxation of the requirement that the stack depth must be one when storage of the state is performed. In this case, the counter in the optimization stage is not required, however the complexity of the pixel compositing module is greatly increased.

Figure 27:
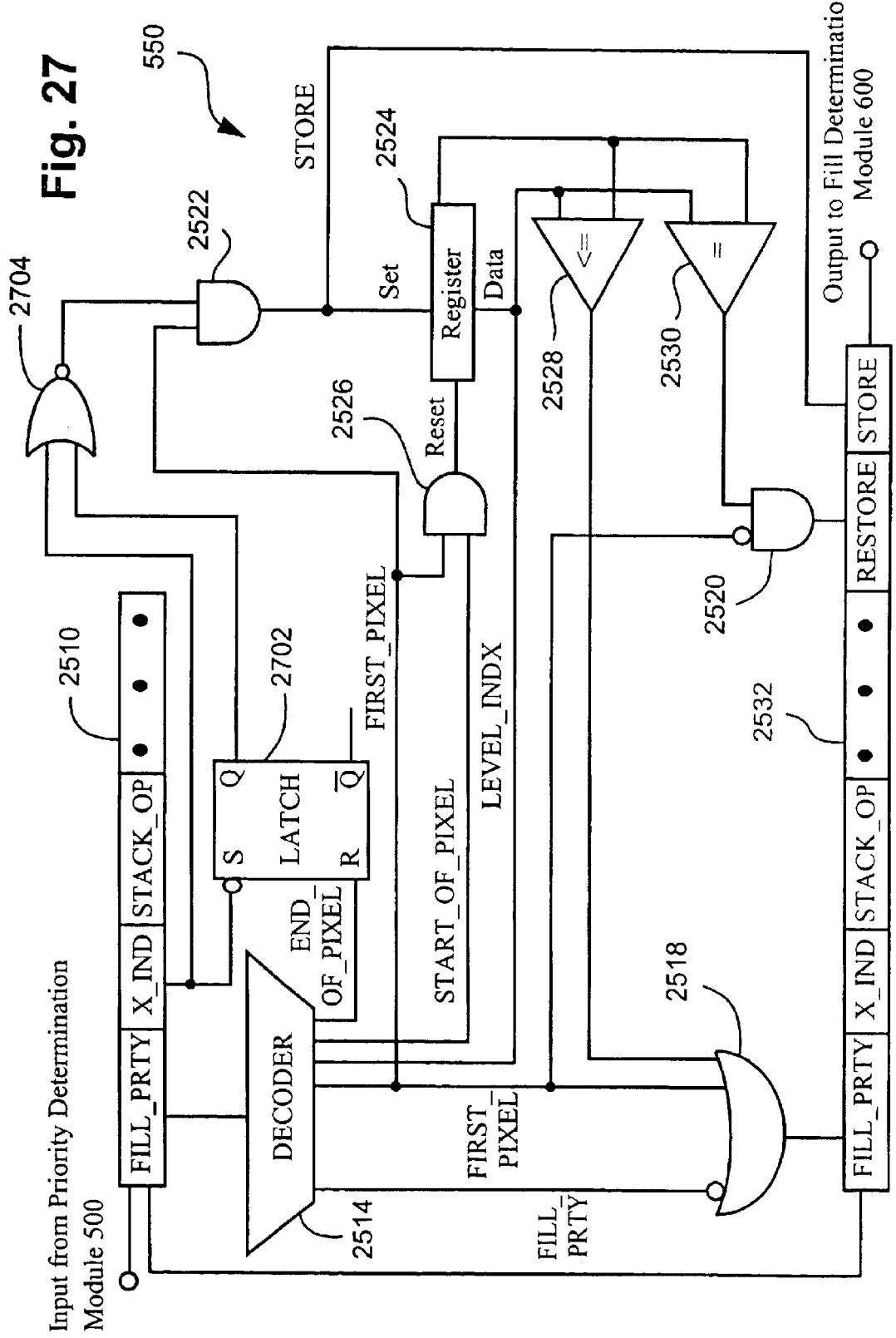
FIG. 27 shows a block diagram of the optimisation module 550 in accordance with a third arrangement.

Turning now to FIG. 27, there is shown a block diagram of the optimisation module 550 in accordance with the third arrangement, which implements another approach to that of the first and second arrangements.

The optimisation module 550 in accordance with the third arrangement passes the fill priority messages and sets the RESTORE bit instruction in the fill priority messages in a substantially similar manner to the first and second arrangements and that part of the module will not be described in any detail. In this regard, those parts of the third arrangement having the same reference numerals as the first arrangement operate in the same manner as the first arrangement.

The optimisation module 550 in accordance with the third arrangement asserts the STORE bit instruction in the fill priority messages in a different manner to that of the first and second arrangements. In this case, the optimisation module 550 outputs the x-independent flag of the fill priority messages to an inverted S input of a RS latch 2702 and to a first input of a NOR gate 2704. The Q output of the latch 2702 is fed to a second input of the NOR gate 2704. The decoder 2514 resets the latch 2702 via its R input when an end of pixel message is encountered. In this fashion, the latch 2702 is asserted after it encounters the first x-dependent fill priority message of a pixel and stays asserted until it is reset when the end of pixel is encountered. Thus the STORE bit instruction is asserted when an x-dependent fill priority message associated with a first pixel in a run of pixels is encountered. The latch 2702 is used to ensure that the STORE bit instruction is only asserted once for any pixel run.

In this third arrangement, the determination of the STORE and RESTORE bit instructions differ from the determination of the STORE and RESTORE bit instruction in the first and second arrangement. Consequently, the fill priority messages that are passed by the optimisation module 550 in accordance with the second arrangement during subsequent pixels can differ from the first and second arrangement.

The pixel compositing module 700 to be used in conjunction with this arrangement of the optimisation module 550 is modified to enable the storage of the stack in response to a STORE bit instruction. Specifically the intermediate-value register 2310 is replaced with a set of registers to enable a copy of the stack to be stored in these registers.

When the pixel compositing module 700 receives a color_composite message (derived from a fill priority message) with the STORE bit instruction asserted, it stores the state of the compositing stack in the set of registers. For each subsequent pixel until the end of the pixel run, the stack is initialised to the saved state, before any compositing operations are performed. Thus, the operations prior to the instruction on which the stack was saved do not need to be performed for subsequent pixels.

If the latch 2702 is asserted and the register 2524 is equal to lowest active level, then such an optimization is not possible. In this case, all of the contributing operations for the pixel run are sent to the downstream modules for each pixel in the run.

Turning now to FIGS. 32A and 32B there is shown a comparison between an exemplary original sequence of fill priority messages for a first pixel in a run of pixels and the optimised sequence of fill priority messages for subsequent pixels optimised by the optimisation module 550 in accordance with the third arrangement. In this particular example, it should be noted the fill priority messages for the first pixel in the run (FIG. 32A) are the same as those shown for in FIG. 30A, with the exception of the STORE bit instruction.

Turning now to FIG. 32A, the fill priority messages 3201–3208 of the first pixel in the run are sent to and passed by the optimisation module 550 in order from the rearmost to the topmost priority order. Namely, the fill priority messages 3201–3208 are sent to and passed by the optimisation module 550 in the following order 3201, 3202, 3203, 3204, 3205, 3206, 3207, 3208. It can thus been seen that the STORE bit instruction will be asserted for the first fill priority message that is encountered that is x-dependent, and no others. Thus the STORE bit will be asserted for fill messages 3207. The RESTORE bit is de-asserted for all fill messages 3201–3208 associated with the first pixel in the run.

Turning now to FIG. 32B, there is shown the fill priority messages that are passed by the optimisation module 550 during each pixel that is subsequent to the first pixel in the run. Firstly, it should be noted that the register 2524 (FIG. 25) after the sending of the fill priority messages of the first pixel in the run contains the level index of the fill priority message 3207. Consequently, the output of the shift register 2532 is enabled for sending fill priority messages for subsequent pixels in the run only when the index of these fill priority messages have an index greater than or equal to the index stored in the register 2524. Thus the optimisation module 550 in this particular example will pass only fill priority messages 3207–3208 for subsequent pixels in the run. The optimisation module 550 also asserts the RESTORE bit instruction of the fill priority message 3207 as the level index of this instruction is equal to the level index stored in the register 2524 (FIG. 27). The STORE bit instruction is de-asserted for all fill priority messages associated with pixels subsequent to the first pixel in the run.

It should be noted that the implementation of the pixel compositing module 700 used in conjunction with the present arrangement differs from the pixel compositing module 700 used in conjunction with the first and second arrangements. In the latter, an color composite message (derived from a fill priority message) containing a RESTORE bit instruction will retrieve the contents of the intermediate-value register 2310 of the pixel compositing module 700 to the stack 38 and then proceed to implement the compositing operations of the next color composite message. On the other hand, the pixel compositing module 700 used in conjunction with the third arrangement of the optimisation module 700 will retrieve the state of the stack in the set of registers to the stack 38 and then perform the compositing operations associated with the current color compositing message.

It this fashion, the resultant color and opacity of a group of X-independent compositing operations can be completed and stored in a set of registers in the pixel compositing module during a first pixel in the run and retrieved for use during subsequent pixels in the run.

4.4 A FOURTH ARRANGEMENT OF THE OPTIMISATION MODULE

The fourth arrangement of the optimisation module 550 determines associative compositing operations in the fill priority messages, so that the sequences of associative operations with x-independent color can be optimised into a single operation. Several registers are available to store intermediate data in the pixel compositing module, so that several runs of X-independent operations in a single operation stream may be optimised. In this arrangement, the presence of x-dependent operations does not prevent optimisation of subsequent operations, although the set of optimisable operations is reduced as not all operations are associative, and all operations in a sequence must be identical in order to be optimisable. Nevertheless, the Porter and Duff OVER operation is associative, and in systems where transparency operations are supported, OVER is the most common operation.

If an operation is associative, such that (AopB)opC=Aop (BopC), then the order in which a sequence of such an operations is performed can be altered, so that x-independent operations are performed first: The result of one or more sequences of x-independent operations can then be saved in registers to be used in subsequent pixels. The operator has to be the same for any such run, as while there are many associative operators, they cannot be mixed in general. In order to be optimisable, a run of associative operations must be a full sub-expression, and so it must finish with the same stack depth as it starts.

A comparison is used to identify a particular associative operator, herein denoted ASS_OP, and chosen from the list of possible combinations of alpha and color operators. The ASS_OP operation may be hard-wired, or stored in a register, which allows the software driver to determine which operator is to be used.

Figure 28A:
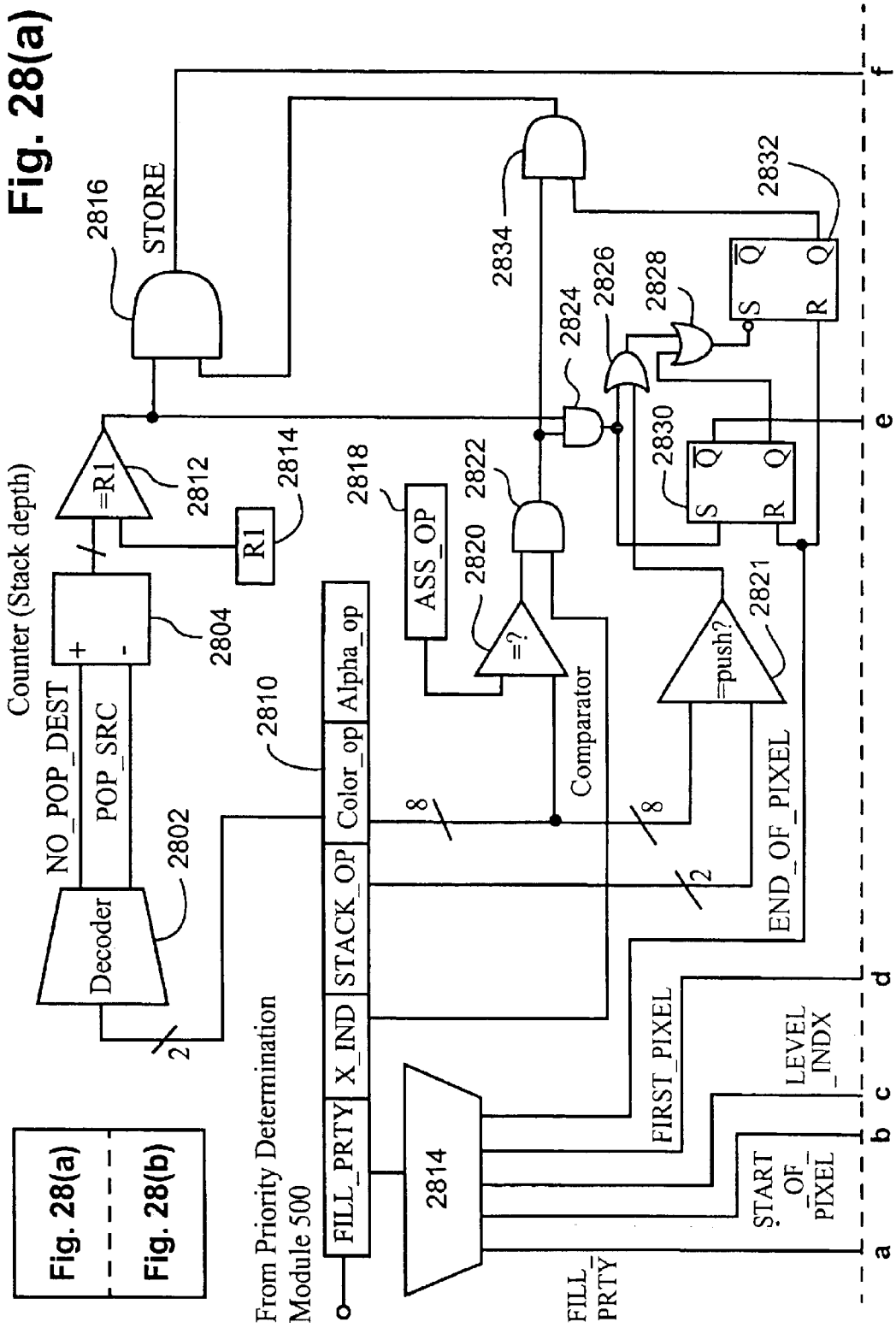
FIGS. 28(a) and 28(b) shows a block diagram of the optimisation module 550 in accordance with a fourth arrangement.
Figure 28B:
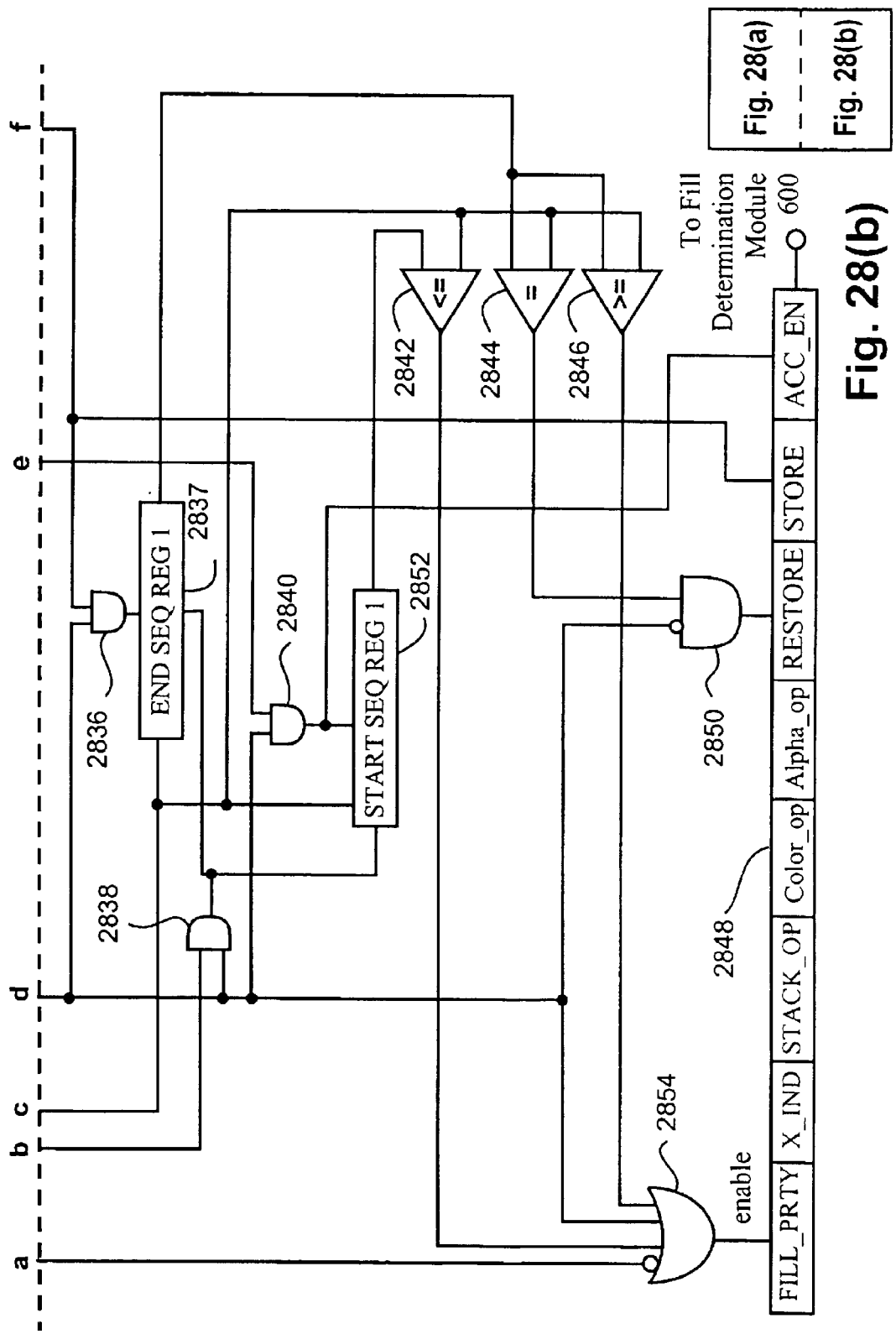

Turning now to FIG. 28, there is shown a block diagram of the optimisation module 550 in accordance with a fourth arrangement. The optimisation module 550 takes as input the messages sent by the priority determination module 500 in sequence and stores them one at a time in an input shift register 2810. These messages may include start pixel, fill priority, end of pixel, and repeat messages etc. FIG. 28 shows, as an example, a fill priority message stored in the input shift register 2810. The optimisation module 550 also passes these messages to an output shift register 2848, in such a manner that the input and output registers 2810 and 2848 contain the same message in sequential clock cycles. The output register 2848 outputs all of the messages that are not fill priority messages and only some of the fill priority messages to the fill determination module 600 as will be explained latter. Those fill priority messages that are output from the output shift register 2848 are modified by the addition of three bits called STORE, RESTORE, and ACC_EN. FIG. 28 shows an example of such a modified fill priority message stored in the output shift register 2836. The STORE RESTORE, and ACC_EN bits are initially de-asserted.

As mentioned previously, the fill priority messages are converted to color composite messages in the fill determination module 600 by the replacement of the fill index and fill type by the corresponding color and opacity values. These color composite messages including the STORE, RESTORE and ACC_EN bits are then sent to the pixel compositing module 700 shown in FIG. 23B.

Returning now to FIG. 28, the optimisation module 550 also comprises a decoder 2814, which determines whether the message stored in the input register 2810 is a start_of_pixel, end_of_pixel, or a fill priority message. The decoder 2814 outputs respective binary signals START_OF_PIXEL, END_OF_PIXEL, and FILL_PRTY in response thereto. In the event the message is a fill priority message, the decoder 2814 also determines whether the fill priority message is associated with a first pixel in a run of pixels and outputs a binary signal FIRST_PIXEL. The decoder 2814 also determines the priority level index contained in the fill priority message and outputs data LEVEL_INDX representative of that index.

The optimisation module 550 further comprises a decoder 2802 coupled to the input register 2810 for decoding the type of stack operation contained in a fill priority message in the input register 2810. Specifically, the decoder 2802 determines whether the stack operation contained in the fill priority message is a NO_POP_DEST or a POP_SRC stack operation.

The decoder 2802 is coupled to a counter 2804, and informs the counter 2804 when the stack operation is either a NO_POP_DEST or POP_SRC stack operation. The counter 2804 is initialised to one in response to a START_OF_PIXEL signal received from the decoder 2814 (not shown). The counter 2804 is then incremented for each NO_POP_DEST stack operation, and decremented for each POP_SRC stack operation in the subsequent fill priority messages stored in the input register 2810. The current value of the counter 2804 determines the stack depth of the stack 38 in the pixel compositing module 700 that will be produced as a result of executing the determined stack operation of the current fill priority message. It is important to note that the counter 2804 predicts the depth of the stack 38 that results from the stack operation associated with a current fill priority message before the stack operation of the current fill priority message is actually performed. The counter 2804 does this by keeping a running count of the stack depth produced by the stack operations in the fill priority messages.

The output of the counter 2804 is coupled to a first input of a comparator 2812. The other input of the comparator 2812 is coupled to a register 2814 which stores a value R1 of a predetermined stack depth. The counter 2804 increments/decrements the predicted stack depth in response to a sequence of fill priority messages inputted through the shift register 2810 and the comparator 2812 determines when the predicted stack depth is equal to R1. When the predicted stack depth is equal to R1 the comparator 2812 asserts a first input of an AND gate 2816 and a first input of an AND gate 2824.

The optimisation module also comprises a comparator 2820 having one input coupled to the shift register 2810 and another to the register 2818 for comparing the current color_op and alpha_op operations of the fill priority message currently stored in the shift register 2810 with the color_op and alpha_op operations ASS_OP stored in the register 2818. In the event they are the same, the comparator 2820 asserts a first input of an AND gate 2822.

The AND gate 2822 has two inputs, a first input coupled to the output of the comparator 2820, a second input coupled to the shift register 2810. The shift register 2810 outputs to this second input a binary signal that indicates whether or not the fill priority message currently stored in the register 2810 is x_independent. Consequently, the AND gate 2822 is asserted when the color_op, and alpha_op operations of the fill priority message currently stored in the shift register 2810 are the same as ASS_OP, and the fill priority message is x-independent. The output of the AND gate 2822 is coupled to a first input of an AND gate 2834 and a second input of the AND gate 2824.

The AND gate 2824 has two inputs. As mentioned previously, the first is coupled to the output of the comparator 2812 and the second input is coupled to the output of the AND gate 2824. Thus, the AND gate 2822 is asserted when the color_op, and alpha_op operations of the fill priority message currently stored in the shift register 2810 are the same as ASS_OP, the fill priority message is x-independent, and the predicted stack depth equals R1. The output of the AND gate 2824 is coupled to the S input of an RS latch 2830 and a first input of an OR gate 2826.

The R input of the RS latch 2830 is coupled to that output of the decoder 2814 that outputs the end of pixel message END_OF_PIXEL. Thus the latch 2830 is reset at the end of each pixel and set when the optimisation module 550 first encounters for the next pixel an x-independent fill priority message having color op, and alpha op operations the same as ASS_OP, and where the predicted stack depth equals R1. The Q output of the latch 2830 is coupled to a first input of an AND gate 2840, and the $\overline{Q}$ output of the latch 2830 is coupled to a first input of the OR gate 2828.

The optimisation module 550 comprises a further comparator 2821 coupled to the shift register 2810 for determining whether the compositing operation is a true push operation. Specifically, the comparator 2821 determines whether

[STACK_OP=NO_POP_DEST
&& COLOR_OP=LCO_COPYPEN
&& LAO_USE_SOUTD=SET
&& LAO_USE_SROPD=SET]

and if this the case asserts a second input of an OR gate 2826.

The OR gate 2826 has two inputs, the first input of which is coupled to the output of the AND gate 2824 and the second input of which is coupled to the comparator 2821. The optimisation module 550 further comprises an OR gate 2828 having two inputs, one input coupled to the $\overline{Q}$ output of the latch 2830, and the other input coupled to the output of the OR gate 2826. The output of the OR gate 2828 is coupled to an inverted S input of a further latch 2832. The R input of the RS latch 2832 is coupled to that output of the decoder 2814 that outputs the end of pixel message END_OF_PIXEL.

Thus the $\overline{Q}$ output of the latch 2832 is forcibly asserted until a sequence of associative, x-independent fill priority messages having a stack depth of R1 is first encountered and then is de-asserted when the first non-associative, x-dependent fill priority message having an associated predicted stack depth of R1 is encountered.

The $\overline{Q}$ output of the latch 2832 is coupled to a second input of the AND gate 2834, the output of which in turn is coupled to a second input of the AND gate 2816.

Thus in this fashion the STORE bit instruction is asserted if:

(1) The message in the input and output registers 2810 and 2848 is a fill priority message associated with a first pixel in a run of pixels;

(2) The message has a predicted stack depth of R1; and (3) The message is one of a sequence of fill priority messages that are x-independent, have a color_op, and alpha_op operation the same as that of ASS_OP. However, in one special exception, the sequence may include a fill priority message, subsequent to the first fill priority message in the sequence, where the message has operators STACK_OP=NO_POP_DEST && COLOR_OP=LCO_COPYPEN && LAO_USE_SOUTD=SET && LAO_USE_SROPD=SET. This special fill priority message comprises a combination of operators that produce a pure stack push of a source value and may be included in the sequence of fill priority messages, which have their STORE bits asserted. The sequence ends when a fill priority message is encountered that has an x-dependent value or non-associative operator, irrespective of the stack depth.

Returning now to FIG. 28, the Q output of the RS latch 2830 is coupled to the AND gate 2840. The AND gate 2840 has two inputs, the other one of which is coupled to that output of the decoder 2814 outputting the binary signal FIRST_PIXEL. Thus the AND gate 2840 and the ACC_EN instruction bit are asserted when the fill priority message is the first x-independent fill priority message associated with a first pixel in a run of pixels that has an associative operator ASS_OP and a predicted stack depth of R1. When the run of subsequent fill priority messages ends, either because the x-dependent fill priority messages are encountered or because a non-associative operation is encountered, the latch 2830 is disabled and consequently the ACC_EN instruction bit is de-asserted.

The optimisation module 550 further comprises a register 2852 having a data line coupled to the LEVEL_INDX output of the decoder 2814, a write enable line coupled to the output of the AND gate 2840, and a reset line coupled to the AND gate 2838. The AND gate 2838 has two inputs coupled respectively to the outputs of the decoder 2814 outputting the START_OF_PIXEL and FIRST_PIXEL messages. When the decoder 2814 encounters a START_OF_PIXEL message and subsequent FIRST_PIXEL message, the AND gate 2838 is asserted and the register 2852 is set to Null. When the AND gate 2840 is asserted the level index of the fill priority message currently stored in the shift register 2810 is stored in the register 2852. In this fashion, the register 2852 contains the level index of the first x-independent fill priority message associated with a first pixel in a run of pixels that has an associative operator ASS_OP and a predicted stack depth of R1. Namely, the register 2852 contains the level index of the first fill priority message in the sequence having its STORE instruction bit asserted.

The optimisation module 550 further comprises a register 2837 having a data line coupled to the LEVEL_INDX output of the decoder 2814, a write enable line coupled to the output of the AND gate 2836, and a reset line coupled to the AND gate 2838. When the decoder 2814 encounters a START_OF_PIXEL message and subsequent FIRST_PIXEL message, the AND gate 2838 is asserted and the register 2837 is set to Null. When the AND gate 2836 is asserted the level index of the fill priority message currently stored in the shift register 2810 is stored in the register 2837. In this fashion, the register 2837 contains the level index of the last fill priority message in the sequence having its STORE instruction bit asserted. The AND gate 2838 has two inputs, the FIRST_PIXEL output of decoder 2814 and the output of AND gate 2816.

The optimisation module 550 further comprises a comparator 2844. The comparator 2844 comprises one input coupled to the level register 2837 and another input coupled to that output of the decoder 2814 that outputs the LEVEL_INDX signal. The comparator compares the level index LEVEL_INDX of the fill priority message currently stored in the shift register 2810 and the level index currently stored in the register 2837. In the event that these level indices are the same, the comparator 2844 asserts a first input of the AND gate 2850. The second (inverted) input of the AND gate 2850 is the FIRST_PIXEL output of the decoder 2814. The output of AND gate 2850 asserts the RESTORE bit of register 2848. Thus the RESTORE bit is asserted when the current bit is not the first pixel of a run and the output of comparator 2844 is asserted.

The optimisation module 550 also comprises a comparator 2842. The comparator 2842 comprises one input coupled to the output decoder 2814 that outputs the LEVEL_INDX of the fill priority message currently stored in the shift register 2810. The comparator 2842 also comprises another input coupled to the register 2852. The comparator 2842 compares the level index LEVEL_INDX of the fill priority message currently stored in the shift register 2810 and the level index currently stored in the register 2852. In the event that the level index of the fill priority message currently stored in the shift register 2810 is less than or equal to the level index stored in the register 2852, the comparator 2842 asserts an OR gate 2854.

The optimisation module 550 comprises a still further comparator 2846. The comparator 2846 comprises one input coupled to the output decoder 2814 that outputs the LEVEL_INDX of the fill priority message currently stored in the shift register 2810. The comparator 2846 also comprises another input coupled to the register 2837. The comparator 2846 compares the level index LEVEL_INDX of the fill priority message currently stored in the shift register 2810 and the level index currently stored in the register 2837. In the event that the level index of the fill priority message currently stored in the shift register 2810 is greater than or equal to the level index stored in the register 2837, the comparator 2846 asserts the OR gate 2854.

The OR gate 2854 comprises four inputs, a first inverted input to the output of decoder 2814 that outputs the FILL_PRTY binary signal, and second, third and fourth inputs coupled to the comparators 2842, 2844, and 2846 respectively. The purpose of the OR gate 2854 is to enable the output of the messages contained in the output shift register 2848. In this fashion, all fill priority messages of pixels subsequent to the first pixel in the run that have an level index greater than or equal to the level index stored in the register 2837 or have a level index less than or equal to the level index stored in the register 2852 will be enabled for output. The enabled fill priority messages are passed to the fill determination module 600. Any remaining fill priority messages that are not enabled for output are not passed to the fill determination module 600. Also, any non-fill priority messages are also enabled for passing to the fill determination module 600.

A description of the operation of the optimisation module 550 in accordance with the fourth arrangement now follows. When the first fill priority message, for the first pixel in the run having an x-independent associative operation is encountered, an accumulator 2320 in the pixel compositing module 700 (FIG. 23B) is enabled, and loaded with the color value. If the subsequent levels contain x-independent, associative operations, then the operation is performed on the accumulated value, as well as on the main stack 38. The accumulator value is stored to a temporary register in the accumulator unit 2320 of the pixel compositing module 700

(FIG. 23B) if the stack depth is identical to the original stack depth of the first associative operation.

When the run ends, either because x-dependent fill data is encountered, or because a non-associative operation is encountered, the accumulator mechanism 2320 of the pixel compositing module 700 (FIG. 23B) is disabled. The last stored accumulator value may, on subsequent pixels, be used to replace the operations between the last stored level and the start of the pixel. Thus, when generating fill priority messages for the fill color determination module 600 on subsequent pixels, an instruction to restore this value from the accumulator unit 2320 is used in place of the sequence of instructions, which has been optimized away. This restore instruction is included in the color composite message, and passed through to the pixel compositing module 700 (FIG. 23B), where the restored value is composited into the pixel using the associative operation that was identified by the decoder.

An associative operator may be identified from its code, or by adding a flag to each level in the priority determination module 500, indicating the presence of an associative operator on that level. The second option allows a software program more flexibility in identifying runs of associative operators when constructing the priority determination table, allowing different operations to be optimized, provided software can identify that the groups of objects being optimized are disjoint.

At some cost in complexity, it is possible to store several runs of associative operations on each pixel: it is simply a matter of providing enough registers to store the intermediate values for each run, and providing a counter, incremented when each run is identified, so that the register into which accumulated data is stored can be determined. In a real-world environment, however, this is unlikely to be required often enough to be worth the extra hardware cost.

Turning now to FIGS. 33A and 33B there is shown a comparison between an exemplary original sequence of fill priority messages for a first pixel in a run of pixels and the optimised sequence of fill priority messages for subsequent pixels optimised by the optimisation module 550 in accordance with the fourth arrangement.

FIG. 33A shows an exemplary sequence of fill priority messages 3301–3308 output by the optimisation module 550 for a first pixel in a run of pixels between adjacent edges. It is important to recognise that the sequences of fill priority messages generated by the priority determination module 500 for each pixel in a run of pixels and that are sent to the optimisation module 550 are the same.

The optimisation module 550 passes all of the fill priority messages for the first pixel in the run to the fill determination module 600. In addition, it adds three extra bits STORE, ACC_EN and RESTORE. During the first pixel in the run, the optimisation module 550 asserts the STORE bit if the message is one of a sequence of messages that are x-independent fill priority messages having associative ASS_OP operators, and is associated with a stack depth of R1 (which in this particular example is set to 1). The sequence ends when a fill priority message is encountered that has a x-dependent value or non-associative value. However, in one special exception, the sequence may include a fill priority message, subsequent to the first fill priority message in the sequence, where the message has operators STACK_OP=NO_POP_DEST && COLOR_OP=LCO_COPYPEN && LAO_USE_SOUTD=SET && LAO_USE_SROPD=SET. This special fill priority message comprises a combination of operators that produce a pure stack push of a source value and may be included in the sequence of fill priority messages which have their STORE bits asserted.

Turning now to FIG. 33A, the fill priority messages 3301–3308 of the first pixel in the run are sent to and passed by the optimisation module 550 in order from the rearmost to the topmost priority order. Namely, the fill priority messages 3301–3308 are sent to and passed by the optimisation module 550 in the following order 3301, 3302, 3303, 3304, 3305, 3306, 3307, 3308. It can thus been seen that the counter 2804 has a count of 1, 1, 1, 1, 2, 2, 1, 1 for fill priority messages 3301–3308 respectively. Also, the fill priority messages 3302–3307 are X-independent, and the fill priority messages 3302–3304, 3306, 3307 are associative ASS_OP. Thus the sequence of fill priority messages having their STORE bit asserted is 3302–3304, 3307. It should be noted that even though the fill priority message 3305 is a special exception fill priority message, and the fill priority message 3306 is associative ASS_OP, the fill priority messages 3305, 3306 have associated therewith a stack depth of two and thus will not have their STORE instruction bit asserted. Furthermore, the sequence of fill priority messages having their STORE bit asserted finishes at the x-dependent fill priority message 3308. It can also be seen that the ACC_EN bit instruction is asserted for the first fill priority message in the sequence having its STORE bit instruction asserted (viz 3302) and continues for the rest of the fill priority messages associated with the first pixel in the run. The RESTORE bit is de-asserted for all fill messages 3301–3308 associated with the first pixel in the run.

Turning now to FIG. 33B, there is shown the fill priority messages that are passed by the optimisation module 550 during each pixel that is subsequent to the first pixel in the run. Firstly, it should be noted that the register 2852 (FIG. 28), after the sending of the fill priority messages of the first pixel in the run, contains the level index of the fill priority message 3302. Also, it should be noted that the register 2837 (FIG. 28), after the sending of the fill priority messages of the first pixel in the run, contains the level index of the fill priority message 3307. Consequently, the output of the shift register 2848 is enabled for sending fill priority messages for subsequent pixels in the run only when the index of these fill priority messages have an index greater than or equal to the index stored in the register 2837, or have an index less than or equal to the index stored in the register 2852. Thus the optimisation module 550 in this particular example will pass only fill priority messages 3301, 3307, and 3308 for subsequent pixels in the run. The optimisation module 550 also asserts the RESTORE bit instruction of the fill priority message 3307 as the level index of this instruction is equal to the level index stored in the register 2837 (FIG. 28). The STORE bit instruction is de-asserted for all fill priority messages associated with pixels subsequent to the first pixel in the run.

It should be noted that the optimisation module 550 manipulates only the STORE, ACC_EN and RESTORE bits of the fill priority messages, it leaves the other fields of the Fill priority messages unchanged.

These fill priority messages 3301, 3307 and 3308 are passed by the optimisation module 550 for each pixel subsequent to the first pixel in the run to the fill determination module 600. The fill determination converts these fill priority messages to corresponding color composite messages and then sent to the pixel compositing module 700.

It can thus be seen the resultant color and opacity of a group of X-independent compositing operations may be completed and stored during a first pixel in the run and retrieved for use during subsequent pixels in the run.

4.5 A FIFTH ARRANGEMENT OF THE OPTIMISATION MODULE

The optimisation module 550 in accordance with a fifth arrangement is concerned with operations that can be written as an expression tree (that is, where the destination is not duplicated into a branch of the tree). In this situation, the pixel compositing module (FIG. 23A) is adapted to store, into a register, the result of a branch of the tree, which is X-independent, and on subsequent pixels, restore the branch from the register. The presence of X-dependent data in one branch of a node in the tree triggers optimisation of the other branch. Note that if both branches of a node are X-independent, a better optimisation is available further up the tree, while if both branches of a node are X-dependent no optimisation is possible for that node.

If the graphic description of a run of pixels can be written in expression-tree form, then where a branch of the tree is X-independent, that branch can be calculated once, and the result of this calculation used in place of the branch on subsequent pixels in the run. More generally, if all of the operations between a PUSH operation, and the corresponding POP_SRC operation which combines the result of these operations with the pushed value, are X independent, and do not involve the pushed value, then these operations can be calculated once, and the result used in place of these operations on subsequent pixels in the run. Note that such a sequence may also include NO_POP_DEST, KEEP_SRC and POP_SRC operations, and that provided the above two conditions hold with regard to the original pushed value, any such sequence may be optimised away.

Figure 29A:
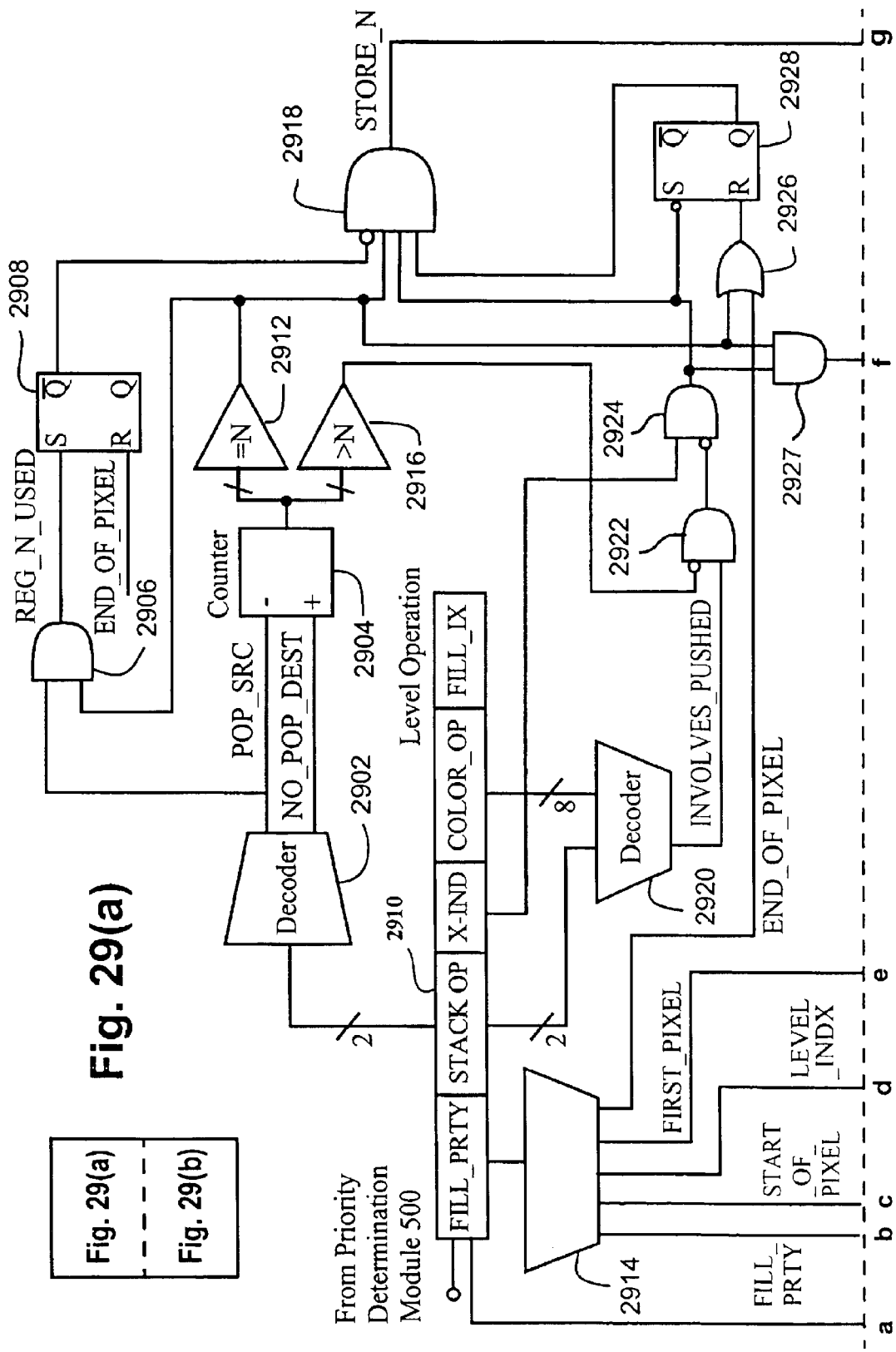
FIGS. 29(a) and 29(b) shows a block diagram of the optimisation module 550 in accordance with a fifth arrangement.
Figure 29B:
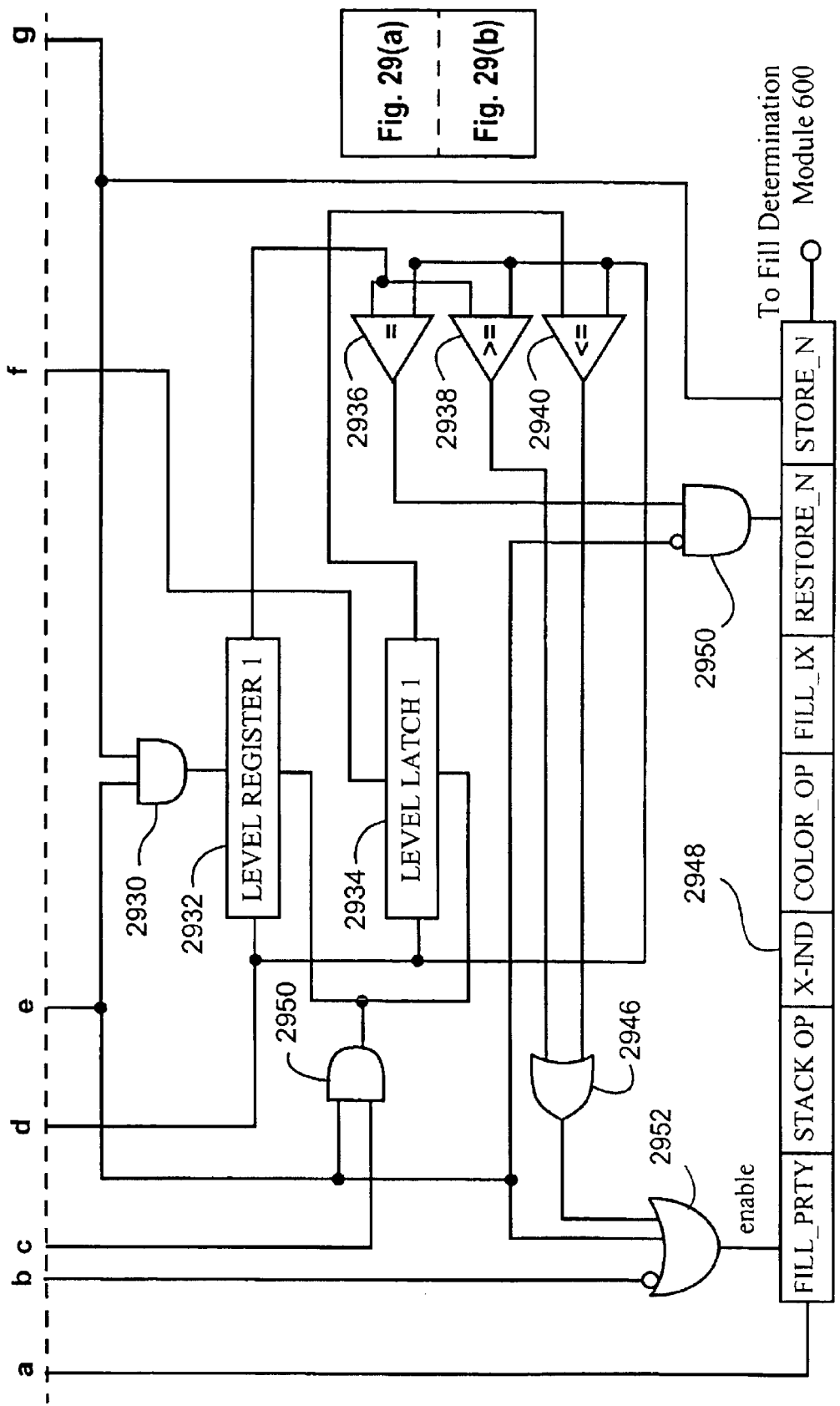

Turning now to FIG. 29, there is shown a block diagram of the optimisation module 550 in accordance with the fifth arrangement. The optimisation module 550 shown is for a stack depth N. The hardware requires duplication for each possible stack depth, because operations involving pushed values on one level do not affect the pushed values further down the stack. Such an operation on a higher level of the stack, therefore, does not preclude the optimisation of X-independent data at a lower stack depth.

The optimisation module 550 takes as input the messages sent by the priority determination module 550 and stores them in the input and output shift registers 2910 and 2948 in similar fashion to the input and output registers described in relation to the previous arrangements. The fill priority messages that are output from the output shift register 2910 are modified by the addition of a series of bits STORE_0, STORE_1, . . . , STORE_N and a series of bits RESTORE_0, RESTORE_1, . . . , RESTORE_N.

FIG. 29 shows an example of such a modified fill priority message stored in the output shift register 2948, illustrating only the STORE_N and RESTORE_N bits. The STORE_x and RESTORE_x bits are initially de-asserted. It should be noted that the circuitry of optimisation module 550 shown in FIG. 29 modifies only the STORE_x, and RESTORE_x bits. Duplicate circuitry similar to that shown in FIG. 29 may be included to modify the remaining STORE_x and RESTORE_x bits, for all other x between 0 and N−1.

The purpose of the STORE_x and RESTORE_x instruction bits is similar to that described previously with respect to the first and second arrangements. However, the difference is that an x-independent branch of the expression tree may be calculated once and stored in the intermediate register 2310 (FIG. 23A) by means of the STORE_x instruction bit and retrieved for use in compositing operations during subsequent pixels by means of the RESTORE_x instruction bit.

Returning now to FIG. 29, the optimisation module 550 also comprises a decoder 2914, which determines whether the message stored in the input register 2910 is a start_of_pixel, end_of_pixel, or an fill priority message, and outputs respective binary signals START_OF_PIXEL, END_OF_PIXEL, and FILL_PRTY in response thereto. In the event the message is a fill priority message, the decoder 2914 also determines whether the fill priority message is associated with a first pixel in a run of pixels and outputs a binary signal FIRST_PIXEL, and determines the priority level index contained in the fill priority message and outputs data LEVEL_INDX representative of that index.

The optimisation module 550 further comprises a decoder 2902 coupled to the input register 2910 for decoding the type of stack operation contained in a fill priority message in the input register 2910. Specifically, the decoder 2902 determines whether the stack operation contained in the fill priority message is a NO_POP_DEST or a POP_SRC stack operation.

The decoder 2902 is coupled to a counter 2904, and informs the counter when the stack operation is either a NO_POP_DEST or POP_SRC stack operation. The counter 2904 is initialised to one in response to a START_OF_PIXEL signal received from the decoder 2914 (not shown). The counter 2904 is then incremented for each NO_POP_DEST stack operation, and decremented for each POP_SRC stack operation in the subsequent fill priority messages stored in the input register 2910. The current value of the counter 2904 determines the stack depth of the stack 38 in the pixel compositing module 700 that will be produced as a result of executing the determined stack operation of the current fill priority message. It is important to note that the counter 2904 predicts the depth of the stack 38 that results from the stack operation associated with a current fill priority message before the stack operation of the current fill priority message is actually performed. The counter 2904 does this by keeping a running count of the stack operations of the fill priority messages.

The counter 2904 is coupled to a comparator 2912 which detects when the counter 2904 increments/decrements to a predetermined stack depth N, namely when the predicted stack depth is N. The output of the comparator 2912 is coupled to a first input of an AND gate 2918, which will be discussed below. The counter 2904 is also coupled to a comparator 2916 which detects when the predicted stack depth is greater than N.

When the comparator 2912 detects that the count is equal to N it asserts a first input of an AND gate 2906. In addition, when the decoder 2902 detects that the stack operation is a POP_SRC operation it asserts a second input of the AND gate 2906. Thus the AND gate 2906 will be asserted when the count=N and the current stack operation is POP_SRC.

The optimisation module further comprises a RS latch 2908, which is reset via the R input by the END_OF_PIXEL signal (obtained from the decoder 2914) and is set via the S input by the AND gate 2906. Thus the Q output of the RS latch 2908 will always be de-asserted until N first decrements to stack depth N. The Q output of the RS latch 2908 is coupled to an inverted second input of an AND gate 2918.

The optimisation module 550 also comprises a decoder 2920 that determines whether the compositing operation of the fill priority message in the input register 2910 belongs to a branch that is a valid branch in an expression tree. It does this by generating a binary signal INVOLVES_PUSHED, where
INVOLVES_PUSHED=FALSE (zero) for
(STACK_OP=NO_POP_DEST) && (COLOR_OP=LCO_COPYPEN)
or
(STACK_OP=STD_OP)
or
(STACK_OP=POP_SRC)

In the case where the binary signal INVOLVES_PUSHED is false (zero) then the branch is a valid branch and thus may be suitable for optimisation, otherwise the branch is invalid and not suitable for optimisation.

The decoder 2920 is coupled to and supplies the INVOLVES_PUSHED signal to a first input of an AND gate 2922. In addition, the comparator 2916 is coupled to an inverted second input of the AND gate 2922. Thus the AND gate 2922 is asserted when INVOLVED_PUSHED=TRUE and the count <=N. The output of the AND gate 2922 is coupled to an inverted first input of an AND gate 2924. In addition, the AND gate 2924 has a second input coupled to the shift register 2910. The AND gate 2924 is asserted when the fill priority message stored in the input register is x_independent and the following condition is not true: INVOLVED_PUSHED=TRUE and the count <=N. The output of the AND gate is coupled to a third input of the AND gate 2918.

The optimisation circuit 550 also comprises a RS latch 2928 having a reset input R and an inverted set S input. The RS latch 2928 is reset via the R input by an OR gate 2926 and is set via the inverted S input by the AND gate 2924. A first input of the OR gate 2926 is coupled to the output of the comparator 2912 and a second input of the OR gate 2926 is coupled to the decoder 2914. The OR gate 2926 is asserted when either the message stored in the input register 2910 is an end_of_pixel message or the count=N. Thus the latch 2928 is set when the fill priority message is x-dependent and INVOLVED_PUSHED=TRUE and the count <=N. The $\overline{Q}$ output of the latch 2928 is coupled to a fourth input of the AND gate 2918. In addition, the AND gate 2918 also has a fifth input coupled (not shown) to the decoder 2914, wherein the binary signal FIRST_PIXEL is fed to the fifth input.

In this fashion, the optimisation module 550 asserts this STORE_N bit instruction if:

(1) The message in the input and output registers 2910 and 2948 is a fill priority message associated with a first pixel in a run of pixels;

(2) The counter 2904 currently has a count of N and thus the predicted depth of the stack 38 is N;

(3) (a) The fill priority message in registers 2910 and 2948 is the first fill priority message encountered so far since the last end of pixel message that is X-independent, or if not, (b) All of the fill priority messages which have been processed so far since the aforementioned first x-independent fill priority message are X-independent; and (4) The stored fill priority message is part of a valid branch viz (ie. INVOLVES_PUSHED=FALSE).

The optimisation module 550 also comprises an AND gate 2930 having a first input coupled to the AND gate 2918 and a second input coupled to an output of the decoder 2914 outputting the FIRST_PIXEL signal. The AND gate 2930 is asserted when the message contained in the shift registers 2910 and 2948 is a fill priority message of a first pixel in a run of pixels and the STORE_N bit instruction for that fill priority message is asserted.

The optimisation module 550 further comprises a register 2932 having a data input line coupled to that output of the decoder 2914 that outputs the LEVEL_INDX data, a write enable line coupled to the output of the AND gate 2930, and a reset line coupled to the AND gate 2950. The AND gate 2950 has two inputs coupled respectively to the outputs of the decoder 2914 outputting the START_OF_PIXEL and FIRST_PIXEL messages. When the decoder 2914 encounters a START_OF_PIXEL and a subsequent FIRST_PIXEL message, the AND gate 2950 is asserted and the register 2932 is set to Null. Furthermore, the register 2932 stores the LEVEL_INDX data of the fill priority message stored in the shift registers 2910 and 2948 when the AND gate 2930 is asserted. Thus the register 2932 at any one time stores the LEVEL_INDX of the last fill priority message that had its STORE_N bit instruction asserted.

The optimisation module 550 also comprises an AND gate 2927 having a first input coupled to the AND gate 2924 and a second input coupled to the comparator 2912. The AND gate 2927 is asserted when the STORE_N bit instruction bit is asserted.

The optimisation module 550 further comprises a register 2934 having a data input coupled to that output of the decoder 2914 that outputs the LEVEL_INDX data. The register 2934 is also coupled to that output of the AND gate 2950 which resets the register 2934 to Null when a START_OF_PIXEL signal and a subsequent FIRST_PIXEL signal is encountered. The register 2934 stores the LEVEL_INDX data currently output when the AND gate 2927 is asserted. In this fashion, the register 2934 stores the LEVEL_INDX data of that fill priority message of the first pixel in the run that has the first STORE BIT instruction bit asserted. Namely, the register 2932 stores the level index of the last fill priority message that had its STORE_N bit asserted, whereas the register 2934 stores the level index of the first fill priority message that had its STORE_N bit asserted for the first pixel in the run.

The optimisation module 550 further comprises a comparator 2936. The comparator 2936 comprises one input coupled to the level register 2932 and another input coupled to that output of the decoder 2914 that outputs the LEVEL_INDX signal. The comparator compares the level index LEVEL_INDX of the fill priority message currently stored in the shift register 2910 and the level index currently stored in the register 2932. In the event that these level indices are the same, the comparator 2936 asserts a first input of the AND gate 2950.

The AND gate 2950 also comprises an inverted second input coupled to that output of the decoder 2914 outputting the FIRST_PIXEL signal. Thus the AND gate 2950 asserts the RESTORE_N bit instruction for that fill priority message subsequent to the first pixel in the run of pixels that has a level index the same as the level index currently stored in the register 2932.

The optimisation module 550 also comprises a comparator 2938. The comparator 2938 comprises one input coupled to the output decoder 2914 that outputs the LEVEL_INDX of the fill priority message currently stored in the shift register 2910. The comparator 2938 also comprises another input coupled to the register 2932. The comparator 2938 compares the level index LEVEL_INDX of the fill priority message currently stored in the shift register 2910 and the level index currently stored in the register 2932. In the event that the level index of the fill priority message currently stored in the shift register 2910 is greater than or equal to the level index stored in the register 2932, the comparator 2936 asserts an OR gate 2946, which in turn asserts an OR gate 2952.

The optimisation module 550 comprises a still further comparator 2940. The comparator 2940 comprises one input coupled to the output decoder 2914 that outputs the LEVEL_INDX of the fill priority message currently stored in the shift register 2910. The comparator 2940 also comprises another input coupled to the register 2934. The comparator 2940 compares the level index LEVEL_INDX of the fill priority message currently stored in the shift register 2910 and the level index currently stored in the latch 2934. In the event that the level index of the fill priority message currently stored in the shift register 2910 is less than or equal to the level index stored in the register 2934, the comparator 2936 assert the OR gate 2946, which in turn asserts an OR gate 2952.

The OR gate 2952 comprises three inputs a first input coupled to the OR gate 2946, a second input to the output of decoder 2914 that outputs the FIRST_PIXEL signal and a third inverted input coupled to the output of the decoder 2914 that outputs the FILL_PRTY signal. The purpose of the OR gate 2952 is to enable the output of the messages contained in the output register 2948. In this fashion, all fill priority messages of pixels subsequent to the first pixel in the run that have an level index greater than or equal to the level index stored in the register 2932 or have a level index less than or equal to the level index stored in the register 2934 will be enabled for output. The enabled fill priority messages are passed to the fill determination module 600. Any remaining fill priority messages that are not enabled for output are not passed to the fill determination module 600. Also, any non-fill priority messages are also enabled for passing to the fill determination module 600.

The operation of the optimisation module in accordance with the fifth arrangement will now be described. As the fill priority messages for the first pixel are processed, the counter 2904 is used to monitor the stack depth, and the comparator 2912 output is enabled when the stack depth is equal to N. The stack operation and the graphic operation are decoded by the decoder 2920 to determine whether the stack operation involves the pushed value (ie. INVOLVES_PUSHED=FALSE). The resulting STORE_N bit instruction is disabled when the stack depth is greater than N, so that X-independent data at higher stack depths may be optimised away when the stack depth drops back to N.

The STORE_N signal starts being asserted, and continues being asserted when the color values are x-independent, and no operation involving a pushed value at a predicted stack depth<N is encountered. If the predicted stack depth increases above N, the storage is disabled but may be enabled again if neither of the above conditions occurs. Also, the priority level when the STORE_N signal starts being asserted is stored in the register 2934 and the priority level when the STORE_N signal is de-asserted is stored in a register 2932.

The STORE_N signal causes the value on top of the stack 38 to be stored in the intermediate-value register 2310 (see FIG. 23A) at level N. The intermediate-value register 2310 in accordance with the present arrangement comprises one entry for each stack depth N. As will become apparent, when there is no STORE_X signal for a particular level x, there will be no value stored in the entry of the register 2310 at level x.

The STORE_N signal is latched by REG_N_USED latch 2908 to indicate the presence of a stored value for the level. So that when a fill priority message with POP_SRC is next encountered with stack depth=N, the REG_N_USED latch 2908 disables storage in the register for level N by disabling STORE_N, and the last value prior to the POP_SRC cannot be over-written. The first fill priority message having its STORE_x bit instruction bit asserted is indicated by the presence of level data in the register 2934, the last fill priority message having its STORE_x bit instruction asserted is indicated by the presence of level data in the register 2932. For subsequent pixels, the result of the fill priority messages between these first and the last fill priority message may be replaced with the value stored in intermediate-value register 2310 at level N. Thus, when generating compositing instructions for the compositing module on subsequent pixels, an instruction to restore this value from the intermediate-value register 2310 for level N is used in place of the sequence of fill priority messages, which have been optimised away. The stored value is pushed onto the stack before the color, opacity and stack operations are performed.

Turning now to FIGS. 34A and 34B there is shown a comparison between an exemplary original sequence of fill priority messages for a first pixel in a run of pixels and the optimised sequence of fill priority messages for subsequent pixels optimised by the optimisation module 550 in accordance with the fifth arrangement.

FIG. 34A shows an exemplary sequence of fill priority messages 3401–3410 output by the optimisation module 550 for a first pixel in a run of pixels between adjacent edges. It is important to recognise that the sequences of fill priority messages generated by the priority determination module 500 for each pixel in a run of pixels and that are sent to the optimisation module 550 are the same.

The optimisation module 550 passes all of the fill priority messages for the first pixel in the run to the fill determination module 600. In addition, it adds six extra bits STORE_0, STORE_1, STORE_2 and RESTORE_0, RESTORE_1, RESTORE_2 (the latter three not shown in FIG. 34A and the former three not shown in FIG. 34B). The STORE_0, STORE_1, and STORE_2 bit instructions correspond to duplicate circuits where the counter 2904 has initialised stack depth of one, two and three respectively. Similarly for the RESTORE_x bit instructions.

During the first pixel in the run, the optimisation module asserts the STORE_N bit (FIG. 34A) in accordance with the aforementioned test condition.

Turning now to FIG. 34A, the fill priority messages 3401–3410 of the first pixel in the run are sent to and passed by the optimisation module 550 in order from the rearmost to the topmost priority order. Namely, the fill priority messages 3401–3410 are sent to and passed by the optimisation module 550 in the following order 3401, 3402, 3403, 3404, 3405, 3406, 3407, 3408, 3409, 3410.

Considering first an initialised stack depth of 1 and the STORE_0 instruction. It can thus been seen that the counter 2904 has a count of 1, 1, 1, 2, 2, 2, 3, 2, 1, 1 for fill priority messages 3401–3410 respectively. Also, the fill priority messages 3401, 3402, meet the criteria that the fill priority messages are a first continuous run of X-independent fill priority messages. It should be noted that fill priority messages 3404–3409 do not meet the aforementioned test condition because of the existence of x-dependent fill priority message at that stack depth. It can also be seen that fill messages 3401–3406 and 3408–3410 meet the criteria that INVOLVED_PUSHED=FALSE. Thus the STORE_0 bit instruction (viz stack depth of one) will be asserted for fill messages 3401 and 3402 for a stack depth 1. In a similar fashion it can be seen that the STORE_1 bit instruction (stack depth of two) will be asserted for fill messages 3404–3406 and 3408. Again it can been seen that no STORE_2 (viz stack depth of three) will be asserted. The RESTORE_x bit is de-asserted for all fill messages 3001–3008 associated with the first pixel in the run and is not shown in FIG. 34A.

These fill priority messages 3401–3410 associated with the first pixel in the run are passed to the fill determination module 600 and converted to color composite messages and then sent to the pixel compositing module 700. The pixel compositing module 700 upon receipt of a color composite message having a STORE_x bit asserted will copy the top of the stack 38 to level x of the intermediate-value register 2310 after the compositing operation of the pixel compositing message has been completed. In the event a sequence of color composite messages are received each having their STORE_x bit asserted of the same level, the pixel compositing module 700 will overwrite a previous value stored in the intermediate-value register with the copy of the stack 38 associated with a subsequent color composite message. In this particular example, the intermediate-value register 2310 will contain in level one (corresponding to a stack depth of one) a copy of the top of the stack 38 that results after the completion of the compositing operation associated with the fill priority message 3402. The intermediate-value register 2310 will also contain in level two (corresponding to a stack depth of two) a copy of the top of stack 38 that results after the completion of the compositing operation associated with the fill priority message 3408.

Turning now to FIG. 34B, there is shown the fill priority messages that are passed by the optimisation module 550 during each pixel that is subsequent to the first pixel in the run. Firstly, it should be noted that the register 2932 (FIG. 29) during subsequent pixels contains the level index of the last fill priority message 3402 in the run that had its store bit asserted. Also, it should be noted that the register 2934 (FIG. 29) during subsequent pixels contains the level index of the first fill priority message 3402 in the run that had its store bit asserted. Consequently, the output of the shift register 2948 is enabled for sending fill priority messages for subsequent pixels in the run only when the index of these fill priority messages have an index level between or equal to the level index stored in the registers 2932, and 2934. Thus the optimisation module 550 in this particular example will pass only fill priority messages 3402, 3403, 3408–3410 for subsequent pixels in the run. The optimisation module 550 also asserts the RESTORE_0 bit instruction of the fill priority message 3402 as the level index of this fill priority message is equal to the level index stored in the register 2932 (FIG. 29). In a similar fashion the optimisation module 550 also asserts the RESTORE_1 bit instruction of the fill priority message 3408.

The STORE_x bit instructions are de-asserted for all fill priority messages associated with pixels subsequent to the first pixel in the run. It should be noted that the optimisation module 550 manipulates only the STORE_x and RESTORE_x bits of the fill priority messages, it leaves the other fields of the fill priority messages unchanged.

These fill priority messages 3402, 3403, 3408, 3409, 3410 are passed by the optimisation module 550 for each pixel subsequent to the first pixel in the run to the fill determination module 600. The fill determination converts these fill priority messages to corresponding color composite messages and then sent to the pixel compositing module 700. The pixel compositing module 700 upon receipt of a color composite message (eg. 3402) having a RESTORE_x bit asserted will copy the color and opacity value stored in the intermediate-value register 2310 at that level x to the top of the stack. The pixel compositing module 700 then proceeds in usual fashion according to the instructions contained in the color composite messages corresponding to the fill priority messages (eg. 3403, 3408, 3409, 3410).

In further variations of the aforementioned arrangements, the arrangements are arranged as modules and sub-modules for performing the functions of the arrangements.

In still further variations, combinations of two or more of the aforementioned arrangements are possible.

In a still further arrangement, the optimisation module 550 is incorporated into the priority determination module 500 with the view to directly generating the reduced set of fill priority messages from the combined table 34. In this fashion, throughput of fill priority messages is reduced.

5.0 COMPOSITING MODULE

The compositing module 700 accepts color composite messages passed to it from the priority determination module 500, via the fill color determination module 600, and performs the color and opacity operation specified in the color_op and alpha fields of the message, and the stack operation specified in the stack operation field of the messages.

Preferably, the compositing module 700 includes the registers used for storing the intermediate results of optimised sequences, and accepts messages stored into, and restored from these registers, according to messages issued by the optimisation circuit 550.

The optimisation module 550 in accordance with the first arrangement is used in conjunction with the pixel compositing module 700 as shown in FIG. 23A. In this case, a color composite message with the STORE bit set will cause the compositing module 700 (FIG. 23A) to store the value on top of the stack 38 into the register 2310, prior to performing the color, opacity and stack operations specified in color composite message. Conversely, when a color composite message with the RESTORE bit set is encountered, the value in this register 2310 is copied from the register 2310 onto the top of the stack 38, prior to performing the color, opacity and stack operations specified in the color composite message. The optimisation module 550 in accordance with the second arrangement can also be used in conjunction with the pixel compositing module 700 as shown in FIG. 23A, and operates in the same manner.

The optimisation module 550 in accordance with the third arrangement is used in conjunction with the pixel compositing module 700 as shown in FIG. 23A, with one modification. In this modification, the pixel compositing module 700 comprises a set of registers instead of one register 2310. In this case, a color composite message with the STORE instruction bit asserted will cause the compositing module 700 to store the state of the stack 38 into the set of registers, prior to performing the color, opacity and stack operations specified in the color composite message. Conversely, when a color composite message with the RESTORE instruction bit asserted is encountered, the stack 38 is restored to the state which was stored in these set of registers, prior to performing the color, opacity and stack operations specified in the color composite message.

The optimisation module 550 in accordance with the fourth arrangement is used in conjunction with the pixel compositing module 700 as shown in FIG. 23B. In this case, the presence of an associative operation will trigger the performance of this operation on the accumulator 2320, in addition to performing the color, opacity and stack operations specified in the color composite message on the stack itself. If a color composite message is encountered with the STORE bit asserted, then the accumulator value is stored into a temporary register in the accumulator unit 2320. Conversely, if a color composite message is encountered with the RESTORE bit asserted, then the value in the temporary register of unit 2320 is composited with the current destination value, and the color, opacity and stack operations specified in the color composite message are then performed. In the case where multiple temporary registers are used, the index of the register to be stored/restored from can be included in the color composite message.

The optimisation module 550 in accordance with the fifth arrangement is used in conjunction with the pixel compositing module 700 as shown in FIG. 23A with some modification. The register 2310 is adapted to store a list of color and opacity values at different priority levels. In this case, the color composite messages generated from the priority determination module 500 include STORE_x bits corresponding to a x level of the register 2310 to be used. A color composite message with the STORE_x bit asserted will cause the value on top of the stack 38 to be stored in the register 2310 at the level x specified in the color composite message, after the color, opacity and stack operations specified in the color composite message have been performed. A color composite message with the RESTORE_x bit asserted will cause the saved value to be pushed onto the top of the stack after the color, opacity and stack operations specified in the color composite message have been performed.

Each of these optimisations replaces (on average) several color composite messages that must be performed on a per-pixel basis with a single color composite message to restore a value or the state of the stack. Thus, where runs of pixels that require the same compositing operations to be performed on each pixel are encountered, these optimisations reduce the amount of per-pixel processing which must be performed, allowing pixels to be composited using fewer operations, on average. The choice of optimisation method will depend largely on the amount of complexity which is tolerable within a particular system design.

It should be apparent to the person skilled in the art that any of these optimisations may be used in a software implementation of a pixel-sequential renderer, without departing from the principles of this invention.

The aforementioned preferred processes implemented by the computer system 1 comprise a particular control flow. There are many other variants of the preferred processes, which use different control flows without departing from the spirit or scope of the invention. Furthermore one or more of the steps of the preferred method(s) may be performed in parallel rather than sequentially.

INDUSTRIAL APPLICABILITY

It is apparent from the above that the arrangements described are applicable to computer graphics and printing industries.

The foregoing describes only some arrangements of the present invention, and modifications and/or changes can be made thereto without departing from the scope and spirit of the invention, the arrangements being illustrative and not restrictive.

What is claimed is:

1. An apparatus for rendering an object-based image one pixel at a time in scanline order, the apparatus comprising:
an optimisation module for minimising a number of compositing messages for compositing the object-based image, the optimisation module comprising:
a first unit for setting, for a first pixel in a run of pixels between adjacent edges of objects, first data in one or more compositing messages of a sequence of compositing messages to indicate that a compositing result of the one or more compositing messages is to be stored for use in compositing of each pixel subsequent to the first pixel in the run of pixels; and
a second unit for generating, for each pixel subsequent to the first pixel in the run of pixels, a reduced set of compositing messages from the sequence of compositing messages, the second unit comprising:
a sub-unit for generating, for each pixel subsequent to the first pixel in the run of pixels, the reduced set of compositing messages; and
a sub-unit for setting, for each pixel subsequent to the first pixel in the run of pixels, second data in one or more compositing messages of the reduced set to indicate that the stored compositing result is to be retrieved for use in compositing of each pixel subsequent to the first pixel in the run of pixels; and
a compositing module for generating a resultant color and opacity for a currently scanned pixel in accordance with the compositing messages, wherein the compositing module generates the color and opacity of the first pixel in the run of pixels in accordance with the sequence of compositing operations, and the compositing module generates the color and opacity of each pixel in the run subsequent to the first pixel in accordance with the reduced set and the retrieved compositing result.

2. The apparatus as claimed in claim 1, wherein the compositing module comprises a stack for generating a resultant color and opacity for a currently scanned pixel in accordance with the compositing messages.

3. The apparatus as claimed in claim 2, wherein each compositing message comprises compositing instructions, data representative of the color and opacity of an associated object, and data representative of whether the color and opacity are constant along the scanline.

4. The apparatus as claimed in claim 3, wherein the first unit comprises:
a sub-unit for setting the first data of a current compositing message in the event a predicted stack depth of the stack is of a predetermined depth and the current compositing message and all of the compositing messages having their associated first data set so far are associated with objects that have a constant color and opacity along the scanline.

5. The apparatus as claimed in claim 4, wherein the reduced set of compositing messages comprises the compositing message corresponding to the last compositing message of the first pixel having the first data set and the subsequent compositing messages of the sequence corresponding to the compositing messages having their first data not set.

6. The apparatus as claimed in claim 5, wherein the sub-unit for setting the second data in the one or more compositing messages of the reduced set comprises:
a sub-unit for setting the second data in the compositing message corresponding to a last compositing message of the first pixel having the first data set.

7. The apparatus as claimed in claim 3, wherein the compositing instructions comprise stack operations and color and opacity operators, and wherein the first unit comprises:
a sub-unit for setting the first data of a current compositing message in the event the current compositing message and the compositing messages having their first data set so far are associated with objects that have a constant color and opacity over the scanline and comprise stack operators that are not a predetermined stack operator.

8. The apparatus as claimed in claim 2, wherein the compositing result is a value on the top of the stack.

9. The apparatus as claimed in claim 2, wherein the first data indicates that the state of the stack storing the compositing result is to be stored.

10. The apparatus as claimed in claim 9, wherein the first unit comprises:
a sub-unit for setting the first data of a current compositing message in the event the current compositing message is the first compositing message for the first pixel in the run associated with objects that have a variable color and opacity along the scanline.

11. The apparatus as claimed in claim 10, wherein the reduced set of compositing messages comprises the compositing message corresponding to a last compositing message of the first pixel having the first data set and the subsequent compositing messages of the sequence corresponding to those compositing messages having their first data not set.

12. The apparatus as claimed in claim 11, wherein the sub-unit for setting the second data in the one or more compositing messages of the reduced set comprises:
a sub-unit for setting the second data in the compositing message corresponding to a last compositing message having the first data set.

13. The apparatus as claimed in claim 3, wherein the first unit comprises:
a sub-unit for setting the first data of a current compositing message in the event the current compositing message is associated with a predicted stack depth of a predetermined value and is one of a sub-sequence of compositing messages that have a constant color and opacity along the scanline and comprise a color and alpha operator of a predetermined type.

14. The apparatus as claimed in claim 13, wherein the color and alpha operator of a predetermined type is associative.

15. The apparatus as claimed in claim 14, wherein the sub-unit for setting the first data in addition sets the first data of a current compositing message in the event the current compositing message is associated with a predicted stack depth of a predetermined value and has a stack operator, and color and alpha operators of a predetermined type.

16. The apparatus as claimed in claim 14, wherein the reduced set of compositing messages comprises:
the compositing messages of the sequence that are not members of the sub-sequence and correspond to those compositing messages of the first pixel having their first data not set; and
the compositing message corresponding to a last compositing message of the first pixel having the first data set.

17. The apparatus as claimed in claim 13, wherein the sub-unit for setting the second data in the one or more compositing messages of the reduced set comprises:
a sub-unit for setting the second data in the compositing message corresponding to a last compositing message having the first data set.

18. The apparatus as claimed in claim 3, wherein the first unit comprises:
a sub-unit for setting the first data of a current compositing message in the event the current compositing message is associated with a predicted stack depth of a predetermined value and is one of a sub-sequence of compositing messages that have a constant color and opacity along the scanline and are part of a valid branch of an expression tree.

19. The apparatus as claimed in claim 18, wherein the reduced set of compositing messages comprises;
the compositing message corresponding to a last compositing message having the first data set, for each predicted stack depth for which first data has been set for at least one compositing message; and
the compositing messages of the sequence corresponding to those compositing messages having their first data not set and subsequent to the last compositing message having the first data set.

20. The apparatus as claimed in claim 18, wherein the sub-unit for setting the second data in the one or more compositing messages of the reduced set comprises:
a sub-unit for setting the second data in the compositing message corresponding to a last compositing message having the first data set, for each stack depth for which first data has been set for at least one compositing message.

21. A method for rendering an object-based image one pixel at a time in scanline order, the method comprising the steps of:
an optimisation step for minimising a number of compositing messages for compositing the object-based image, the optimisation step comprising the sub-steps:
a setting step for setting, for a first pixel in a run of pixels between adjacent edges of objects, first data in one or more compositing messages of a sequence of compositing messages to indicate that a compositing result of these one or more compositing messages is to be stored for use in compositing of each pixel subsequent to the first pixel in the run of pixels; and
a generating step for generating, for each pixel subsequent to the first pixel in the run of pixels, a reduced set of compositing messages from the sequence of compositing messages, the generating step comprising:
a generating sub-step for generating, for each pixel subsequent to the first pixel in the run of pixels, the reduced set of compositing messages; and
a setting sub-step for setting, for each pixel subsequent to the first pixel in the run of pixels, second data in one or more compositing messages of the reduced set to indicate that the stored compositing result is to be retrieved for use in compositing of each pixel subsequent to the first pixel in the run of pixels; and
a compositing step for generating a resultant color and opacity for a currently scanned pixel in accordance with the compositing messages, wherein the compositing module generates the color and opacity of the first pixel in the run of pixels in accordance with the sequence of compositing operations, and the compositing module generates the color and opacity of each pixel in the run subsequent to the first pixel in accordance with the reduced set and the retrieved compositing result.

22. A computer program product comprising machine-readable program code recorded on a machine-readable recording medium, for controlling the operation of a data processing apparatus on which the program code executes to perform a method for rendering an object-based image one pixel at a time in scanline order, the method comprising:
an optimisation step for minimising a number of compositing messages for compositing the object-based image, the optimisation step comprising the sub-steps:
a setting step for setting, for a first pixel in a run of pixels between adjacent edges of objects, first data in one or more compositing messages of a sequence of compositing messages to indicate that a compositing result of these one or more compositing messages is to be stored for use in compositing of each pixel subsequent to the first pixel in the run of pixels; and a generating step for generating, for each pixel subsequent to the first pixel in the run of pixels, a reduced set of compositing messages from the sequence of compositing messages, the generating step comprising:

a generating sub-step for generating, for each pixel subsequent to the first pixel in the run of pixels, the reduced set of compositing messages; and a setting sub-step for setting, for each pixel subsequent to the first pixel in the run of pixels, second data in one or more compositing messages of the reduced set to indicate that the stored compositing result is to be retrieved for use in compositing of each pixel subsequent to the first pixel in the run of pixels; and a compositing step for generating a resultant color and opacity for a currently scanned pixel in accordance with the compositing messages, wherein the compositing module generates the color and opacity of the first pixel in the run of pixels in accordance with the sequence of compositing operations, and the compositing module generates the color and opacity of each pixel in the run subsequent to the first pixel in accordance with the reduced set and the retrieved compositing result.

* * * * *